(12) United States Patent
Noda et al.

(10) Patent No.: US 12,024,579 B2
(45) Date of Patent: Jul. 2, 2024

(54) CURABLE LIQUID COMPOSITION, PARTICULATE FILLER, AND COMPOUND

(71) Applicant: TOKYO OHKA KOGYO CO., LTD., Kawasaki (JP)

(72) Inventors: Kunihiro Noda, Kawasaki (JP); Tetsuo Fujinami, Kawasaki (JP); Takehiro Seshimo, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 261 days.

(21) Appl. No.: 17/643,144

(22) Filed: Dec. 7, 2021

(65) Prior Publication Data
US 2022/0195097 A1     Jun. 23, 2022

(30) Foreign Application Priority Data

Dec. 18, 2020  (JP) .................................. 2020-210394
Oct. 12, 2021  (JP) .................................. 2021-167569

(51) Int. Cl.
*C08F 292/00*     (2006.01)
*C08K 3/22*       (2006.01)

(52) U.S. Cl.
CPC .............. *C08F 292/00* (2013.01); *C08K 3/22* (2013.01); *C08K 2003/2237* (2013.01); *C08K 2003/2244* (2013.01)

(58) Field of Classification Search
CPC ... C08F 292/00; C08K 3/22; C08K 2003/223; C08K 2003/2244; C08K 2003/2237
USPC ......................................................... 523/205
See application file for complete search history.

(56) References Cited

U.S. PATENT DOCUMENTS

2012/0316266 A1*  12/2012  Koyama ................ B82Y 30/00
                                                        977/773
2019/0190341 A1*  6/2019  Beisele ..................... B32B 5/02

FOREIGN PATENT DOCUMENTS

JP         2015-017026 A        1/2015

* cited by examiner

*Primary Examiner* — David T Karst
(74) *Attorney, Agent, or Firm* — Knobbe, Martens, Olson & Bear, LLP

(57) ABSTRACT

A curable liquid composition containing a particulate filler and an epoxy compound having a non-aromatic cyclic group having 5 or more annular atoms, having a favorable dispersion stability of particulate filler and providing a cured material having high hardness, a filler that is suitably incorporated in the curable liquid composition, and a compound that can be suitably used as a ligand bonded to the filler. In a curable liquid composition comprising an epoxy compound having a non-aromatic cyclic group having 5 or more annular atoms as a curable component, a filler on a surface of which a ligand having an alicyclic epoxy group that may be condensed with an aromatic ring and a thiol group, is bonded, is used.

11 Claims, No Drawings

CURABLE LIQUID COMPOSITION, PARTICULATE FILLER, AND COMPOUND

This application claims priority to Japanese Patent Application No. 2020-210394, filed Dec. 18, 2020; and Japanese Patent Application No. 2021-167569, filed Oct. 12, 2021, the entire contents of which are incorporated herein by reference.

BACKGROUND OF THE INVENTION

Field of the Invention

The present invention relates to a curable liquid composition comprising a particulate filler and an epoxy compound, a particulate filler incorporated in the curable liquid composition, and a compound suitably used as a ligand in the particulate filler.

Related Art

Curable crude liquid compositions containing particulate fillers have been widely used in various materials such as optical materials and electronic component materials. When the curable liquid composition is used, a cured product can be easily formed by applying or injecting the curable liquid composition to a portion where the cured product is desired to be formed. Moreover, the particulate filler is incorporated in the curable liquid composition for the purpose of various purposes such as adjusting a refractive index of the cured product and scattering of light in the cured product and adjusting mechanical properties of the cured product and electrical properties such as resistance of the cured product.

Since a curable component in the curable liquid composition can form a cured product having high hardness depending on a type of a curing agent, by various methods such as heating and exposure to light, epoxy compounds are often used. Moreover, in applications requiring transparency of the cured product, an epoxy compound having a non-aromatic cyclic group such as an alicyclic epoxy compound as a curable component in the curable liquid composition, is often used owing to facilitation of achievement of both mechanical properties and transparency of the cured product.

A typical example of the particulate filler includes a metal oxide fine particle. However, when a particulate filler such as an untreated metal oxide fine particle that has not been surface-treated is incorporated into the curable liquid composition, the particulate filler has a problem of facilitation of aggregation. When the particulate fillers aggregate in the curable liquid composition, the particulate filler hardly enables its function to be exhibited. Therefore, various surface treatment methods have been proposed in order to impart favorable dispersion stability for a dispersion medium to the particulate filler such as a metal oxide fine particle.

As such a surface treatment method, a method for coating at least a portion of a surface of the metal oxide fine particle with a carboxylic acid compound having an aromatic structure, has been proposed (Patent Document 1).

Patent Document 1: Japanese Unexamined Patent Application, Publication No. 2015-017026

SUMMARY OF THE INVENTION

However, when the metal oxide fine particles surface-treated by the method described in Patent Document 1 are incorporated in a curable liquid composition containing an epoxy compound having a non-aromatic cyclic group, there are problems of dispersion stability of the metal oxide fine particles in the curable liquid composition not necessarily being favorable and of a cured product having high hardness being hardly formed by using the curable liquid composition.

The present invention has been completed in view of the above problems, and an object of the present invention is to provide a curable liquid composition comprising a particulate filler (A) and an epoxy compound (B) having a non-aromatic cyclic group having 5 or more annular atoms, having favorable dispersion stability of the particulate filler (A) and providing a cured product having high hardness, a particulate filler suitably incorporated in the curable liquid composition, and a compound that can be suitably used as a ligand bonded to the particulate filler.

The present inventors have found that in a curable liquid composition comprising an epoxy compound (B) having a non-aromatic cyclic group having 5 or more annular atoms as a curable component, the aforementioned problems can be solved by using a particulate filler (A), on a surface of which a ligand (a1) having an alicyclic epoxy group that may be condensed with an aromatic ring and a thiol group, is bonded and thus have completed the present invention.

A first aspect of the present invention relates to a curable liquid composition, comprising a particulate filler (A) and an epoxy compound (B), in which a ligand (a1) having an alicyclic epoxy group that may be condensed with an aromatic ring and a thiol group, is bonded to a surface of the particulate filler (A) and the epoxy compound (B) has a non-aromatic cyclic group having 5 or more annular atoms.

A second aspect of the present invention relates to a particulate filler, on the surface of which the ligand (a1) having an alicyclic epoxy group that may be condensed with an aromatic ring and a thiol group is bonded.

A third aspect of the present invention relates to a compound represented by the following formula (A1):

$$HS-R^1-R^2 \qquad (A1)$$

in which in formula (A1), $R^1$ is a divalent chain linking group, and $R^2$ is an alicyclic epoxy group that may have a substituent and may be condensed with an aromatic ring.

According to the present invention, the curable liquid composition comprising a particulate filler (A) and an epoxy compound (B) having a non-aromatic cyclic group having 5 or more annular atoms, having favorable dispersion stability of the particulate filler (A) and providing a cured product having high hardness, the particulate filler suitably incorporated in the curable liquid composition, and the compound that can be suitably used as the ligand bonded to the particulate filler, can be provided.

DETAILED DESCRIPTION OF THE INVENTION

<<Curable Liquid Composition>>

The curable liquid composition contains a particulate filler (A) and an epoxy compound (B). To the surface of the particulate filler (A) is bonded a ligand (a1) having an alicyclic epoxy group that may be condensed with an aromatic ring and a thiol group. Moreover, the epoxy compound (B) has a non-aromatic cyclic group having 5 or more annular atoms.

By containing the particle filler (A) to which the ligand (a1) having a specific structure having an alicyclic epoxy group is bonded and the epoxy compound (B) having a non-aromatic cyclic group having 5 or more annular atoms in combination thereof, the dispersion stability of the particulate filler (A) in the curable liquid composition is favorable.

Hereinafter, essential or optional components that may be contained in the curable liquid composition will be described.

<Particulate Filler (A)>

As the particulate filler (A), a particulate filler conventionally incorporated in a curable liquid composition, can be used without particular limitation. A material of the particulate filler (A) may be an organic material such as a resin or an inorganic material such as a metal or a metal oxide. An inorganic material is preferred as a material of particulate filler (A) because swelling of the particulate filler (A) due to the epoxy compound (B) or an organic solvent (S) is unlikely to occur. For example, when the particulate filler (A) is a particle composed of a plurality of materials such as a core-shell type particle, combination of the plurality of materials may be a combination of an organic material and an inorganic material.

A shape and size of the particulate filler (A) are also not particularly limited as long as they do not impair the object of the present invention. The shape of the particulate filler (A) may be, for example, a spherical, a regular polyhedron such as a regular polyhedron, or an irregular polyhedron. Moreover, a structure of the particulate filler (A) may be, for example, a hollow structure or a porous structure.

A preferable example of the particulate filler (A) includes a metal oxide particle. Among the metal oxide particles, the metal oxide can be appropriately selected according to applications. The metal constituting the metal oxide includes, for example, a transition metal, a metal of group 10 in the periodic table, a metal of group 13 in the periodic table, and a metal of group 14 in the periodic table, etc. It is noted that silicon is not included in the metal. The metal oxide may be an oxide containing a single metal, an oxide containing two or more types of metals, or a multiple oxide. The transition metal includes, for example, metal elements of group 3 in the periodic table such as yttrium and cerium, metal elements of group 4 in the periodic table such as titanium, zirconium, and hafnium, metal elements of group 5 in the periodic table such as niobium and tantalum, metal elements of group 6 in the periodic table such as tungsten, and metal elements of group 8 in the periodic table such as iron. Metal elements of group 10 in the periodic table include zinc, etc. Metal elements of group 13 in the periodic table include aluminum, indium, etc. Metal elements of group 14 in the periodic table include germanium, tin, etc.

Representative metal oxide particles include, for example, metal oxide particles containing at least one non-silicon-based metal selected from titanium, zirconium, aluminum, and zinc.

When a cured product exhibiting a high refractive index is formed by using the curable liquid composition, the metal oxide particle is preferably a metal oxide particle containing at least one selected from zirconium and titanium, and more preferably a zirconium oxide particle and a titanium oxide particle.

The metal oxide may be a natural product such as a mineral or a synthetic product. The synthetic product of the metal oxide may be a hydrolyzed condensate obtained by hydrolyzing and condensing a hydrolyzable and condensable compound containing a metal atom such as a metal alkoxide. Such a hydrolyzed condensate may be a metal oxide obtained by a so-called sol-gel method.

On the surface of the metal oxide particle, functional groups such as a hydroxyl group and a hydrolyzable and condensable group such as an alkoxy group, are often directly bonded to the metal atom.

The hydrolyzable and condensable compound that can be used for producing the metal oxide particle includes a compound having at least one hydrolyzable and condensable group directly bonded to a metal atom such as a zirconium atom or a titanium atom. The hydrolyzable and condensable group includes, for example, an alkoxy group, an aryloxy group, a halogen atom, a hydroxy group, etc. A representative hydrolyzable and condensable metal compound includes a metal alkoxide. These hydrolyzable and condensable metal compounds may be used singly or in combination of two or more.

An average particle diameter (average primary particle diameter) of the metal oxide particle is not particularly limited but may be usually a nanometer size. For example, a volume average particle diameter (cumulative volume particle diameter of 50%) of the metal oxide particles is preferably 1,000 nm or less, more preferably 700 nm or less, still more preferably 500 nm or less, further still more preferably 300 nm or less, and particularly preferably 100 nm or less. More specifically, the average particle diameter of the metal oxide particles is preferably 1 nm or more and 800 nm or less, more preferably 1 nm or more and 600 nm or less, still more preferably 2 nm or more and 400 nm or less, further still more preferably 3 nm or more and 200 nm or less, and particularly preferably 5 nm or more and 70 nm or less. In order to secure sufficient transparency of a cured product, the average particle diameter of the metal oxide is preferably 50 nm or less and more preferably 30 nm or less. More specifically, the average particle diameter of the metal oxide is preferably 40 nm or less, more preferably 35 nm or less, and still more preferably 25 nm or less. The lower limit is preferably small, for example, 1 nm or more.

Other suitable examples of the particulate filler (A) include quantum dots. As long as the quantum dots are fine particles showing a function as quantum dots, the structure and constituents thereof are not particularly limited. The quantum dots are a nanoscale material having particular optical characteristics according to quantum mechanics (quantum-confined effect described below), and commonly mean semiconductor nanoparticles. In the description, the quantum dots also include quantum dots in which the surface of semiconductor nanoparticles is further covered to improve a luminescent quantum yield (quantum dots having a shell structure described below) and quantum dots which are surface-modified for stabilization.

The quantum dots are considered as semiconductor nanoparticles which absorb photons having energy larger than a band gap (a difference in energy between a valence band and a conduction band) and emit light with a wavelength depending on the particle diameter thereof. Examples of elements included in materials for the quantum dots include one or more selected from the group consisting of group II elements (group 2A, group 2B), group III elements (particularly group 3A), group IV elements (particularly group 4A), group V elements (particularly group 5A), and group VI elements (particularly group 6A). Examples of preferred compounds or elements as materials for the quantum dots include group II-VI compounds, group III-V compounds, group IV-VI compounds, group IV elements, group IV compounds and combinations thereof.

Examples of group II-VI compounds include at least one compound selected from the group consisting of CdSe, CdTe, ZnS, ZnSe, ZnTe, ZnO, HgS, HgSe, HgTe, MgSe, MgS and mixtures thereof; at least one compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof; and at least one compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and mixtures thereof.

Examples of group III-V compounds include at least one compound selected from GaN, GaP, GaAs, GaSb, AlN, Alp, AlAs, AlSb, InN, InP, InAs, InSb and mixtures thereof; at least one compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP and mixtures thereof; and at least one compound selected from GaAlNAs, GaAl-NSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures thereof.

Examples of group IV-VI compounds include at least one compound selected from SnS, SnSe, SnTe, PbS, PbSe, PbTe and mixtures thereof; at least one compound selected from SnSeS, SnSeTe, SnSTe, PbSeS, PbSeTe, PbSTe, SnPbS, SnPbSe, SnPbTe and mixtures thereof; and at least one compound selected from SnPbSSe, SnPbSeTe, SnPbSTe and mixtures thereof.

Examples of group IV elements include at least one compound selected from Si, Ge and mixtures thereof. Examples of group IV compounds include at least one compound selected from SiC, SiGe and mixtures thereof.

The structure of quantum dots can be a homogeneous structure made of one compound, or a composite structure made of two or more compounds. In order to improve luminescent quantum yields of the above compounds, the structure of quantum dots is preferably a core-shell structure in which the core is covered with one or more shell layers, and more preferably a structure in which the surface of a particle of the compound, a core material, is epitaxially covered with a semiconductor material. When group II-VI CdSe, for example, is used as a core material, ZnS, ZnSSe and the like are used as its covering layer (shell). The shell preferably has the same lattice constant as a core material has, and a material combination in which the difference in the lattice constant between the core and shell is small is properly selected.

The quantum dots preferably include a compound including Cd or In as a constituent from the viewpoint of fluorescence efficiency, and more preferably include a compound including In as a constituent when taking into account safety.

Specific suitable examples of quantum dots of the homogeneous structure type not having a shell layer include $AgInS_2$ and Zn-doped $AgInS_2$. Examples of quantum dots of the core-shell type include InP/ZnS, InP/ZnSSe, $CuInS_2$/ZnS, and ($ZnS/AgInS_2$) solid solution/ZnS. It should be noted that materials for quantum dots (A) of the core-shell type are described as (core material)/(shell layer material) in the above description.

In addition, a shell of the core-shell structure has preferably a multi-layer structure from the viewpoint of improvement of safety and a luminescent quantum yield and more preferably two layers. In a core-multilayer shell structure, the material of the core is preferably at least one compound selected from the group consisting of InP, ZnS and ZnSe, and more preferably includes InP. The proportion of InP included is 50% by mass or more and 100% by mass or less of the total mass of the core, preferably 60% by mass or more and 99% by mass or less, and more preferably 82% by mass or more and 95% by mass or less. In addition, the proportion of ZnS and/or ZnSe included is 0% by mass or more and 50% by mass or less of the total mass of the core, preferably 1% by mass or more and 40% by mass or less, and more preferably 5% by mass or more and 18% by mass or less.

In a multilayer shell structure, a material for the first shell is preferably one or more selected from ZnS, ZnSe and ZnSSe. The proportion of one or more selected from ZnS, ZnSe and ZnSSe included is for example 50% by mass or more and 100% by mass or less, preferably 75% by mass or more and 98% by mass or less, and more preferably 80% by mass or more and 97% by mass or less based on the total mass of the first shell. When a material for the first shell is a mixture of ZnS and ZnSe, the mixing ratio (mass ratio) is not particularly limited, and is 1/99 or more and 99/1 or less, and preferably 10/90 or more and 90/10 or less.

In a multilayer shell structure, the second shell is grown on the surface of the first shell. A material for the second shell is preferably equivalent to the material for the first shell (however, differences in the lattice constant with respect to the core differ from each material. That is, a case where 99% or more in the materials have the same quality is excluded). The proportion of one or more selected from ZnS, ZnSe and ZnSSe included is for example 50% by mass or more and 100% by mass or less, preferably 75% by mass or more and 98% by mass or less and more preferably 80% by mass or more and 97% by mass or less based on the total mass of the second shell. When a material for the second shell is a mixture of two selected from ZnS, ZnSe and ZnSSe, the mixing ratio (mass ratio) is not particularly limited, and is 1/99 or more and 99/1 or less, and 10/90 or more and 90/10 or less.

The first shell and the second shell in a multilayer shell structure have different lattice constants. A difference in the lattice constant between the core and the first shell for example is 2% or more and 8% or less, preferably 2% or more and 6% or less, and more preferably 3% or more and 5% or less. In addition, a difference in the lattice constant between the core and the second shell is 5% or more and 13% or less, preferably 5% or more and 12% or less, more preferably 7% or more and 10% or less, and further preferably 8% or more and 10% or less.

In addition, a difference in the lattice constant between the first shell and the second shell is for example 3% or more and 9% or less, preferably 3% or more and 7% or less, and more preferably 4% or more and 6% or less.

The quantum dots by these core-multilayer shell structures can have an emission wavelength in a range of 400 nm or longer and 800 nm or shorter (furthermore a range of 470 nm or longer and 680 nm or shorter, particularly a range of 600 nm or longer and 680 nm or shorter in case of red emission, and 520 nm or longer and 580 nm or shoter incase of green emission).

Examples of the quantum dots by these core-multilayer shell structures include InP/ZnS/ZnSe and InP/ZnSe/ZnS.

Two or more of the above quantum dots may be used in combination. Quantum dots of the core-(multilayer) shell type and quantum dots of the homogeneous structure type may be used in combination.

The average particle diameter of the quantum dots is not particularly limited as long as the particles can function as quantum dots. The average diameter of the quantum dots is preferably 0.5 nm or more and 30 nm or less, and more preferably 1.0 nm or more and 15 nm or less as a particle diameter of a primary particle. In quantum dots of the core-(multilayer) shell type, the size of core is for example 0.5 nm or more and 10 nm or less, and preferably 2 nm or more and 5 nm or less. The average thickness of the shell is preferably 0.4 nm or more and 2 nm or less, and more preferably 0.4 nm or more and 1.4 nm or less. When the shell includes the first shell and the second shell, the average thickness of the first shell is for example 0.2 nm or more and 1 nm or less, and preferably 0.2 nm or more and 0.7 nm or less. The average thickness of the second shell does not depend on the average thickness of the first shell, and is for example 0.2 nm or more and 1 nm or less, and preferably 0.2 nm or more and 0.7 nm or less.

The quantum dots having an average particle diameter within such range show a quantum-confined effect and function well as quantum dots, and moreover are easily prepared and have stable fluorescence characteristics. It should be noted that the average particle diameter of quantum dots can be defined by, for example, applying a dispersion liquid of quantum dots onto a substrate and drying the liquid, removing a volatile component and then observing the surface with a transmission electron microscope (TEM). Typically, this average particle diameter can be defined as the number average diameter of circle equivalent diameters of particles obtained by image analysis of the TEM image.

The shape of quantum dots is not particularly limited. Examples of the shape of quantum dots include a spherical shape, a spheroid shape, a cylindrical shape, a polygonal shape, a disk shape, a polyhedral shape and the like. Among these, a spherical shape is preferred from the viewpoint of handleability and availability.

Because the characteristics of the cured film formed using the curable liquid composition as a wavelength conversion film are good, the quantum dots preferably include one or more selected from the group consisting of a compound having a fluorescence maximum in a wavelength range of 520 nm or longer and 580 nm or shorter, and a compound having a fluorescence maximum in a wavelength range of 600 nm or longer and 680 nm or shorter.

A method for producing quantum dots is not particularly limited. Quantum dots produced by various well-known methods can be used as the quantum dots. As the method for producing the quantum dots, for example, a method in which an organometallic compound is thermally decomposed in a coordinating organic solvent can be used. In addition, the quantum dots of the core-shell structure type can be produced by a method in which homogeneous cores are formed by reaction and then a shell layer precursor is allowed to react in the presence of dispersed cores to form a shell layer. In addition, for example, quantum dots having the above core-multilayer shell structure can be produced by the method described in WO 2013/127662. It should be noted that various commercially available quantum dots can also be used.

In addition to the aforementioned metal oxide particles and quantum dots, particles such as silica, glass beads, calcium carbonate, magnesium carbonate, calcium sulfate, barium sulfate, aluminum hydroxide, magnesium hydroxide, calcium sulfite, barium sulfate, calcium silicate, potassium titanate, lead zirconate titanate, zinc borate, barium metaborate, calcium borate, and sodium borate, can be used as the particulate fillers (A).

To the surface of the particulate filler (A) described above is bonded a ligand (a1) having an alicyclic epoxy group that may be condensed with an aromatic ring and a thiol group. To the surface of the particulate filler may be bonded a ligand (a2) other than the ligand (a1) together with the ligand (a1) as long as the object of the present invention is not impaired. The number of alicyclic epoxy groups and the number of thiol groups that ligand (a1) has are not particularly limited, but it is preferably 1 or 2, respectively, and more preferably 1. A structure of the main skeleton of ligand (a1) that is a portion other than the alicyclic epoxy group and the thiol group in ligand (a1), is not particularly limited. The structure of the main skeleton may be linear, branched, cyclic, or a combination thereof.

The main skeleton may be a hydrocarbon group or a group containing a heteroatom other than carbon and hydrogen. The hetero atom includes, for example, O, N, S, P, B, Si, a halogen atom, etc. The main skeleton may have a substituent other than the alicyclic epoxy group and the thiol group. The types of other substituents are not particularly limited. The other substituent is preferably a substituent that does not react with the epoxy group. Namely, preferably, the ligand (a1) does not have a group capable of reacting with the epoxy group. Substituents capable of reacting with the epoxy group include an amino group, a N-substituted amino group, a N, N-di-substituted amino group, a carboxy group, a dicarboxylic acid anhydride group, and a phenolic hydroxyl group.

As the ligand (a1), a compound represented by the following formula (A1) is preferred.

$$HS-R^1-R^2 \quad (A1)$$

wherein in formula (A1), $R^1$ is a divalent chain linking group, and $R^2$ is an alicyclic epoxy group that may have a substituent and may be condensed with an aromatic ring.

A structure of the chain linking group as $R^1$ may be linear or branched. The chain linking group as $R^1$ may be a hydrocarbon group or a group containing a heteroatom other than carbon and hydrogen. The hetero atom includes, for example, O, N, S, P, B, Si, a halogen atom, etc.

The chain linking group as $R^1$ that is the groups represented by the following formulas (A1-a) to (A1-h), is preferred. In the following formulae (A1-a) to (A1-h), a single bond on the side bonds to the thiol group, and a single bond on the ** side bonds to $R^2$. In the following formulae (A1-a) to (A1-h), $R^{10}$ to $R^{24}$ and $R^{26}$ to $R^{28}$ are independently alkylene groups having 1 or more and 8 or less carbon atoms. $R^{25}$ is a single bond or an alkylene group having 1 or more and 8 or less carbon atoms. Among these linking groups, the compounds represented by formulae (A1-c) to (A1-g) are preferred because the compound represented by formula (A1) is facilitated to be synthesized.

$$*-R^{10}-** \quad (A1\text{-}a)$$

$$*-R^{11}-O-** \quad (A1\text{-}b)$$

$$*-R^{12}-S-R^{13}-** \quad (A1\text{-}c)$$

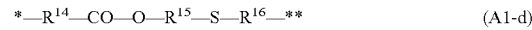
$$*-R^{14}-CO-O-R^{15}-S-R^{16}-** \quad (A1\text{-}d)$$

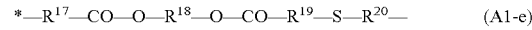
$$*-R^{17}-CO-O-R^{18}-O-CO-R^{19}-S-R^{20}- \quad (A1\text{-}e)$$

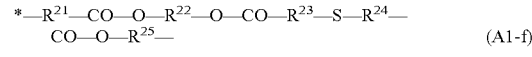
$$*-R^{21}-CO-O-R^{22}-O-CO-R^{23}-S-R^{24}-$$
$$CO-O-R^{25}- \quad (A1\text{-}f)$$

$$*-R^{26}-CO-O-** \quad (A1\text{-}g)$$

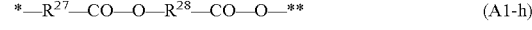
$$*-R^{27}-CO-O-R^{28}-CO-O-** \quad (A1\text{-}h)$$

Suitable examples of the alkylene group as $R^{10}$ to $R^{24}$ and $R^{26}$ to $R^{28}$ include a methylene group, an ethane-1,2-diyl group (an ethylene group), a propane-1,3-diyl group, a propane-1,2-diyl group, a butane-1,4-diyl group, a pentane-1,5-diyl group, a hexane-1,6-diyl group, a heptane-1,7-diyl group, and an octane-1,8-diyl group. Among these alkylene group, the ethane-1,2-diyl group (the ethylene group), the propane-1,3-diyl group, and the propane-1,2-diyl group are preferred, and the propan-1,2-diyl group is more preferred.

Suitable specific examples of the alkylene group as $R^{25}$ are the same as the suitable specific examples of the alkylene groups as $R^{10}$ to $R^{24}$ and $R^{26}$ to $R^{28}$. $R^{25}$ is preferably a single bond or a methylene group.

For example, when the compound represented by formula (A1) has a group represented by formula (A1-c) as $R^1$, the compound represented by formula (A1) can be synthesized by a thiol-ene reaction between the dithiol compound represented by HS—$R^{12}$—SH and the unsaturated epoxy compound represented by $R^{29}$—$R^2$. $R^{29}$ is an alkenyl group giving $R^{13}$.

When the compound represented by formula (A1) has the group represented by formula (A1-d) as $R^1$, the compound represented by formula (A1) can be synthesized by the thiol-ene reaction between the dithiol compound represented by HS—$R^{14}$—CO—O—$R^{15}$—SH and the unsaturated epoxy compound represented by $R^{30}$—$R^2$. $R^{30}$ is an alkenyl group giving $R^{16}$.

When the compound represented by formula (A1) has the group represented by formula (A1-e) as $R^1$, the compound represented by formula (A1) can be synthesized by the thiol-ene reaction between the dithiol compound represented by HS—$R^{1-7}$—CO—O—$R^{12}$—O—CO—$R^{19}$—SH and the unsaturated epoxy compound represented by $R^{31}$—$R^2$. $R^{31}$ is an alkenyl group giving $R^{20}$.

When the compound represented by formula (A1) has the group represented by formula (A1-f) as $R^1$, the compound represented by the formula (A1) can be synthesized by the thiol-ene reaction between the dithiol compound represented by HS—$R^{21}$—CO—O—$R^{22}$—O—CO—$R^{23}$—SH and the unsaturated epoxy compound represented by $R^{32}$—CO—O—$R^{25}$—$R^2$. $R^{32}$ is an alkenyl group giving $R^{265}$.

When the compound represented by formula (A1) has the group represented by formula (A1-g) as $R^1$, the compound represented by the formula (A1) can be synthesized by condensing the mercapto carboxylic acid represented by HS—$R^{26}$—COOH and the epoxy alcohol compound represented by HO—$R^2$, or by reacting the mercapto carboxylic acid represented by HS—$R^{26}$—COOH with one of the epoxy groups of a diepoxide compound that gives $R^2$. In the latter case, when the reaction using the epoxide compound is carried out, a hydroxyl group is generated in $R^2$ at a position adjacent to the position bonded with the ester group on $R^2$.

When the compound represented by formula (A1) has the group represented by formula (A1-g) as $R^1$, the compound represented by formula (A1) can be synthesized by condensing the mercapto carboxylic acid represented by HS—$R^{27}$—CO—O—$R^{28}$—COOH and the epoxy alcohol compound represented by HO—$R^2$, or by reacting the mercapto carboxylic acid represented by HS—$R^{27}$—CO—O—$R^{28}$—COOH with one of the epoxy groups of a diepoxide compound that gives $R^2$. In the latter case, when the reaction using the epoxide compound is carried out, a hydroxyl group is generated in $R^2$ at a position adjacent to the position bonded with the ester group on $R^2$.

In formula (A1), $R^2$ is an alicyclic epoxy group that may have a substituent and may be condensed with an aromatic ring. The alicyclic epoxy group is an aliphatic cyclic group having at least one oxygen atom forming an oxirane ring together with a C—C bond of the aliphatic cyclic group. The aliphatic ring that is the main skeleton of the alicyclic epoxy group, is a ring that does not exhibit aromaticity. The aliphatic ring may be monocyclic or polycyclic.

An atom constituting a ring in the aliphatic ring includes a carbon atom, an oxygen atom, a nitrogen atom, a sulfur atom, a selenium atom, a phosphorus atom, a boron atom, and a hetero atom such as a silicon atom.

The aliphatic ring that is the main skeleton of the alicyclic epoxy group, may have one or more substituents as long as the object of the present invention is not impaired. Examples of the substituents include an alkyl group having 1 to 4 carbon atoms, an alkoxy group having 1 to 4 carbon atoms, an alkylthio group having 1 to 4 carbon atoms, and an acyl group having 2 to 4 carbon atoms, an acyloxy group having 2 to 4 carbon atoms, an oxo group (=O), a thioxo group (=S), a halogen atom, a cyano group, etc.

An aromatic ring that may be condensed with the alicyclic epoxy group includes a benzene ring and a naphthalene ring, and a benzene ring is preferable.

Suitable examples of the aliphatic rings include a cycloalkane ring; a polycycloalkane ring such as a bicycloalkane ring, a tricycloalkane ring, and a tetracycloalkane ring; and an oxocycloalkane ring which a hydrogen atom is removed from an cycloalkanone ring.

Specific examples of the cycloalkane ring include a cyclopentane ring, a cyclohexane ring, a cycloheptane ring, a cyclooctane ring, a cyclononane ring, a cyclodecane ring, a cycloundecane ring, a cyclododecane ring, and the like. Specific examples of the polycycloalkane ring include an adamantane ring, a norbornane ring, an isobornane ring, a tricyclodecane ring, a tetracyclododecane ring, and the like. Specific examples of the oxocycloalkane ring include a 2-oxocyclopentane ring, a 3-oxocyclopentane ring, a 2-oxocyclohexane ring, a 3-oxocyclohexane ring, a 4-oxocyclohexane ring, a 2-oxocycloheptane ring, a 3-oxocycloheptane ring, a 4-oxocycloheptane ring, a 2-oxocyclooctane ring, a 3-oxocyclooctane ring, a 4-oxocyclooctane ring, a 5-oxocyclooctane ring, and the like.

Suitable examples of the alicyclic epoxy group as $R^2$ include a 1,2-epoxycyclopentane-3-yl group, a 1,2-epoxycyclopentane-4-yl group, a 1,2-epoxycyclohexane-3-yl group, a 1,2-epoxycyclohexane-4-yl group, a 1,2-epoxycyloheptane-3-yl group, a 1,2-epoxycyloheptane-4-yl group, a 1,2-epoxycyloheptane-5-yl group, a 2,3-epoxynorbornane-5-yl group, a 3,4-epoxytricyclo[5.2.1.0$^{2,6}$]decane-1-yl group, a 3,4-epoxytricyclo[5.2.1.0$^{2,6}$]decane-8-yl group, and a 3,4-epoxytricyclo[5.2.1.0$^{2,6}$]decane-9-yl group.

The compound represented by formula (A1) is preferably the compound represented by the following formula (A1-1) in terms of facilitating a desired effect to be obtained by using it as a ligand and facilitation of synthesis.

HS—$R^3$—S—$R^4$—$R_2$         (A1-1)

In the formula (A1-1), $R^2$ is an alicyclic epoxy group that may have a substituent and may be condensed with an aromatic ring, $R^3$ is a divalent chain linking group, and $R^4$ is an alkylene group.

The group represented by —$R^3$—S—$R^4$— in formula (A1-1) is preferably a group represented by the aforementioned formula (A1-c), formula (A1-d), or formula (A1-e).

The compound represented by formula (A1-1) that is a compound in which $R^2$ is an epoxycycloalkyl group having 5 or more and 8 or less carbon atoms and $R^4$ is an alkylene group having 2 or more and 4 or less carbon atoms, is preferable.

Preferred specific examples of the compound represented by the formula (A1) include the following compounds.

11  12
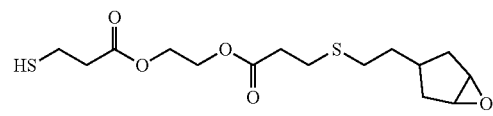
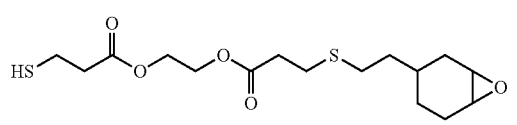
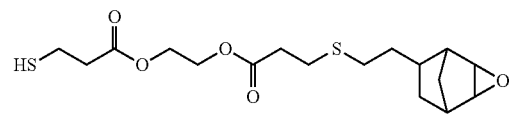
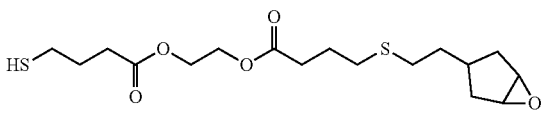
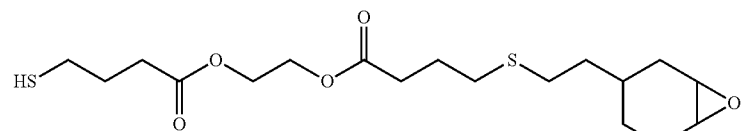
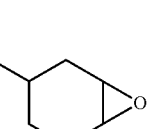
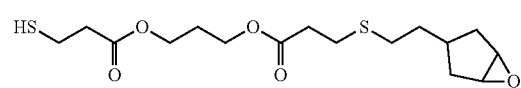
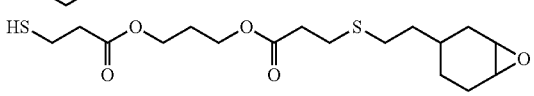
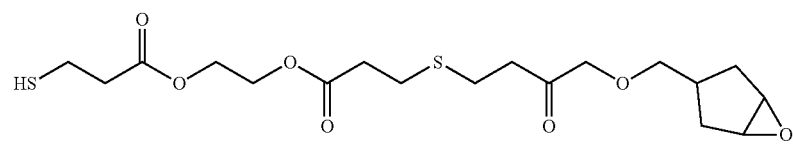
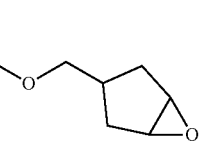
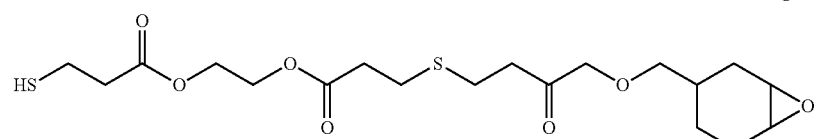
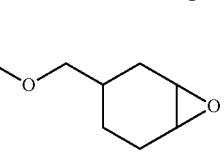
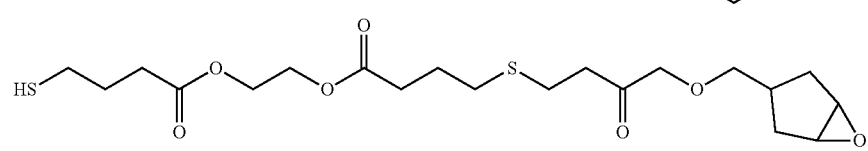
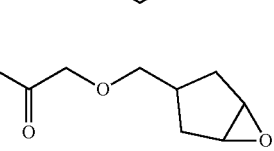
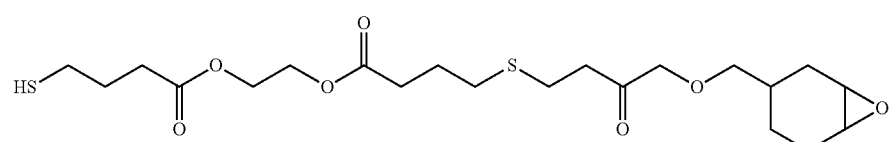
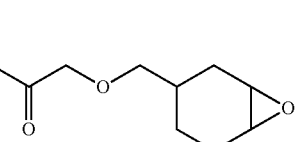
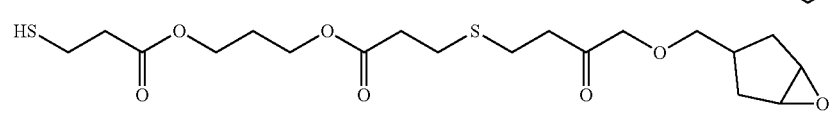
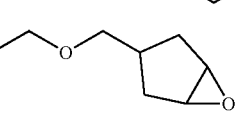
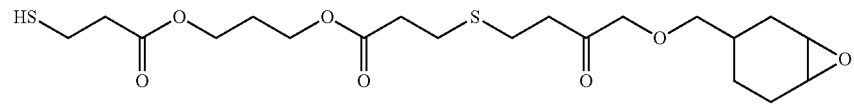
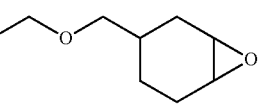
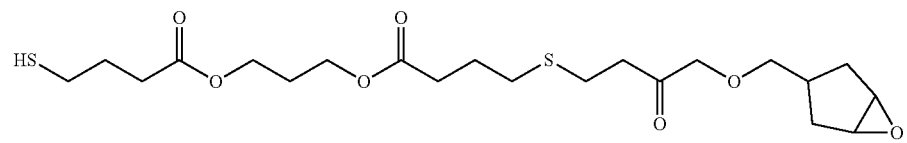
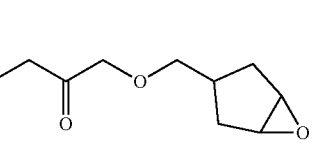
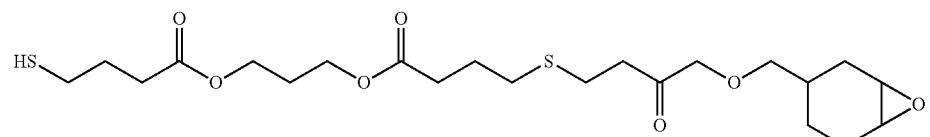
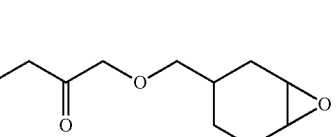
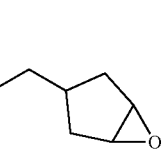

-continued

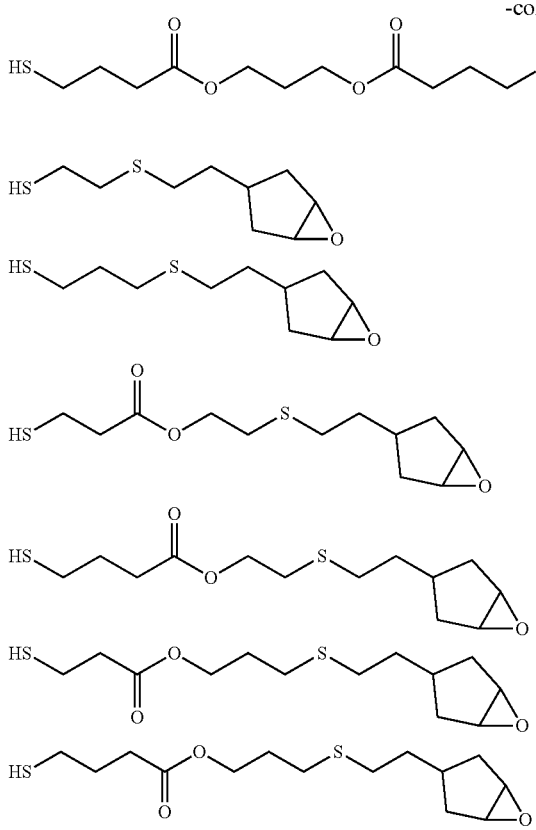
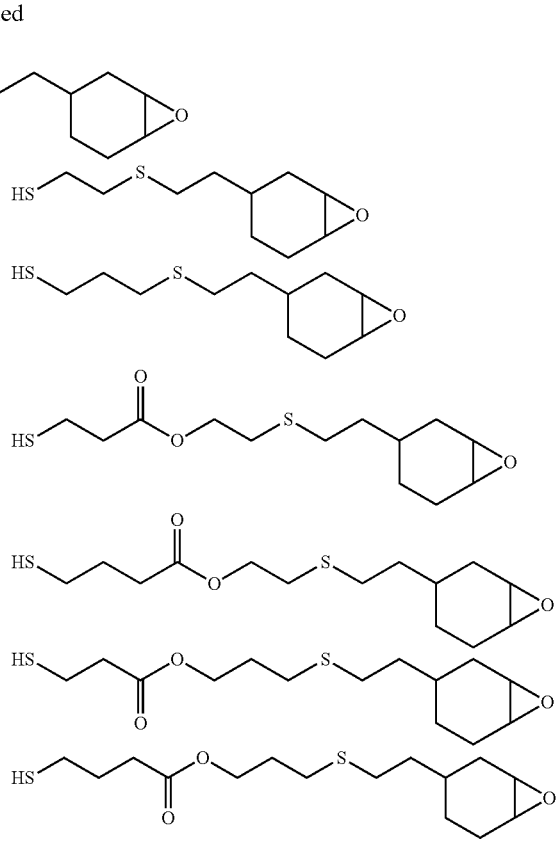

The method for bonding the ligand (a1) to a surface of the raw material particle of the particulate filler (A) is not particularly limited. For example, by mixing the raw material particles of the particulate fillers (A) and the ligand (a1) while heating at an elevated temperature, a particulate filler (A), on the surface of which the ligand (a1) is provided, can be obtained. A heating temperature is, for example, preferably 100° C. or higher and 300° C. or lower, more preferably 120° C. or higher and 280° C. or lower, and still more preferably 140° C. or higher and 270° C. or lower. A mixing time upon heating is, for example, preferably 5 minutes or longer and 12 hours or shorter and more preferably 10 minutes or longer and 6 hours or shorter. An amount of the ligand (a1) for use is not particularly limited as long as it does not impair the object of the present invention, and is preferably 150 parts by mass or more and 1,000 parts by mass or less based on 100 parts by mass of the raw material particles of particulate fillers (A), and it is more preferably 200 parts by mass or more and 800 parts by mass or less. Bonding treatment of ligand (a1) with the raw material particle of particulate filler (A) may be carried out in the presence of a dispersion medium. Examples of such a dispersion medium include an aliphatic hydrocarbon having 15 or more and 25 or less carbon atoms. An amount of such a dispersion medium used is not particularly limited.

Moreover, by preparing the particulate filler (A) in a state where a large excess amount of ligand (a1) is present relative to the raw material of the particulate filler (A) according to a conventional method, a particulate filler (A), on the surface of which the ligand (a1) is bonded, can be prepared.

Further, ligand exchange can be generated by heating the particulate filler (A), on the surface of which a ligand other than the ligand (a1) is bonded in the presence of an excess amount of the ligand (a1) based on the particulate filler (A). As a result of the ligand exchange, a particulate filler (A), on the surface of which the ligand (a1) is bonded as a ligand, can be obtained. It is not necessary to replace all the ligands other than the ligand (a1) with the compound represented by formula (A1). To the surface of the particulate filler (A) may be bonded a ligand (a2) other than the ligand (a1) together with the ligand (a1).

The ligand (a2) other than the ligand (a1) includes, for example, phosphorus compounds such as phosphine, phosphine oxide, and trialkylphosphins; organic nitrogen compounds such as pyridine, aminoalcans, and tertiary amines; organic sulfur compounds such as mercapto alcohol, thiol, dialkyl sulfides and dialkyl sulfoxides; and surface modifiers (organic ligands) such as a higher fatty acid and alcohols.

Since the particulate filler (A) to which the ligand is bonded is facilitated to be prepared, other ligand (a2) that is represented by the following formula (1):

R—SH    (1)

wherein in formula (1) R is an aliphatic hydrocarbon group having 6 or more and 18 or less carbon atoms is preferred. R in formula (1) is an aliphatic hydrocarbon group. A structure of the aliphatic hydrocarbon group may be a linear chain, a branched chain, a cyclic chain, or a combination of these structures. Among these structures, a linear or branched chain is preferable, and the linear chain is more preferable. The aliphatic hydrocarbon group as R may contain one or more unsaturated bonds. The unsaturated bond may be a double bond or a triple bond.

Suitable specific examples of the compound rpresented by the formula (1) include a 1-hexanethiol, a 1-heptanethiol, a 1-ocatnehiol, a 2-ethyl-1-hexanethiol, a 1-nonanethiol, a 1-decanethiol, a 1-undecanethiol, a 1-dodecanethiol, a 1-tridecanethiol, a 1-tetradecanethiol, a 1-pentadecanethiol, a 1-hexadecanethiol, a 1-heptadecanethiol, and a 1-octadecanethiol.

Ligand exchange can be carried out by heating the particulate filler (A) to which the aforementioned other ligand (a2) is bonded together with a sufficient amount of the ligand (a1) for the ligand exchange. Specifically, an amount of the ligand (a1) for use upon the ligand exchange is preferably 2 times or more by mass and more preferably 6 times or more by mass, relative to the mass of other ligand (a2) that was used when preparing (A) containing quantum dots, to which another ligand (a2) was bonded for the ligand exchange. An upper limit of the amount for use is not particularly limited, and is preferably 20 times by mass or less, and more preferably 15 times by mass or less based on the mass of other ligand (a2) that was used when preparing the particulate filler (A) to which another ligand (a2) was bonded for the ligand exchange.

A heating temperature for ligand exchange is, for example, preferably 150° C. or higher and 300° C. or lower, more preferably 160° C. or higher and 280° C. or lower, and still more preferably 170° C. or higher and 270° C. or lower. A heating time is not particularly limited, but for example, it is preferably 1 minute or longer and 1 hour or shorter, more preferably 2 minutes or longer and 30 minutes or shorter, and still more preferably 5 minutes or longer and 20 minutes or shorter.

Ligand exchange may be conducted under pressure conditions (usually under the atmospheric pressure) upon heating in the presence of a dispersion medium having a boiling point higher than the heating temperature. Examples of such a dispersion medium include an aliphatic hydrocarbon having 15 or more and 25 or less carbon atoms. An amount of such a dispersion medium used is not particularly limited.

After completion of the heating, a dispersion liquid containing the particulate filler (A) is cooled. A temperature of the dispersion liquid after cooling is preferably a temperature at which the ligand (a1) and the dispersion medium do not solidify. Typically, the temperature of the dispersion liquid after cooling is preferably 0° C. or higher and 60° C. or lower, more preferably 5° C. or higher and 50° C. or lower, and still more preferably 10° C. or higher and 40° C. or lower.

The particulate filler (A) after cooling is recovered by a method such as filtration or centrifugation. In order to reduce a content of the dispersion medium for the recovered particulate filler (A) and a content of the ligand not being attached to the particulate filler (A), dispersion liquid for the particulate filler (A) that is subjected to filtration or centrifugation, is preferably diluted with an inert organic solvent such as hexane, cyclohexane, methanol or ethanol. Moreover, the quantum dots recovered from the dispersion liquid may be washed with the aforementioned inert organic solvent.

By drying the particulate filler (A) thus obtained as needed, the particulate filler (A), on the surface of which the ligand (a1) is bonded, can be obtained. If there is no particular adverse effect on a curing reaction of the curable liquid composition or physical properties of the cured product of the curable liquid composition, the dispersion liquid for the particulate filler (A) before being subjected to filtration, centrifugation, etc., can be used as it is for preparation of the curable liquid composition.

A content of the particulate filler (A) of the curable liquid composition may be appropriately adjusted according to use thereof, and is, for example, 0.1% by mass or more and 90% by mass and preferably 5% by mass or more and 80% by mass or less based on a solid content of the curable liquid composition. For example, when the particulate filler (A) contains quantum dots, zirconium oxide, or titanium oxide, the content of the particulate filler (A) is preferably 0.1 parts by mass or more and 30 parts by mass or less, more preferably 1 part by mass or more and 25 parts by mass or less, and still more preferably 2 parts by mass or more and 20 parts by mass or less, relative to 100 parts by mass of the curable liquid composition excluding the mass of the organic solvent (S). The mass of the ligand bonded to the particulate filler (A) is included in the mass of the particulate filler (A).

<Epoxy Compound (B)>

The curable liquid composition contains an epoxy compound (B). The epoxy compound (B) has a non-aromatic cyclic group having 5 or more annular atoms. By containing a particulate filler (A) to which a ligand having a specific structure having an alicyclic epoxy group is bonded, and an epoxy compound (B) having a non-aromatic cyclic group having 5 or more annular atoms in combination thereof, the dispersion stability of the particulate filler (A) in the curable liquid composition is favorable.

The epoxy compound (B) may be a polymer having an epoxy group, and is preferably a non-polymer. This is because it facilitates a curable liquid composition having satisfactory fluidity to be prepared even if a content of the organic solvent (S) is small. The epoxy compound (B) is preferably liquid at 20° C. because the curable liquid composition has satisfactory fluidity even if a content of the organic solvent (S) in the curable liquid composition is small.

An upper limit of the number of annular atoms of the non-aromatic cyclic group that the epoxy compound (B) has, is not particularly limited as long as it does not impair the object of the present invention. The number of annular atoms of the non-aromatic cyclic group may be, for example, 20 or less, 16 or less, or 12 or less.

The non-aromatic cyclic group is a cyclic group that does not exhibit aromaticity. The non-aromatic cyclic group may be an aliphatic cyclic group containing a carbon atom or a cyclic group containing no carbon atom such as a cyclic siloxane group. The non-aromatic cyclic group may be a monocyclic group or a polycyclic group.

The atom constituting a ring in the non-aromatic cyclic group includes a carbon atom, an oxygen atom, a nitrogen atom, a sulfur atom, a selenium atom, a phosphorus atom, a boron atom, and a hetero atom such as a silicon atom.

The non-aromatic cyclic group may have one or more substituents as long as the object of the present invention is not impaired. Examples of the substituents are an alkyl group having 1 or more and 4 or less carbon atoms, an alkoxy group having 1 or more and 4 or less carbon atoms, an alkylthio group having 1 or more and 4 or less carbon atoms, an acyl group having 2 or more and 4 or less carbon atoms, an acyloxy group having 2 or more and 4 or less carbon atoms, an oxo group (=O), a thioxo group (=S), a halogen atom, a cyano group, etc. They are examples of substituents, and the structures of the substituents are not particularly limited.

To the extent that the object of the present invention is not impaired, for example, the non-aromatic cyclic group may have epoxy group-containing groups such as a glycidyl group, a glycidyl oxy group, a glycidyl oxycarbonyl group, and an epoxycyclohexylmethyl group as substituents. In the case of the epoxy compound (B) being a photopolymerizable compound having an unsaturated bond, the non-aromatic cyclic group may have an acryloyl group, a methacryloyl group, an acryloyloxy group, a methacryloyloxy group, etc., as substituents. Moreover, the non-aromatic cyclic group preferably has a vinyloxy group as a cationically polymerizable group.

Hereinafter, specific examples of the epoxy compound (B) will be described in order.

The epoxy compound is not particularly limited as long as it is an epoxy compound that can be cured by heating singly or by an action of a heat-sensitive curing agent or a photosensitive curing agent. The epoxy compound preferably has two or more epoxy groups.

When the epoxy compound has the non-aromatic cyclic group, the non-aromatic cyclic group contained in the epoxy compound is not particularly limited. The non-aromatic cyclic group may have a cyclic structure containing carbon as an annular element, such as a cyclic hydrocarbon group or an aliphatic heterocyclic group and may be a cyclic structure not containing carbon as an annular element, such as a cyclic siloxane group.

A preferred ring structure of the non-aromatic cyclic group of the epoxy compound includes, for example, a monocycloalkane ring, a bicycloalkane ring, a tricycloalkane ring, a tetracycloalkane ring, etc. Specifically, monocycloalkane rings such as a cyclopentane ring, a cyclohexane ring, a cycloheptane ring, and a cyclooctane ring, an adamantane ring, a norbornane ring, an isobornane ring, a tricyclodecane ring, and a tetracyclododecane ring, are included.

Suitable examples of the epoxy compound include polyfunctional alicyclic epoxy compound having an alicyclic epoxy group. Specific examples of the alicyclic epoxy compound include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl) ether of ethylene glycol, ethylenebis(3,4-epoxycyclohexanecarboxylate), a polyfunctional epoxy compound having a tricyclodecene oxide group, and compounds represented by the following formulas (b1-1) to (b1-5). These alicyclic epoxy compounds can be used individually or two or more alicyclic epoxy compounds can be used in combination.

Examples of the linking group Z can include a divalent group selected form the group consisting of a divalent hydrocarbon group, —O—, —O—CO—, —S—, —SO—, —SO$_2$—, —CBr$_2$—, —C(CBr$_3$)$_2$—, —C(CF$_3$)$_2$— and —R$^{b19}$—O—CO—, and a group formed by bonding a plural of these divalent groups, and the like.

Examples of the divalent hydrocarbon group as a linking group Z can include a linear or branched alkylene group having 1 or more and 18 or less carbon atoms, and a divalent alicyclic hydrocarbon group, and the like. Examples of the linear or branched alkylene group having 1 or more and 18 or less carbon atoms can include a methylene group, a methylmethylene group, a dimethylmethylene group, a dimethylene group, a trimethylene group, and the like.

Examples of the above divalent alicyclic hydrocarbon group can include cycloalkylene groups (including cycloalkylidene groups) such as a 1,2-cyclopentylene group, a 1,3-cyclopentylene group, a cyclopentylidene group, a 1,2-cyclohexylene group, a 1,3-cyclohexylene group, a 1,4-cyclohexylene group and cyclohexylidene, and the like.

$R^{b19}$ is an alkylene group having 1 or more and 8 or less carbon atoms and preferably a methylene group or an ethylene group.

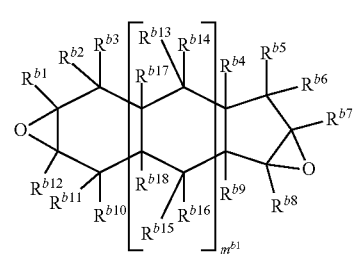

(b1-2)

In the formula (b1-2), $R^{b1}$ to $R^{b18}$ are a group selected from the group consisting of a hydrogen atom, a halogen atom and an organic group. $R^{b2}$ and $R^{b10}$ may be bonded to each other to form a ring. $R^{b13}$ and $R^{b16}$ may be bonded to each other to form a ring. $m^{b1}$ is 0 or 1.

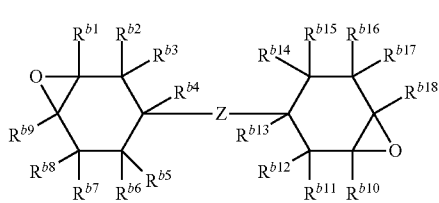

(b1-1)

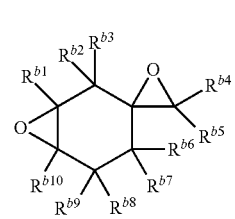

(b1-3)

In the formula (b1-1), Z represents a single bond or a linking group (a divalent group having one or more atoms). $R^{b1}$ to $R^{b18}$ are each independently a group selected from the group consisting of a hydrogen atom, a halogen atom and an organic group.

In the formula (b1-3), $R^{b1}$ to $R^{b10}$ are a group selected from the group consisting of a hydrogen atom, a halogen atom and an organic group.

$R^{b2}$ and $R^{b8}$ may be bonded to each other to form a ring.

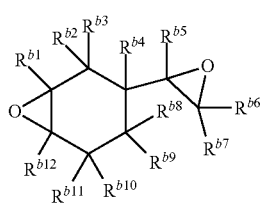
(b1-4)

In the formula (b1-4), $R^{b1}$ to $R^{b12}$ are a group selected from the group consisting of a hydrogen atom, a halogen atom and an organic group. $R^{b2}$ and $R^{b10}$ may be bonded to each other to form a ring.

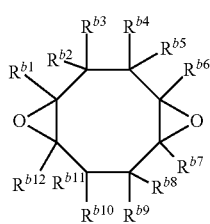
(b1-5)

In the formula (b1-5), $R^{b1}$ to $R^{b12}$ are a group selected from the group consisting of a hydrogen atom, a halogen atom and an organic group.

In the formulas (b1-1) to (b1-5), when $R^{b1}$ to $R^{b18}$ are an organic group, the organic group is not particularly limited as long as the object of the present invention is not inhibited, and the organic group may be a hydrocarbon group, or a group including a carbon atom and a halogen atom, or a group including a heteroatom such as a halogen atom, an oxygen atom, a sulfur atom, a nitrogen atom or a silicon atom, together with a carbon atom and a hydrogen atom. Examples of the halogen atom include a chlorine atom, a bromine atom, an iodine atom, a fluorine atom, and the like.

The organic group is preferably a hydrocarbon group, a group including a carbon atom, a hydrogen atom and an oxygen atom, a halogenated hydrocarbon group, a group including a carbon atom, an oxygen atom and a halogen atom, and a group including a carbon atom, a hydrogen atom, an oxygen atom and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms of the organic group is preferably 1 or more and 20 or less, more preferably 1 or more and 10 or less, and particularly preferably 1 or more and 5 or less.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group and an n-icosyl group; chain alkenyl groups such as a vinyl group, a 1-propenyl group, a 2-n-propenyl group (an allyl group), a 1-n-butenyl group, a 2-n-butenyl group and a 3-n-butenyl group; cycloalkyl groups such as a cyclopropyl group, a cyclobutyl group, a cyclopentyl group, a cyclohexyl group and a cycloheptyl group; aryl groups such as a phenyl group, an o-tolyl group, an m-tolyl group, a p-tolyl group, an α-naphthyl group, a β-naphthyl group, a biphenyl-4-yl group, a biphenyl-3-yl group, a biphenyl-2-yl group, an anthryl group and a phenanthryl group; and aralkyl groups such as a benzyl group, a phenethyl group, an α-naphthylmethyl group, a β-naphthylmethyl group, an α-naphthylethyl group and a β-naphthylethyl group.

Specific examples of the halogenated hydrocarbon group are halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group and a perfluoropentyl group, a perfluorohexyl group, a perfluoroheptyl group, a perfluorooctyl group, a perfluorononyl group and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group and a 4-fluorophenylmethyl group.

Specific examples of the group including a carbon atom, a hydrogen atom and an oxygen atom are hydroxy chain alkyl groups such as a hydroxymethyl group, a 2-hydroxyethyl group, a 3-hydroxy-n-propyl group and a 4-hydroxy-n-butyl group; hydroxycycloalkyl groups such as a 2-hydroxycyclohexyl group, a 3-hydroxycyclohexyl group and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group and a 3,5-dihydroxyphenyl group; hydroxyaralkyl groups such as a 2-hydroxyphenylmethyl group, a 3-hydroxyphenylmethyl group and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group and an n-icosyloxy group; chain alkenyloxy groups such as a vinyloxy group, a 1-propenyloxy group, a 2-n-propenyloxy group (an allyloxy group), a 1-n-butenyloxy group, a 2-n-butenyloxy group and a 3-n-butenyloxy group; aryloxy groups such as a phenoxy group, an o-tolyloxy group, an m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group and a phenanthryloxy group; aralkyloxy groups such as a benzyloxy group, a phenethyloxy group, an α-naphthylmethyloxy group, a β-naphthylmethyloxy group, an α-naphthylethyloxy group and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group and a 4-n-propoxy-n-butyloxy group; alkoxyaryl groups such as a 2-methoxyphenyl group, a 3-methoxyphenyl group and a 4-methoxyphenyl group; alkoxyaryloxy groups such as a 2-methoxyphenoxy group, a 3-methoxyphenoxy group and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group and a decanoyl group; aromatic acyl groups such as a benzoyl group, an α-naphthoyl group and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexyloxycarbonyl group, an n-heptyloxycarbonyl group, an n-octyloxycarbonyl group, an n-nonyloxycarbonyl group and an n-decyloxycarbonyl group; aryloxycarbonyl groups such as a phenoxycarbonyl group, an α-naphthoxycarbonyl group and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group and a decanoyloxy group; and aromatic acyloxy groups such as a benzoyloxy group, an α-naphthoyloxy group and a β-naphthoyloxy group.

It is preferred that $R^{b1}$ to $R^{b18}$ be each independently a group selected from the group consisting of a hydrogen atom, a halogen atom, an alkyl group having 1 or more and 5 or less carbon atoms and an alkoxy group having 1 or more and 5 or less carbon atoms, and it is more preferred that all $R^{b1}$ to $R^{b18}$ be hydrogen atoms particularly because a cured film with good mechanical properties is easily formed.

In the formulas (b1-2) to (b1-5), $R^{b1}$ to $R^{b18}$ are the same as $R^{b1}$ to $R^{b18}$ in the formula (b1-1). Examples of the divalent group formed when $R^{b2}$ and $R^{b10}$ are bonded to each other in the formula (b1-2) and the formula (b1-4), when $R^{b13}$ and $R^{b16}$ are bonded to each other in the formula (b1-2), and when $R^{b2}$ and $R^{b8}$ are bonded to each other in the formula (b1-3) include —CH$_2$— and —C(CH$_3$)$_2$—.

Specific examples of suitable compounds of the alicyclic epoxy compound represented by the formula (b1-1) can include alicyclic epoxy compounds represented by the following formulas (b1-1a), (b1-1b) and (b1-1c), 2,2-bis(3,4-epoxycyclohexan-1-yl)propane [=2,2-bis(3,4-epoxycyclohexyl)propane], and the like.

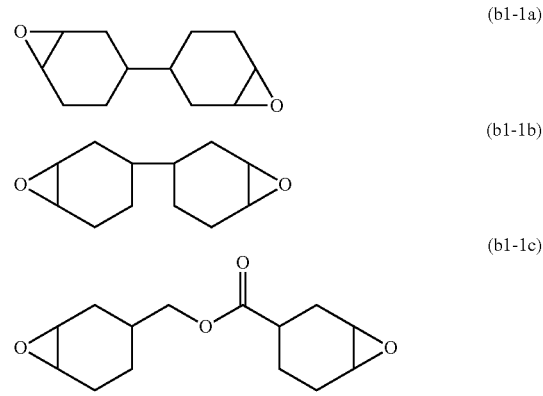

Specific examples of suitable compounds as the alicyclic epoxy compound represented by the formula (b1-2) include bicyclononadiene epoxide or dicyclononadiene epoxide represented by the following formula (b1-2a).

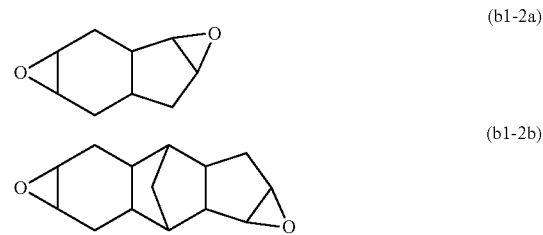

Specific examples of suitable compounds of the alicyclic epoxy compound represented by the formula (b1-3) include S-spiro[3-oxatricyclo[3.2.1.0$^{2,4}$]octane-6,2'-oxirane], and the like.

Specific examples of suitable compounds of the alicyclic epoxy compound represented by the formula (b1-4) include 4-vinylcyclohexene dioxide, dipentene dioxide, limonene dioxide, 1-methyl-4-β-methyloxiran-2-yl)-7-oxabicyclo[4.1.0]heptane, and the like.

Specific examples of suitable compounds of the alicyclic epoxy compound represented by the formula (b1-5) include 1,2,5,6-diepoxycyclooctane, and the like.

Furthermore, a compound represented by the following formula (b1) can be suitably used as the epoxy compound.

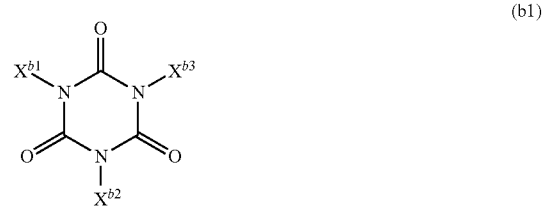

In the formula (b1), $X^{b1}$, $X^{b2}$ and $X^{b3}$ are each independently a hydrogen atom or an organic group which may include an epoxy group, and the total number of epoxy groups of $X^{b1}$, $X^{b2}$ and $X^{b3}$ is 2 or more.

The compound represented by the above formula (b1) is preferably a compound represented by the following formula (b1-6).

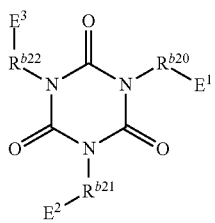
(b1-6)

In the formula (b1-6), $R^{b20}$ to $R^{b22}$ are a linear, branched or cyclic alkylene group, an arylene group, —O—, —C(=O)—, —NH— and a combination thereof, and may be the same or different. $E^1$ to $E^3$ are at least one substituent selected from the group consisting of an epoxy group, an oxetanyl group, an ethylenically unsaturated group, an alkoxysilyl group, an isocyanate group, a blocked isocyanate group, a thiol group, a carboxy group, a hydroxy group and a succinic acid anhydride group, or a hydrogen atom, provided that at least two of $E^1$ to $E^3$ are at least one selected from the group consisting of an epoxy group and an oxetanyl group.

In the formula (b1-6), each of at least two of a group represented by $R^{b20}$ and $E^1$, a group represented by $R^{b21}$ and $E^2$, and a group represented by $R^{b22}$ and $E^3$ is preferably a group represented by the following formula (b1-6a). It is more preferred that all of these groups are groups represented by the following formula (b1-6a). A plurality of groups represented by the formula (b1-6a) bonded to one compound are preferably the same.

-L-C$^b$ (b1-6a)

In the formula (b1-6a), L is a linear, branched or cyclic alkylene group, an arylene group, —O—, —C(=O)—, —NH— and a combination thereof, and C$^b$ is an epoxy group. In the formula (b1-6a), L and C$^b$ may be bonded to each other to form a cyclic structure.

In the formula (b1-6a), the linear, branched or cyclic alkylene group as L is preferably an alkylene group having 1 or more and 10 or less carbon atoms, and additionally the arylene group as L is preferably an arylene group having 5 or more and 10 or less carbon atoms. In the formula (b1-6a), L is preferably a linear alkylene group having 1 or more and 3 or less carbon atoms, a phenylene group, —O—, —C(=O)—, —NH— and a combination thereof, and is preferably at least one of a linear alkylene group having 1 or more and 3 or less carbon atoms such as a methylene group and a phenylene group or a combination of these groups and at least one of —O—, —C(=O)— and —NH—.

As a case where L and C$^b$ are bonded to each other to form a cyclic structure in the formula (b1-6a), for example when a branched alkylene group and an epoxy group are bonded to each other to form a cyclic structure (a structure having an epoxy group of an alicyclic structure), examples thereof include an organic group represented by the following formula (b1-6b) or (b1-6c).

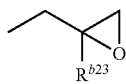
(b1-6b)

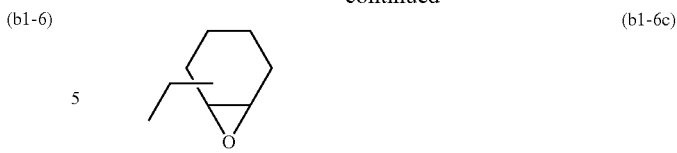
(b1-6c)

In the formula (b1-6b), $R^{b23}$ is a hydrogen atom or a methyl group.

As examples of the compound represented by the formula (b1-6), epoxy compounds having an oxiranyl group or an alicyclic epoxy group will be exemplified. It should be noted, however, that the compound represented by the formula (b1-6) is not limited thereto.

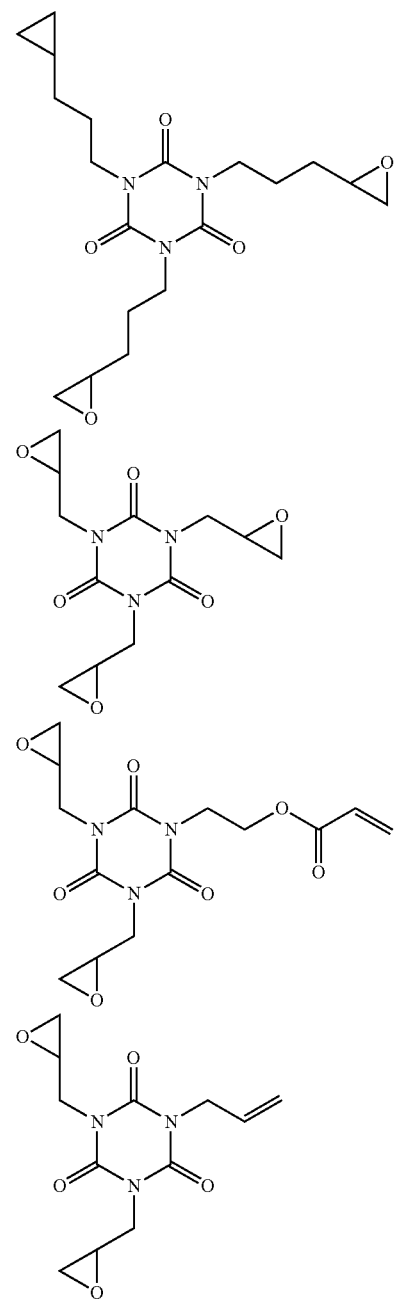

25
-continued
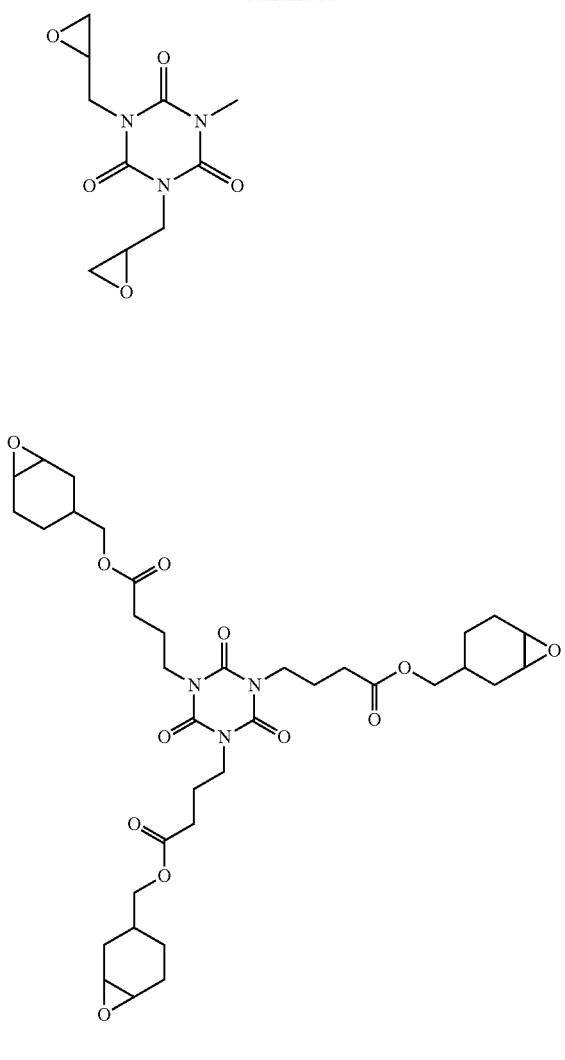
26
-continued
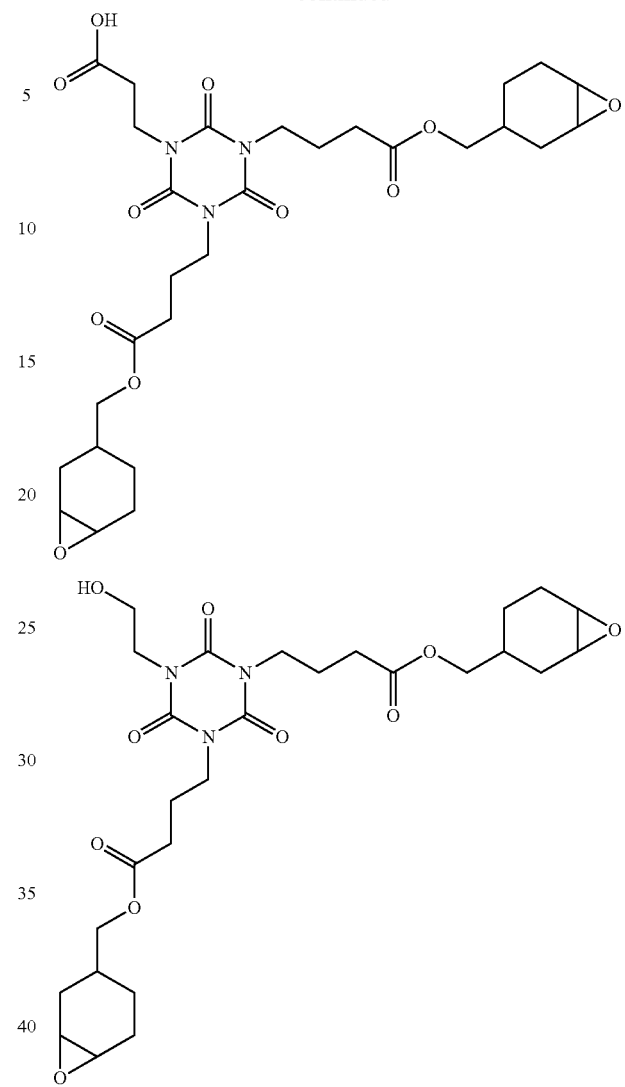
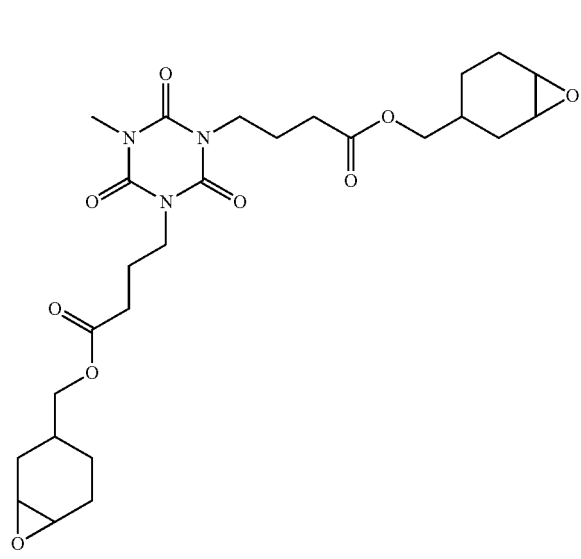

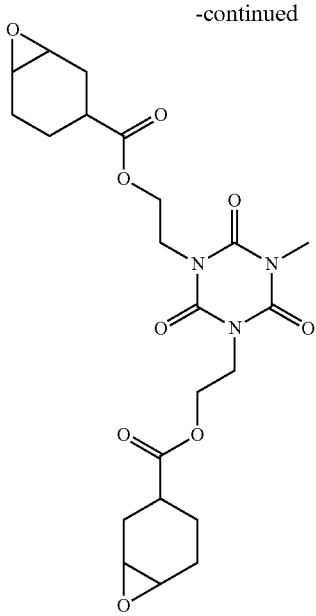

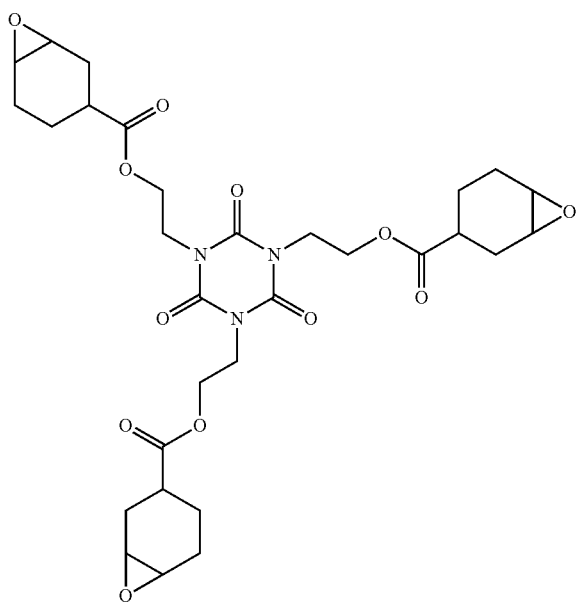 [SMILES: O=C(OCCn1c(=O)n(CCOC(=O)C2CCC3OC3C2)c(=O)n(CCOC(=O)C2CCC3OC3C2)c1=O)C1CCC2OC2C1]

Furthermore, as a compound which can preferably be used as the epoxy compound, a siloxane compound having two or more epoxy groups in a molecule (hereinafter, also simply referred to as "siloxane compound") is exemplified.

The siloxane compound is a compound having a siloxane skeleton constituted with siloxane bonds (Si—O—Si) and two or more glycidyl groups in a molecule. Examples of the siloxane skeleton in the siloxane compound can include a cyclic siloxane skeleton, a polysiloxane skeleton and a basket or ladder type polysilsesquioxane skeleton.

As the siloxane compound, a compound having a cyclic siloxane skeleton represented by the following formula (b1-7) (hereinafter, may be referred to as "cyclic siloxane") is preferred, among others.

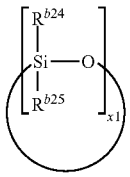

(b1-7)

In the formula (b1-7), $R^{b24}$ and $R^{b25}$ represent a monovalent group including an epoxy group, or an alkyl group. However, at least two of the x1 number of $R^{b24}$ and the x1 number of $R^{b25}$ in the compound represented by the formula (b1-7) are a monovalent group including an epoxy group. Furthermore, x1 in the formula (b1-7) represents an integer of 3 or more. It should be noted that $R^{b24}$ and $R^{b25}$ in the compound represented by the formula (b1-7) may be the same or different. In addition, a plurality of $R^{b24}$ may be the same or different. A plurality of $R^{b25}$ may also be the same or different.

The above monovalent group including an epoxy group is preferably a glycidyl ether group represented by -D-O—$R^{b26}$ [where D represents an alkylene group, and $R^{b26}$ represents a glycidyl group.]. Examples of the above D (alkylene group) can include linear or branched alkylene groups having 1 or more and 18 or less carbon atoms such as a methylene group, a methylmethylene group, a dimethylmethylene group, a dimethylene group and a trimethylene group, and the like. In addition, an alicyclic epoxy group-containing group represented by -D-$R^{b27}$ is also preferred. $R^{b27}$ is an epoxycycloalkyl group. D is an alkylene group as described above. Preferred examples of the alkylene group as D are also as described above. The epoxycycloalkyl group as $R^{b27}$ is preferably a 2,3-epoxycyclopentyl group, a 3,4-epoxycyclohexyl group and a 2,3-epoxycyclohexyl group. The group represented by -D-$R^{b27}$ is preferably a 2-(3,4-epoxycyclohexyl)ethyl group.

Preferred examples of the alkyl group as $R^{b24}$ and $R^{b25}$ can include linear or branched alkyl groups having 1 or more and 18 or less carbon atoms (preferably 1 or more and 6 or less carbon atoms, and particularly preferably 1 or more and 3 or less carbon atoms) such as a methyl group, an ethyl group, a propyl group, and an isopropyl group.

In the formula (b1-7), x1 represents an integer of 3 or more, and particularly preferably an integer of 3 or more and 6 or less from the viewpoint of good crosslinking reactivity when a cured film is formed.

The number of epoxy groups in the molecule of the siloxane compound is 2 or more, and preferably 2 or more and 6 or less, and particularly preferably 2 or more and 4 or less from the viewpoint of good crosslinking reactivity during curing.

The curable liquid composition may include, in addition to the siloxane compound represented by the formula (b1-7), compounds having a siloxane skeleton such as alicyclic epoxy group-containing cyclic siloxane, and an alicyclic epoxy group-containing silicone resin described in Japanese Unexamined Patent Application Publication No. 2008-248169.

More specific examples of the siloxane compound can include cyclic siloxane having two or more epoxy groups in a molecule represented by the following formulas, and the like. In addition, commercial products such as trade name "X-40-2670," "X-40-2701," "X-40-2728," "X-40-2738"

and "X-40-2740" (all manufactured by Shinetsu Chemical Co., Ltd.), for example, can be used as the siloxane compound.
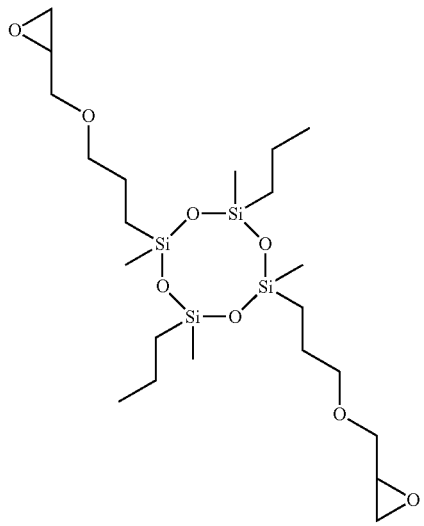
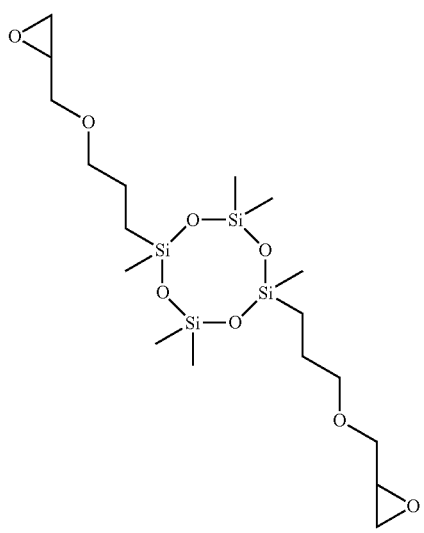
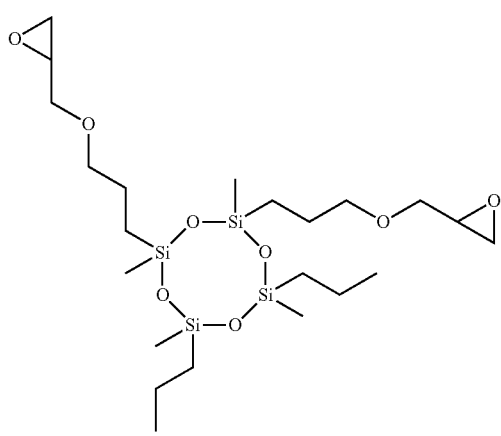
-continued
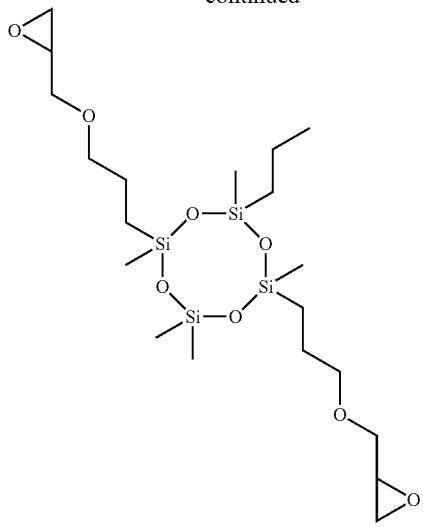
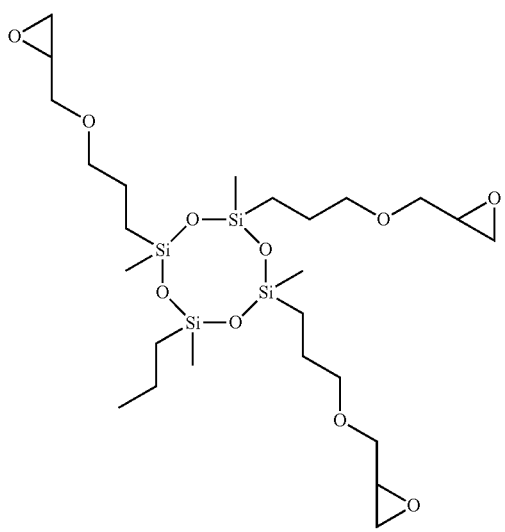
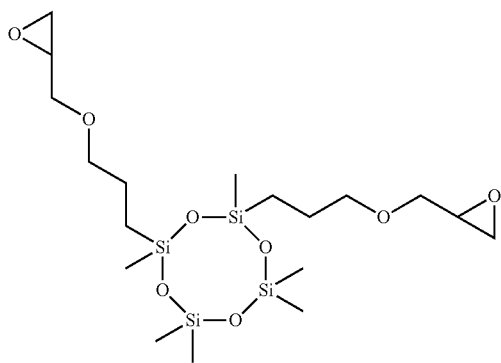

31
-continued
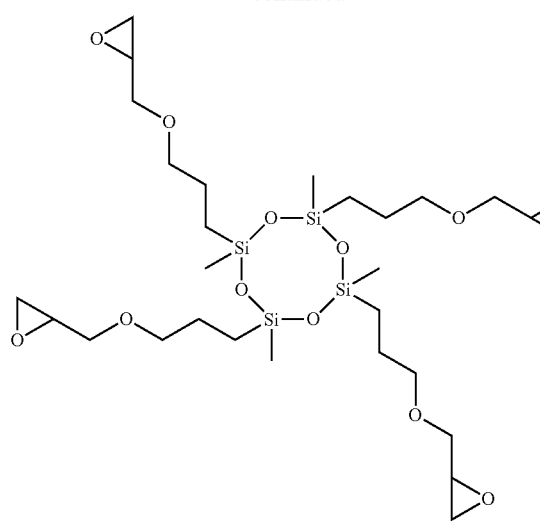
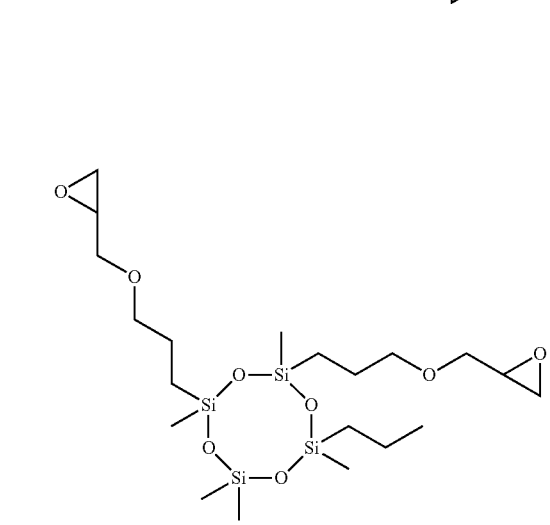
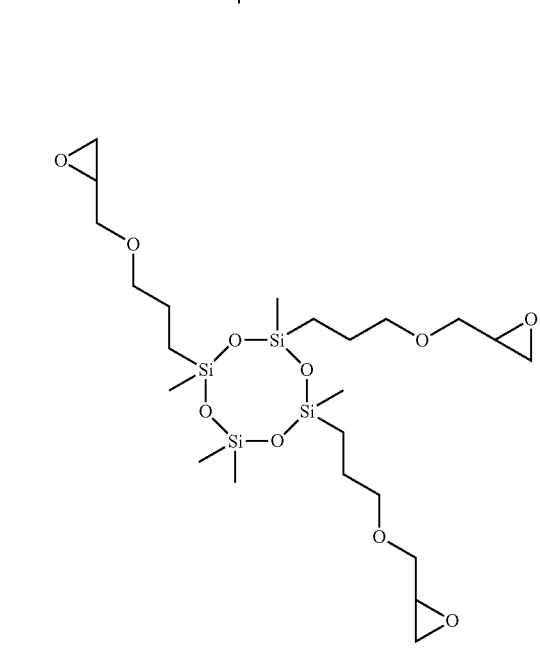
32
-continued
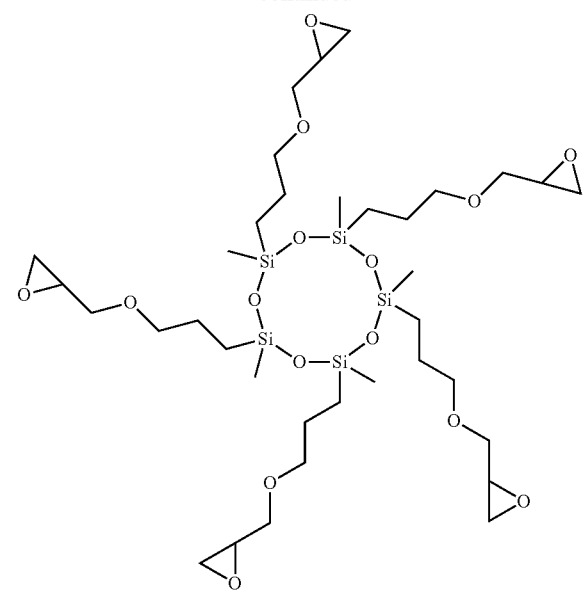
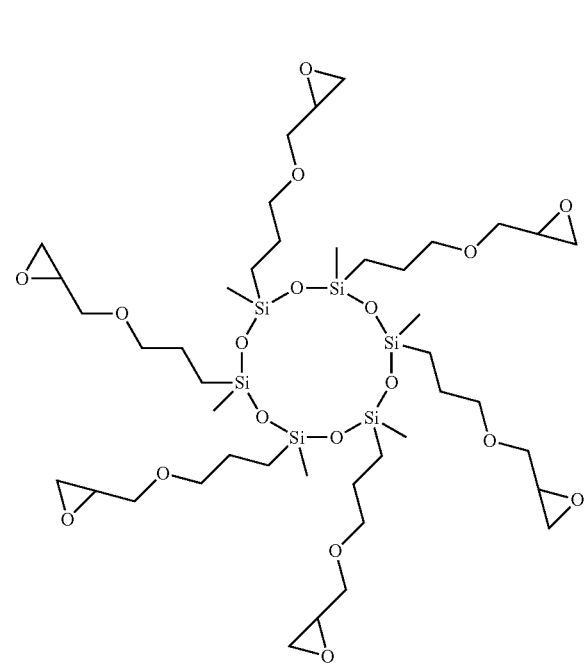
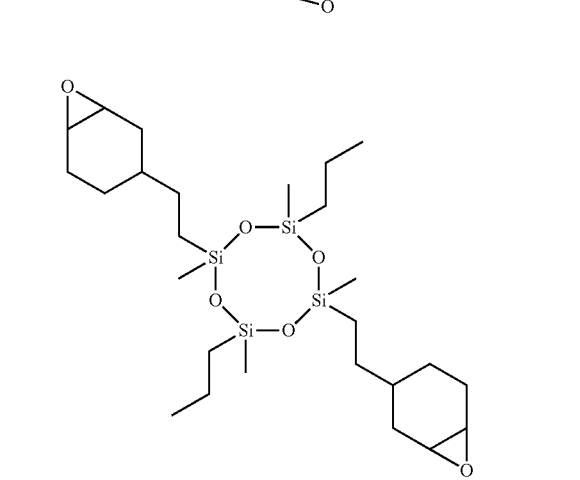

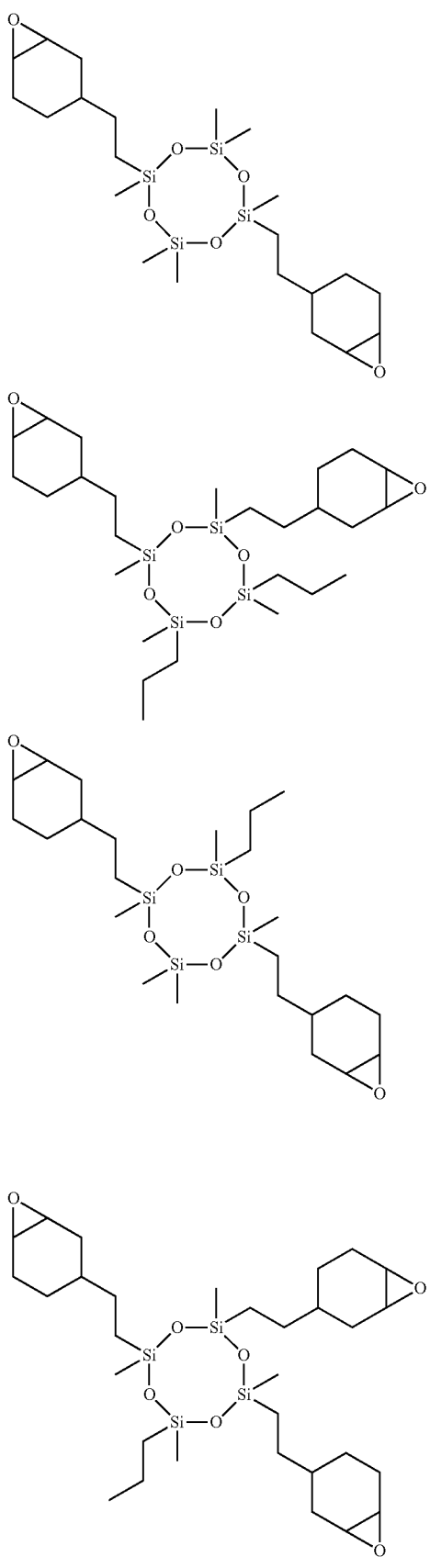
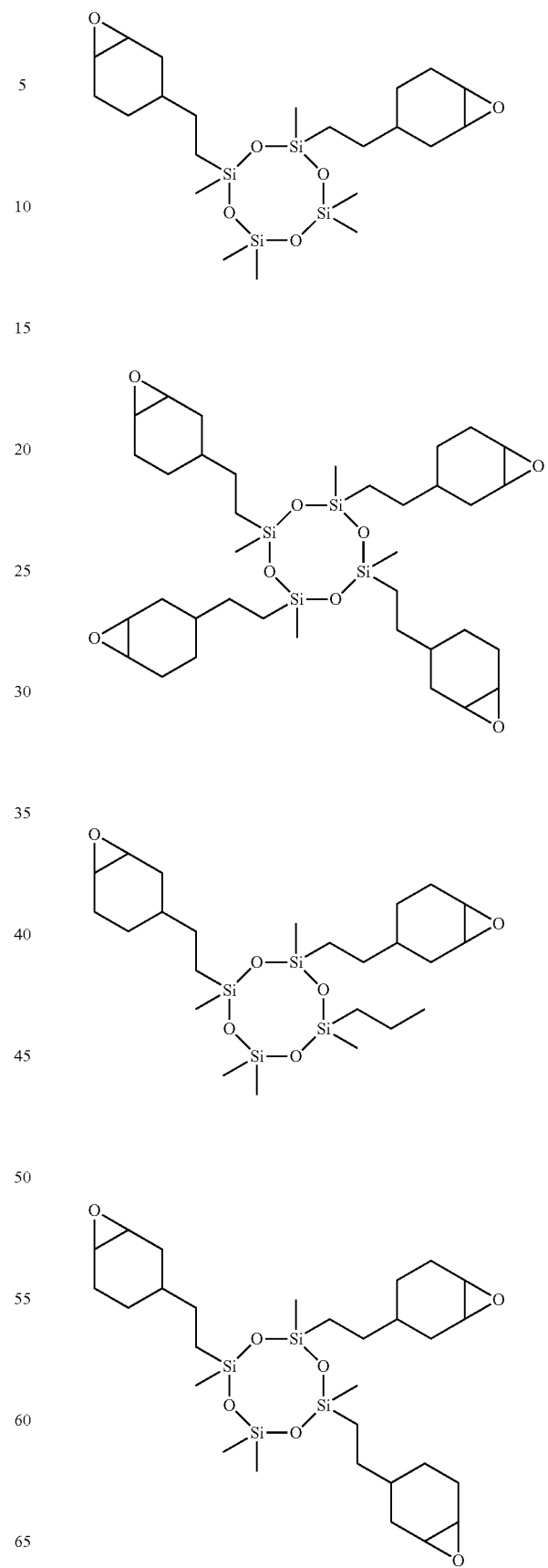

-continued

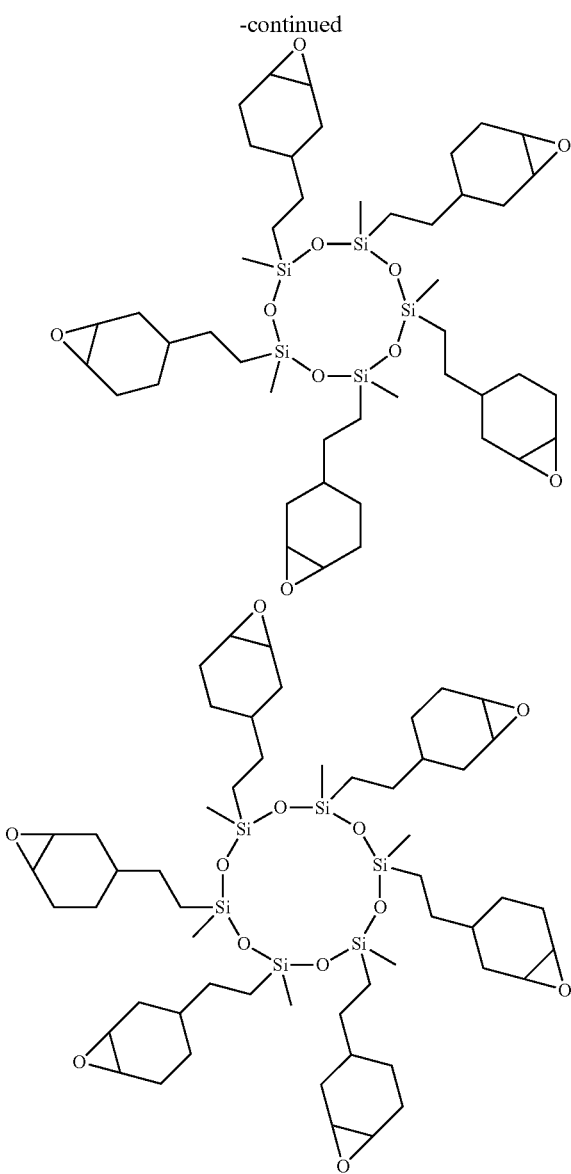

<Curing Agent (C)>

The curable liquid composition contains the epoxy compound (B). Therefore, the curable liquid composition preferably contains a curing agent (C) for the epoxy compound as a component for curing the epoxy compound (B). As used herein, the curing agent (C) is not particularly limited as long as it is a component capable of curing the epoxy compound (B). When the epoxy compound (B) contained in the curable liquid composition is an epoxy compound having a functional group reactive with epoxy groups such as a carboxy group, a carboxylic acid anhydride group, or an amino group, the curable liquid composition does not necessarily have to contain the curing agent (C).

Hereinafter, preferred examples of the curing agent (C) will be described.

[Onium Salt (C1)]

The onium salt (C1) accelerates curing of the epoxy compound (B) by the action of light or heat.

The onium salt is exemplified by a diazonium salt, an ammonium salt, an iodonium salt, a sulfonium salt, a phosphonium salt, an oxonium salt, and the like. Among these, a sulfonium salt and an iodonium salt are preferable in light of availability and favorable curing.

Next, examples of a preferable onium salt (C1) are described. As a preferable example of the onium salt (C1), a sulfonium salt represented by the following formula (C-I) (hereinafter, also referred to as "sulfonium salt (Q)") can be mentioned.

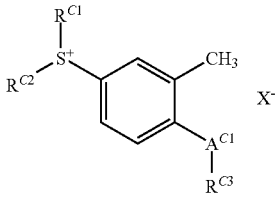

(C-I)

In the formula (C-I), $R^{C1}$ and $R^{C2}$ independently represent an alkyl group optionally substituted with a halogen atom or a group represented by the following formula (C-II); $R^{C1}$ and $R^{C2}$ may be bonded to each other to form a ring together with the sulfur atom in the formula; $R^{C3}$ represents a group represented by the following formula (C-III) or a group represented by the following formula (C-IV); $A^{C1}$ represents S, O or Se; $X^-$ represents a monovalent anion; with the proviso that $R^{C1}$ and $R^{C2}$ are not simultaneously an alkyl group optionally substituted with a halogen atom.

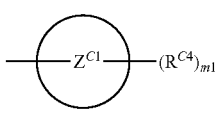

(C-II)

In the formula (C-II), a ring $Z^{C1}$ represents an aromatic hydrocarbon ring; $R^{C4}$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic group, an alkylsulfinyl group, an alkylsulfonyl group, a hydroxy(poly)alkyleneoxy group, an optionally substituted amino group, a cyano group, a nitro group or a halogen atom; and m1 represents an integer of 0 or more.

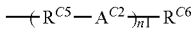

(C-III)

In the formula (C-III), $R^{C5}$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy (poly)alkyleneoxy group, an optionally substituted amino group, a cyano group, a nitro group or a halogen atom, or a group represented by the following formula (C-V); $R^{C6}$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom, or a group represented by the following formula (C-VI); $A^{C2}$ represents a single bond, S, O, a sulfinyl group or a carbonyl group; and n1 represents 0 or 1.

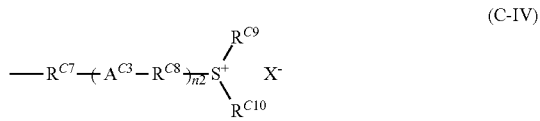

(C-IV)

In the formula (C-IV), $R^{C7}$ and $R^{C8}$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom, or a group represented by the following formula (C-V); $R^{C9}$ and $R^{C10}$ independently represent an alkyl group optionally substituted with a halogen atom or a group represented by the above formula (C-II); $R^{C9}$ and $R^{C10}$ may be bonded to each other to form a ring together with the sulfur atom in the formula; $A^{C3}$ represents a single bond, S, O, a sulfinyl group or a carbonyl group; $X^-$ is the same as defined above; n2 represents 0 or 1; with the proviso that $R^{C9}$ and $R^{C10}$ are not simultaneously an alkyl group optionally substituted with a halogen atom.

(C-V)

In the formula (C-V), a ring $Z^{C2}$ represents an aromatic hydrocarbon ring; $R^{C11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom; and m2 represents an integer of 0 or more.

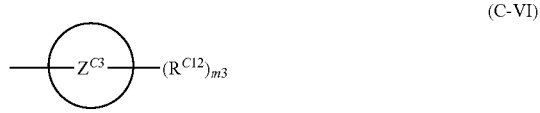

(C-VI)

In the formula (C-VI), a ring $Z^{C3}$ represents an aromatic hydrocarbon ring; $R^{C12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom; and m3 represents an integer of 0 or more.

(Sulfonium salt (Q))

The sulfonium salt (Q) will now be described. The sulfonium salt (Q) is characterized in that a methyl group is bonded to the carbon atom at the ortho position of the carbon atom to which $A^{C1}$ is bonded in the benzene ring in the above formula (C-I). Because of the methyl group at the above-described position, the sulfonium salt (Q) easily generates a proton and is highly sensitive to active energy rays such as ultraviolet rays compared to conventional sulfonium salts.

In the above formula (C-I), both of $R^{C1}$ and $R^{C2}$ are preferably a group represented by the above formula (C-II). $R^{C1}$ and $R^{C2}$ may be the same or different. In the formula (C-I), when $R^{C1}$ and $R^{C2}$ are bonded to each other to form a ring together with the sulfur atom in the formula, the number of atoms constituting a ring formed is preferably 3 or more and 10 or less including the sulfur atom, and more preferably 5 or more and 7 or less. The ring thus formed may be a polycyclic ring, and is preferably a polycyclic ring obtained by condensation of monocycles in which the number of atoms constituting the rings is 5 or more and 7 or less. In the above formula (C-I), both $R^{C1}$ and $R^{C2}$ are preferably a phenyl group. In the above formula (C-I), $R^{C3}$ is preferably a group represented by the above formula (C-III). In the above formula (C-I), $A^{C1}$ is preferably S or O, and more preferably S.

In the above formula (C-II), $R^{C4}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group or a nitro group, and more preferably an alkyl group optionally substituted with a halogen atom, an alkylcarbonyl group or a thienylcarbonyl group. In the above formula (C-II), m1 can be selected depending on the type of the ring $Z^{C1}$, and may be, for example, an integer of 0 or more and 4 or less, preferably an integer of 0 or more and 3 or less, and more preferably an integer of 0 or more and 2 or less.

In the above formula (C-III), $R^{C5}$ is preferably an alkylene group; an alkylene group substituted with a hydroxy group, an optionally substituted amino group or a nitro group; or a group represented by the above formula (C-V); and more preferably a group represented by the above formula (C-V). In the above formula (C-III), $R^{C6}$ is preferably an alkyl group; an alkyl group substituted with a hydroxy group, an optionally substituted amino group or a nitro group; or a group represented by the above formula (C-VI); and more preferably a group represented by the above formula (C-VI). In the above formula (C-III), $A^{C2}$ is preferably S or O, and more preferably S. In the above formula (C-III), n1 is preferably 0.

In the above formula (C-IV), preferably $R^{C7}$ and $R^{C8}$ are each independently an alkylene group; an alkylene group that was substituted with a hydroxy group, an amino group that may be substituted, or a nitro group; or a group represented by the above formula (C-V), and they are each more preferably a group represented by the above formula (C-V). $R^{C7}$ and $R^{C8}$ may be the same or different from each other. In the above formula (C-IV), it is preferable that both $R^{c9}$ and $R^{c10}$ are the groups represented by the formula (C-II). $R^{C9}$ and $R^{C10}$ may be the same or different. In the above formula (C-IV), when $R^{C9}$ and $R^{C10}$ are bonded to each other to form a ring together with the sulfur atom in the formula, the number of atoms constituting a ring formed is preferably 3 or more and 10 or less including the sulfur atom, and more preferably 5 or more and 7 or less. The ring thus formed may be a polycyclic ring, and is preferably a polycyclic ring obtained by condensation of monocycles in which the number of atoms constituting the rings is 5 or more and 7 or less. In the above formula (C-IV), $A^{C3}$ is preferably S or O, and more preferably S. In the above formula (C-IV), n2 is preferably 0.

In the above formula (C-V), $R^{C11}$ is preferably an alkyl group optionally substituted with a halogen atom, a hydroxy group, an optionally substituted amino group or a nitro group, and more preferably an alkyl group optionally substituted with a halogen atom. In the above formula (C-V), m2 can be selected depending on the type of the ring $Z^{C2}$, and may be, for example, an integer of 0 or more and 4 or less, preferably an integer of 0 or more and 3 or less, and more preferably an integer of 0 or more and 2 or less.

In the above formula (C-VI), $R^{C12}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group or a nitro group, and more preferably an alkyl group optionally substituted with a halogen atom, an alkylcarbonyl group or a thienylcarbonyl group. In the above formula (C-VI), m3 can be selected depending on the type of the ring $Z^{C3}$ and may be, for example, an integer of 0 or more and 4 or less, preferably an integer of 0 or more and 3 or less, and more preferably an integer of 0 or more and 2 or less.

In the above formula (C-I), $X^-$ is a monovalent anion. Suitable examples of $X^-$ include a monovalent polyatomic anion, and $X^-$ is more preferably an anion represented by $MY_a^-$, $(Rf)_bPF_{6-b}^-$, $R^{x1}{}_cBY_{4-c}^-$, $R^{x1}{}_cGaY_{4-c}^-$, $R^{x2}SO_3^-$, $(R^{x2}SO_2)_3C^-$ or $(R^{x2}SO_2)_2N^-$. In addition, $X^-$ may be a halogen anion and examples thereof include a fluoride ion, a chloride ion, a bromide ion, an iodide ion and the like.

M represents a phosphorus atom, a boron atom or an antimony atom. Y represents a halogen atom (preferably a fluorine atom).

Rf represents an alkyl group in which 80 mol % or higher of hydrogen atoms are substituted with fluorine atoms (an alkyl group having 1 or more and 8 or less carbon atoms is preferred). Examples of the alkyl group which is used as Rf by fluorine substitution include linear alkyl groups such as a methyl group, an ethyl group, a propyl group, a butyl group, a pentyl group, and an octyl group, branched alkyl groups such as an isopropyl group, an isobutyl group, a sec-butyl group, and tert-butyl group, and cycloalkyl groups such as a cyclopropyl group, a cyclobutyl group, a cyclopentyl group, and a cyclohexyl group, and the like. The proportion of hydrogen atoms substituted with fluorine atoms in these alkyl groups in Rf is preferably 80 mol % or higher, further preferably 90% or higher, particularly preferably 100% based on the number of moles of hydrogen atoms included in an original alkyl group. When the proportion of substitution with fluorine atoms is within these preferred ranges, the sulfonium salt (Q) has a further good light sensitivity. Particularly preferred examples of Rf include $CF_3^-$, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2(CF_3)CF^-$ and $(CF_3)_3C^-$. The b number of Rf are independent from each other and thus may be the same or different.

P represents a phosphorus atom, and F represents a fluorine atom.

$R^{x1}$ represents a phenyl group in which part of the hydrogen atoms are substituted with at least one element or electron-withdrawing group. Examples of the one element include halogen atoms such as a fluorine atom, a chlorine atom and a bromine atom. Examples of the electron-withdrawing group include a trifluoromethyl group, a nitro group and a cyano group, and the like. Among these, a phenyl group in which at least one hydrogen atom is substituted with a fluorine atom or a trifluoromethyl group is preferred. The c number of $R^{x1}$ are independent from each other and thus may be the same or different.

B represents a boron atom, and Ga represents a gallium atom.

$R^{x2}$ represents an alkyl group having 1 or more and 20 or less carbon atoms, a fluoroalkyl group having 1 or more and 20 or less carbon atoms, or an aryl group having 6 or more and 20 or less carbon atoms, the alkyl group and the fluoroalkyl group may be linear, branched or cyclic, and the alkyl group, fluoroalkyl group or aryl group may be unsubstituted or have a substituent. Examples of the above substituent include a hydroxy group, an optionally substituted amino group (for example, groups exemplified in the description described below regarding the above formulas (C-II) to (C-VI)), and a nitro group, and the like. In addition, the carbon chain of the alkyl group, fluoroalkyl group or aryl group represented by $R^{x2}$ may have a heteroatom such as an oxygen atom, a nitrogen atom or a sulfur atom. In particular, the carbon chain of the alkyl group or fluoroalkyl group represented by $R^{x2}$ may have a divalent functional group (for example, an ether bond, a carbonyl bond, an ester bond, an amino bond, an amide bond, an imide bond, a sulfonyl bond, a sulfonylamide bond, a sulfonylimide bond, a urethane bond, etc.). When the alkyl group, fluoroalkyl group or aryl group represented by $R^{x2}$ has the above substituent, heteroatom or functional group, the number of the above substituents, heteroatoms or functional groups may be one or two or more.

S represents a sulfur atom, O represents an oxygen atom, C represents a carbon atom, and N represents a nitrogen atom. a represents an integer of 4 or more and 6 or less. b is preferably an integer of 1 or more and 5 or less, further preferably an integer of 2 or more and 4 or less, and particularly preferably 2 or 3. c is preferably an integer of 1 or more and 4 or less, and further preferably 4.

Examples of the anion represented by $MY_a^-$ include an anion represented by $SbF_6^-$, $PF_6^-$ or $BF_4^-$, and the like.

Examples of the anion represented by $(Rf)_bPF_{6-b}^-$ include an anion represented by $(CF_3CF_2)_2PF_4^-$, $(CF_3CF_2)_3PF_3^-$, $((CF_3)_2CF)_2PF_4^-$, $((CF_3)_2CF)_3PF_3^-$, $(CF_3CF_2CF_2)_2PF_4^-$, $(CF_3CF_2CF_2)_3PF_3^-$, $((CF_3)_2CFCF_2)_2PF_4^-$, $((CF_3)_2CFCF_2)_3PF_3^-$, $(CF_3CF_2CF_2CF_2)_2PF_4^-$ or $(CF_3CF_2CF_2CF_2)_3PF_3^-$, and the like. Among these, an anion represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $((CF_3)_2CFCF_2)_3PF_3^-$ or $((CF_3)_2CFCF_2)_2PF_4^-$ is preferred.

The anion represented by $R^{x1}{}_cBY_{4-c}^-$ is preferably:
$R^{x1}{}_cBY_{4-c}^-$,
herein $R^{x1}$ represents a phenyl group in which at least part of hydrogen atoms are substituted with a halogen atom or an electron-withdrawing group, Y represents a halogen atom, and c represents an integer of 1 or more and 4 or less, and examples thereof include an anion represented by $(C_6F_5)_4B^-$, $((CF_3)_2C_6H_3)_4B^-$, $(CF_3C_6H_4)_4B^-$, $(C_6F_5)_2BF_2^-$, $C_6F_5BF_3^-$ or $(C_6H_3F_2)_4B^-$, and the like. Among these, an anion represented by $(C_6F_5)_4B^-$ or $((CF_3)_2C_6H_3)_4B^-$ is preferred.

Examples of the anion represented by $R^{x1}{}_cGaY_{4-c}{}^-$ include an anion represented by $(C_6F_5)_4Ga^-$, $((CF_3)_2C_6H_3)_4Ga^-$, $(CF_3C_6H_4)_4Ga^-$, $(C_6F_5)_2GaF_2^-$, $C_6F_5GaF_3^-$ or $(C_6H_3F_2)_4Ga^-$, and the like. Among these, an anion represented by $(C_6F_5)_4Ga^-$ or $((CF_3)_2C_6H_3)_4Ga^-$ is further preferred.

Examples of the anion represented by $R^{x2}SO_3^-$ include a trifluoromethanesulfonate anion, a pentafluoroethanesulfonate anion, a heptafluoropropanesulfonate anion, a nonafluorobutanesulfonate anion, a pentafluorophenylsulfonate anion, a p-toluenesulfonate anion, a benzenesulfonate anion, a camphorsulfonate anion, a methanesulfonate anion, an ethanesulfonate anion, a propanesulfonate anion and a butanesulfonate anion, and the like. Among these, a trifluoromethanesulfonate anion, a nonafluorobutanesulfonate anion, a methanesulfonate anion, a butanesulfonate anion, a camphorsulfonate anion, a benzenesulfonate anion or a p-toluenesulfonate anion is further preferred.

Examples of the anion represented by $(R^{x2}SO_2)_3C^-$ include an anion represented by $(CF_3SO_2)_3C^-$, $(C_2F_5SO_2)_3C^-$, $(C_3F_7SO_2)_3C^-$ or $(C_4F_9SO_2)_3C^-$, and the like.

Examples of the anion represented by $(R^{x2}SO_2)_2N^-$ include an anion represented by $(CF_3SO_2)_2N^-$, $(C_2F_5SO_2)_2N^-$, $(C_3F_7SO_2)_2N^-$ or $(C_4F_9SO_2)_2N^-$, and the like.

As the monovalent polyatomic anion, in addition to an anion represented by $MY_a^-$, $(Rf)_bPF_{6-b}^-$, $R^{x1}{}_cBY_{4-c}{}^-$, $R^{x1}{}_cGaY_{4-c}{}^-$, $R^{x2}SO_3^-$, $(R^{x2}SO_2)_3C^-$ or $(R^{x2}SO_2)_2N^-$, perhalogenate ions (such as $ClO_4^-$ and $BrO_4^-$), halogenated sulfonate ions (such as $FSO_3^-$ and $ClSO_3^-$), sulfate ions (such as $CH_3SO_4^-$, $CF_3SO_4^-$ and $HSO_4^-$), carbonate ions (such as $HCO_3^-$ and $CH_3CO_3^-$), aluminate ions (such as $AlCl_4^-$ and $AlF_4^-$), hexafluorobismuthate ion ($BiF_6^-$), carboxylate ions (such as $CH_3COO^-$, $CF_3COO^-$, $C_6H_5COO^-$, $CH_3C_6H_4COO^-$, $C_6F_5COO^-$ and $CF_3C_6H_4COO^-$), arylborate ions (such as $B(C_6H_5)_4^-$ and $CH_3CH_2CH_2CH_2B(C_6H_5)_3^-$), thiocyanate ion ($SCN^-$), and nitrate ion ($NO_3^-$), and the like can be used.

Among these $X^-$, anions represented by $MY_a^-$, $(Rf)_bPF_{6-b}^-$, $R^{x1}{}_cBY_{4-c}{}^-$, $R^{x1}{}_cGaY_{4-c}{}^-$ and $(R^{x2}SO_2)_3C^-$ are preferred, $SbF_6^-$, $PF_6^-$, $(CF_3CF_2)_3PF_3^-$, $(C_6F_5)_4B^-$ $((CF_3)_2C_6H_3)_4B^-$, $(C_6F_5)_4Ga^-$, $((CF_3)_2C_6H_3)_4Ga^-$ and $(CF_3SO_2)_3C^-$ are more preferred, and $R^{x1}{}_cBY_{4-c}{}^-$ is further preferred from the viewpoint of cationic polymerization performance.

Examples of the aromatic hydrocarbon ring in the above formulas (C-II), (C-V) and (C-VI) include a benzene ring, a condensed polycyclic aromatic hydrocarbon rings, and the like. As the condensed polycyclic aromatic hydrocarbon rings, for example, condensed di- to tetracyclic aromatic hydrocarbon rings such as condensed dicyclic hydrocarbon rings, condensed tricyclic hydrocarbon rings. Examples of the condensed dicyclic aromatic hydrocarbon rings include $C_{8-20}$ condensed dicyclic hydrocarbon rings such as a naphthalene ring, and $C_{10-16}$ condensed dicyclic hydrocarbon rings are preferred. Examples of the condensed tricyclic aromatic hydrocarbon rings include an anthracene ring, a phenanthrene ring, and the like.

The aromatic hydrocarbon ring is preferably the benzene ring and the naphthalene ring, and more preferably the benzene ring.

Examples of the halogen atom in the above formulas (C-I) to (C-VI) include a fluorine atom, a chlorine atom, a bromine atom and an iodine atom, and the like.

In the formulas (C-I) to (C-VI), examples of the alkyl group include a linear alkyl group having 1 or more and 18 or less carbon atom, a branched alkyl group having 3 or more and 18 or less carbon atoms, a cycloalkyl group having 3 or more and 18 or less carbon atoms, and the like. In particular, the alkyl group optionally substituted with a halogen atom in the above formulas (C-I), (C-II) and (C-IV) to (C-VI) means an alkyl group and an alkyl group substituted with a halogen atom. Examples of the alkyl group substituted with a halogen atom include groups in which at least one hydrogen atom in the above linear alkyl groups, branched alkyl groups or cycloalkyl groups is substituted with a halogen atom, and the like. Among the alkyl groups optionally substituted with a halogen atom, $R^{C1}$, $R^{C2}$, $R^{C9}$ or $R^{C10}$ is particularly preferably a trifluoromethyl group, and $R^{C4}$, $R^{C6}$, $R^{C11}$ or $R^{C12}$ is particularly preferably a methyl group. Suitable specific examples of the linear alkyl group include a methyl group, an ethyl group, an n-propyl group, an n-butyl group, an n-pentyl group, an n-octyl group, an n-decyl group, an n-dodecyl group, an n-tetradecyl group, an n-hexadecyl group, an n-octadecyl group, and the like. Suitable specific examples of the branched alkyl group include an isopropyl group, an isobutyl group, a sec-butyl group, a tert-butyl group, an isopentyl group, a neopentyl group, a tert-pentyl group, an isohexyl group, an isooctadecyl group, and the like. Suitable specific examples of the cycloalkyl group include a cyclopropyl group, a cyclobutyl group, a cyclopentyl group, a cyclohexyl group, a 4-decylcyclohexyl group, and the like. Suitable specific examples of the alkyl group substituted with a halogen atom include a monofluoromethyl group, difluoromethyl group, a trifluoromethyl group, and the like.

Examples of the alkoxy group in the above formulas (C-II) to (C-VI) include linear or branched alkoxy groups having 1 or more and 18 or less carbon atoms. Suitable specific examples of the alkoxy group include a methoxy group, an ethoxy group, a propoxy group, an isopropoxy group, a butoxy group, an isobutoxy group, a sec-butoxy group, a tert-butoxy group, a hexyloxy group, a decyloxy group, a dodecyloxy group, an octadecyloxy group, and the like.

Examples of the alkyl group in the alkylcarbonyl group in the above formulas (C-II) to (C-VI) include the above linear alkyl groups having 1 or more and 18 or less carbon atoms, branched alkyl groups having 3 or more and 18 or less carbon atoms, or cycloalkyl groups having 3 or more and 18 or less carbon atoms, and examples of the alkylcarbonyl group include linear, branched or cyclic alkylcarbonyl groups having 2 or more and 18 or less carbon atoms. Suitable specific examples of the alkylcarbonyl group include an acetyl group, a propionyl group, a butanoyl group, a 2-methylpropionyl group, a heptanoyl group, a 2-methylbutanoyl group, a 3-methylbutanoyl group, an octanoyl group, a decanoyl group, a dodecanoyl group, an octadecanoyl group, a cyclopentanoyl group, a cyclohexanoyl group, and the like.

Examples of the arylcarbonyl group in the above formulas (C-III) to (C-VI) include arylcarbonyl groups having 7 or more and 11 or less carbon atoms. Suitable specific examples of the arylcarbonyl group include a benzoyl group, a naphthoyl group, and the like Examples of the alkoxycarbonyl group in the above formulas (C-II) to (C-VI) include linear or branched alkoxycarbonyl groups having 2 or more and 19 or less carbon atoms. Suitable specific examples of the alkoxycarbonyl group include a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, an octyloxycarbonyl group, a tetradecyloxycarbonyl group, an octadecyloxycarbonyl group, and the like.

Examples of the aryloxycarbonyl group in the above formulas (C-III) to (C-VI) include aryloxycarbonyl groups having 7 or more and 11 or less carbon atoms. Suitable specific examples of the aryloxycarbonyl group include a phenoxycarbonyl group, a naphthoxycarbonyl group, and the like.

Examples of the arylthiocarbonyl group in the above formulas (C-III) to (C-VI) include arylthiocarbonyl groups having 7 or more and 11 or less carbon atoms. Suitable specific examples of the arylthiocarbonyl group include a phenylthiocarbonyl group, a naphthylthiocarbonyl group, and the like.

Examples of the acyloxy group in the above formulas (C-II) to (C-VI) include linear or branched acyloxy groups having 2 or more and 19 or less carbon atoms. Suitable specific examples of the acyloxy group include an acetoxy group, an ethylcarbonyloxy group, a propylcarbonyloxy group, an isopropylcarbonyloxy group, a butylcarbonyloxy group, an isobutylcarbonyloxy group, a sec-butylcarbonyloxy group, a tert-butylcarbonyloxy group, an octylcarbonyloxy group, a tetradecylcarbonyloxy group, an octadecylcarbonyloxy group, and the like.

Examples of the arylthio group in the above formulas (C-III) to (C-VI) include arylthio groups having 6 or more and 20 or less carbon atoms. Suitable specific examples of the arylthio group include a phenylthio group, a 2-methylphenylthio group, a 3-methylphenylthio group, a 4-methylphenylthio group, a 2-chlorophenylthio group, a 3-chlorophenylthio group, a 4-chlorophenylthio group, a 2-bromophenylthio group, a 3-bromophenylthio group, a 4-bromophenylthio group, a 2-fluorophenylthio group, a 3-fluorophenylthio group, a 4-fluorophenylthio group, a 2-hydroxyphenylthio group, a 4-hydroxyphenylthio group, a 2-methoxyphenylthio group, a 4-methoxyphenylthio group, 1-naphthylthio group, 2-naphthylthio group, a 4-[4-(phenylthio)benzoyl]phenylthio group, a 4-[4-(phenylthio)phenoxy]phenylthio group, a 4-[4-(phenylthio)phenyl]phenylthio group, a 4-(phenylthio)phenylthio group, a 4-benzoylphenylthio group, a 4-benzoyl-2-chlorophenylthio group, a 4-benzoyl-3-chlorophenylthio group, a 4-benzoyl-3-methylthiophenylthio group, a 4-benzoyl-2-methylthiophenylthio group, a 4-(4-methylthiobenzoyl)phenylthio group, a 4-(2-methylthiobenzoyl)phenylthio group, a 4-(p-methylbenzoyl)phenylthio group, a 4-(p-ethylbenzoyl)phenylthio group, a 4-(p-isopropylbenzoyl)phenylthio group, a 4-(p-tert-butylbenzoyl)phenylthio group), and the like.

Examples of the alkylthio group in the above formulas (C-II) to (C-VI) include linear or branched alkylthio groups having 1 or more and 18 or less carbon atoms. Suitable specific examples of the alkylthio group include a methylthio group, an ethylthio group, a propylthio group, an isopropylthio group, a butylthio group, an isobutylthio group, a sec-butylthio group, a tert-butylthio group, a pentylthio group, an isopentylthio group, a neopentylthio group, a tert-pentylthio group, an octylthio group, a decylthio group, a dodecylthio group, an isooctadecylthio group, and the like.

Examples of the aryl group in the above formulas (C-III) to (C-VI) include aryl groups having 6 or more and 10 or less carbon atoms. Suitable specific examples of the aryl group include a phenyl group, a tolyl group, a dimethylphenyl group, a naphthyl group, and the like.

Examples of the heterocyclic aliphatic group in the above formula (C-II) include a heterocyclic aliphatic group having 2 or more and 20 or less, preferably 4 or more and 20 or less carbon atoms. Suitable specific examples of the heterocyclic aliphatic group include a pyrrolidinyl group, a tetrahydrofuranyl group, a tetrahydrothienyl group, a piperidinyl group, a tetrahydropyranyl group, a tetrahydrothiopyranyl group, a morpholinyl group, and the like.

Examples of the heterocyclic aromatic group in the above formulas (C-III) to (C-VI) include heterocyclic aromatic groups having 4 or more and 20 or less carbon atoms. Suitable specific examples of the heterocyclic aromatic group include a thienyl group, a furanyl group, a selenophenyl group, a pyranyl group, a pyrrolyl group, an oxazolyl group, a thiazolyl group, a pyridyl group, a pyrimidyl group, a pyrazinyl group, an indolyl group, a benzofuranyl group, a benzothienyl group, a quinolyl group, an isoquinolyl group, a quinoxalinyl group, a quinazolinyl group, a carbazolyl group, an acridinyl group, a phenothiazinyl group, a phenazinyl group, a xanthenyl group, a thianthrenyl group, a phenoxazinyl group, a phenoxathiinyl group, a chromanyl group, an isochromanyl group, a dibenzothienyl group, a xanthonyl group, a thioxanthonyl group, a dibenzofuranyl group, and the like.

Examples of the aryloxy group in the above formulas (C-III) to (C-VI) include aryloxy groups having 6 or more and 10 or less carbon atoms. Suitable specific examples of the aryloxy group include a phenoxy group, a naphthyloxy group, and the like.

Examples of the alkylsulfinyl group in the above formulas (C-II) to (C-VI) include linear or branched sulfinyl groups having 1 or more and 18 or less carbon atoms. Suitable specific examples of the alkylsulfinyl group include a methylsulfinyl group, an ethylsulfinyl group, a propylsulfinyl group, an isopropylsulfinyl group, a butylsulfinyl group, an isobutylsulfinyl group, a sec-butylsulfinyl group, a tert-butylsulfinyl group, a pentylsulfinyl group, an isopentylsulfinyl group, a neopentylsulfinyl, a tert-pentylsulfinyl group, an octylsulfinyl group, an isooctadecylsulfinyl group, and the like.

Examples of the arylsulfinyl group in the above formulas (C-III) to (C-VI) include arylsulfinyl groups having 6 or more and 10 or less carbon atoms. Suitable specific examples of the arylsulfinyl group include a phenylsulfinyl group, a tolylsulfinyl group, a naphthylsulfinyl group, and the like.

Examples of the alkylsulfonyl group in the above formulas (C-II) to (C-VI) include linear or branched alkylsulfonyl groups having 1 or more and 18 or less carbon atoms. Suitable specific examples of the alkylsulfonyl group include a methylsulfonyl group, an ethylsulfonyl group, a propylsulfonyl group, an isopropylsulfonyl group, a butylsulfonyl group, an isobutylsulfonyl group, a sec-butylsulfonyl group, a tert-butylsulfonyl group, a pentylsulfonyl group, an isopentylsulfonyl group, a neopentylsulfonyl group, a tert-pentylsulfonyl group, an octylsulfonyl group, an octadecylsulfonyl group, and the like.

Examples of the arylsulfonyl group in the above formulas (C-III) to (C-VI) include arylsulfonyl groups having 6 or more and 10 or less carbon atoms. Suitable specific examples of the arylsulfonyl group include a phenylsulfonyl group, a tolylsulfonyl group (a tosyl group) and a naphthylsulfonyl group, and the like.

Examples of the hydroxy(poly)alkyleneoxy group in the above formulas (C-II) to (C-VI) include a hydroxy(poly)

alkyleneoxy group represented by HO(AO)$_q$— (wherein AO independently represents an ethyleneoxy group and/or a propyleneoxy group, and q represents an integer of 1 or more and 5 or less), and the like.

Examples of the optionally substituted amino group in the above formulas (C-II) to (C-VI) include an amino group (—NH$_2$) and substituted amino groups having 1 or more and 15 or less carbon atoms. Suitable specific examples of the substituted amino group include a methylamino group, a dimethylamino group, an ethylamino group, a methylethylamino group, a diethylamino group, an n-propylamino group, a methyl-n-propylamino group, an ethyl-n-propylamino group, an n-propylamino group, an isopropylamino group, an isopropylmethylamino group, an isopropylethylamino group, a diisopropylamino group, a phenylamino group, a diphenylamino group, a methylphenylamino group, an ethylphenylamino group, an n-propylphenylamino group and an isopropylphenylamino group, and the like.

Examples of the alkylene group in the above formulas (C-III) and (C-IV) include linear or branched alkylene groups having 1 or more and 18 or less carbon atoms. Suitable specific examples of the alkylene group include a methylene group, a 1,2-ethylene group, a 1,1-ethylene group, a propane-1,3-diyl group, a propane-1,2-diyl group, a propane-1,1-diyl group, a propane-2,2-diyl group, a butane-1,4-diyl group, a butane-1,3-diyl group, a butane-1,2-diyl group, a butane-1,1-diyl group, a butane-2,2-diyl group, a butane-2,3-diyl group, a pentane-1,5-diyl group, a pentane-1,4-diyl group, a hexane-1,6-diyl group, a heptane-1,7-diyl group, an octane-1,8-diyl group, a 2-ethylhexane-1,6-diyl group, a nonane-1,9-diyl group, a decane-1,10-diyl group, an undecane-1,11-diyl group, a dodecane-1,12-diyl group, a tridecane-1,13-diyl group, a tetradecane-1,14-diyl group, a pentadecane-1,15-diyl group, a hexadecane-1,16-diyl group, and the like.

The sulfonium salt (Q) can be synthesized, for example, according to the following scheme. Specifically, 1-fluoro-2-methyl-4-nitrobenzene represented by the following formula (C-1) is allowed to react with a compound represented by the following formula (C-2) in the presence of a base such as potassium hydroxide to obtain a nitro compound represented by the following formula (C-3), which is then reduced in the presence of reduced iron to obtain an amine compound represented by the following formula (C-4). This amine compound and a nitrite (for example, sodium nitrite) represented by MaNO$_2$ (wherein Ma represents a metal atom, for example an alkali metal atom such as sodium atom) are allowed to react to obtain a diazo compound, which is then mixed with a cuprous halide represented by CuX' (wherein X' represents a halogen atom such as a bromine atom; the same applies hereinafter) and a hydrogen halide represented by HX', and reaction is allowed to proceed to obtain a halide represented by the following formula (C-5). Grignard reagent is prepared from this halide and magnesium, and a sulfonium salt represented by the following formula (C-7) can be then obtained by the reaction of this Grignard reagent and a sulfoxide compound represented by the following formula (C-6) in the presence of chlorotrimethylsilane. Furthermore, this sulfonium salt is allowed to react with a salt represented by Mb$^+$X''$^-$ (wherein Mb$^+$ represents a metal cation, for example an alkali metal cation such as a potassium ion and X''$^-$ represents a monovalent anion represented by X$^-$ (excluding halogen anions)) to carry out salt conversion, and a sulfonium salt represented by the following formula (C-8) can be obtained thereby. In the following formulas (C-2) to (C-8), R$^{C1}$ to R$^{C3}$ and A$^{C1}$ are the same as those of the above formula (C-I).

<Scheme>

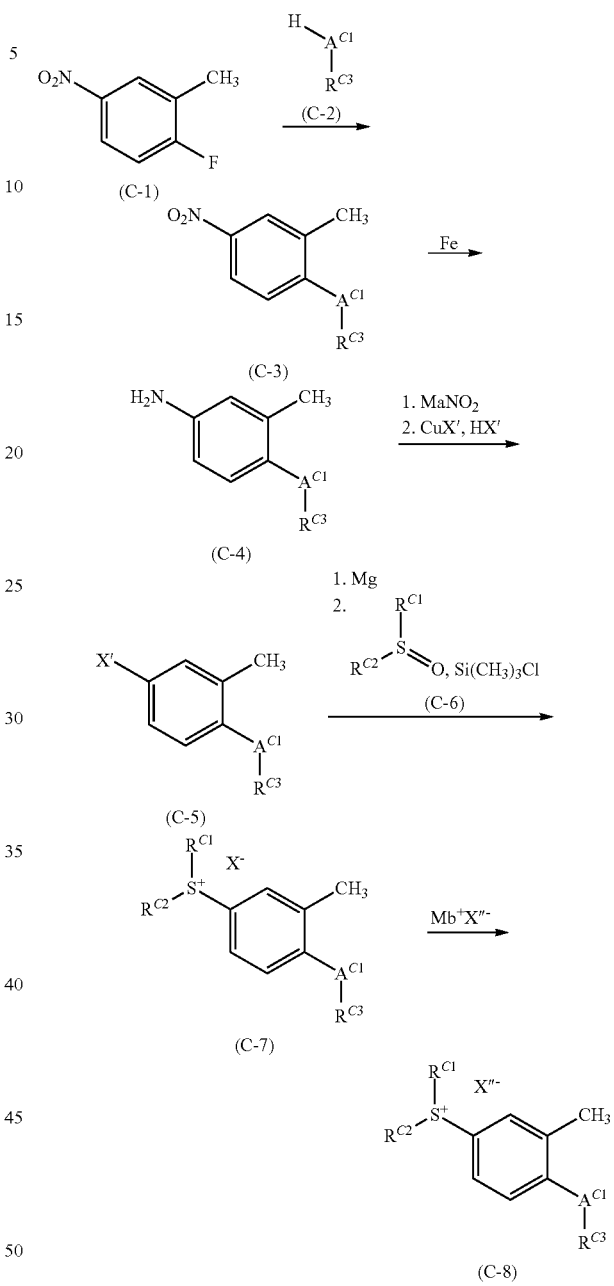

Specific examples of the cation portion of the sulfonium salt (Q) represented by the above formula (C-I) are given below. Specific examples of the anion portion of the sulfonium salt (Q) represented by the above formula (C-I) can include conventionally known anions such as anions mentioned in the above description of X$^-$. The sulfonium salt (Q) represented by the above formula (C-I) can be synthesized according to the above scheme, and the cation portion can be combined with a desired anion portion by further salt conversion as needed. In particular, a combination with an anion represented by R$^{x1}_c$BY$_{4-c}^-$ (wherein R$^{x1}$ represents a phenyl group in which at least part of the hydrogen atoms are substituted with a halogen atom or an electron-withdrawing group; Y represents a halogen atom; and c represents an integer of 1 or more and 4 or less) is preferred.

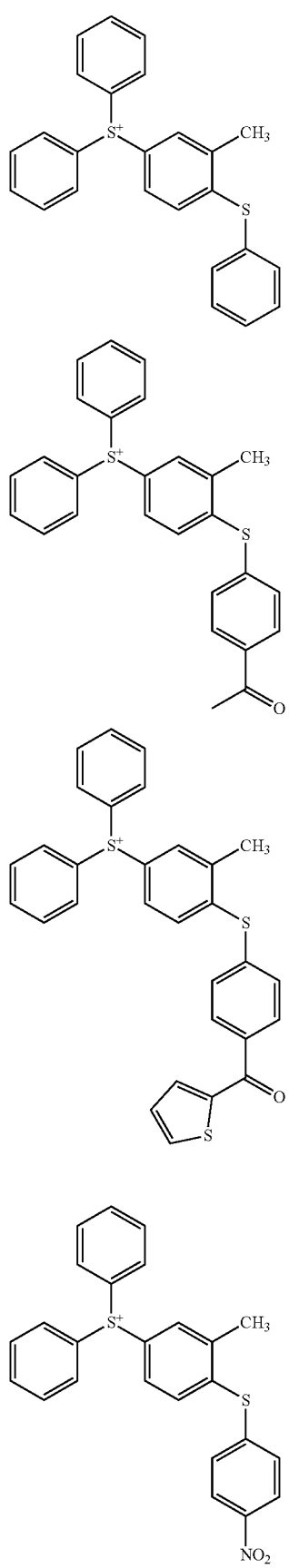
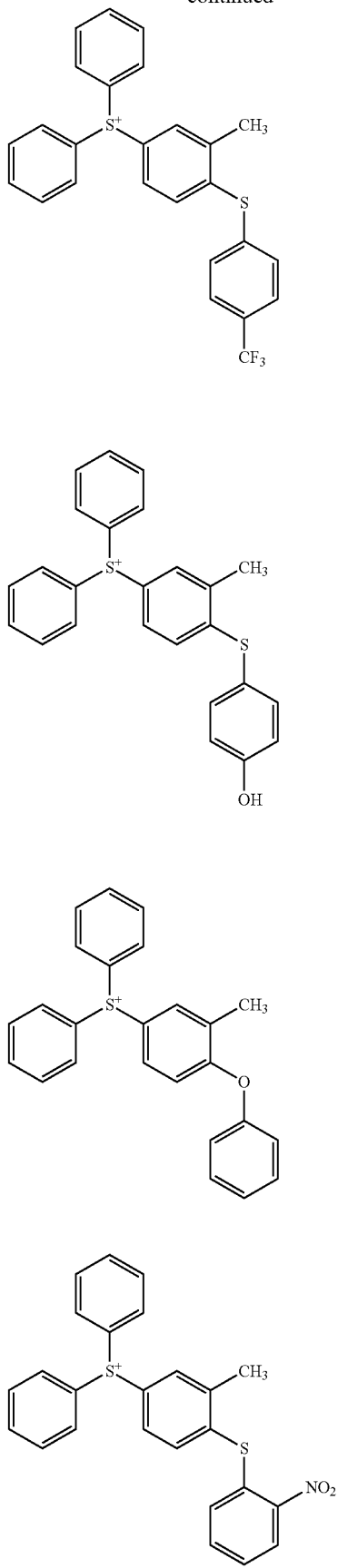

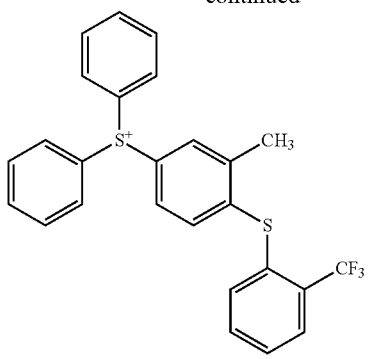

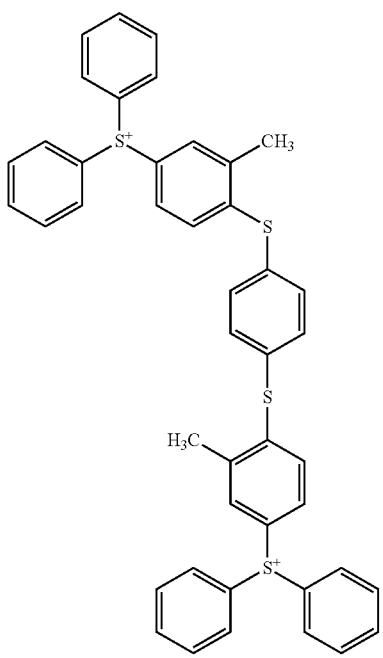

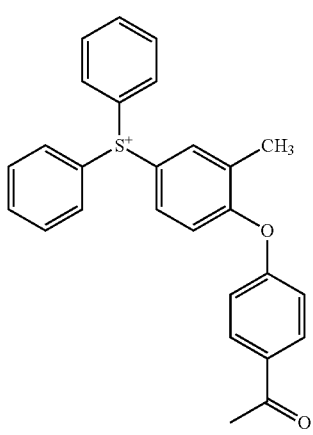

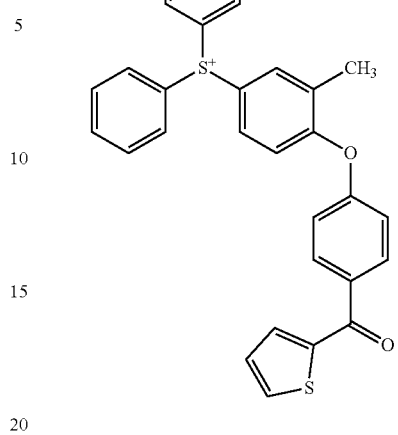

Among the aforementioned group of preferred cation portions, the cation portion represented by the following formula is more preferable.

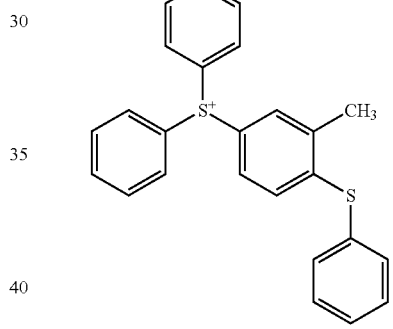

Various onium salts conventionally used for purpose of curing epoxy compounds and the like can be used without particular limitations, as other onium salt other than the sulfoniumu salt (Q). An onium salt such as an iodonium salt and a sulfonium salt is preferred, and a sulfonium salt other than the sulfoniumu salt (Q) is more preferred, as other onium salt.

Hereinafter, a sulfonium salt other than the sulfonium salt (Q) is referred to as "sulfonium salt (Q')". Other sulfonium salt (Q'), same as the sulfonium salt (Q), preferably includes the anion represented by $R^{x1}{}_cBY_{4-c}{}^-$ described above or the anion represented by $R^{x1}{}_cGaY_{4-c}{}^-$ described above as the monovalent anion X.

The sulfonium salt (Q') having a monovalent anion represented by $R^{x1}{}_cBY_{4-c}{}^-$ sulfonium salt is exemplified by a sulfonium salt represented by following formula (C-A). The sulfonium salt (Q') having a monovalent anion represented by $R^{x1}{}_cGaY_{4-c}{}^-$ is a sulfonium salt in which B in the following formula (C-A) is replaced by Ga.

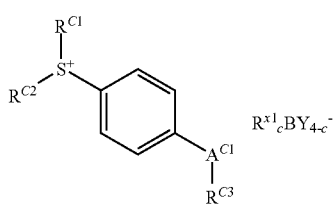 (C-A)
In the formula, $R^{C1}$, $R^{C2}$, $R^{C3}$, $A^{C1}$, $R^{x1}$, Y and C are same as defined above.
Specific examples of a cation portion of the sulfonium salt (Q') represented by above formula (C-A) include following cations.
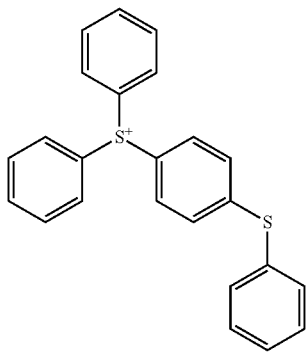
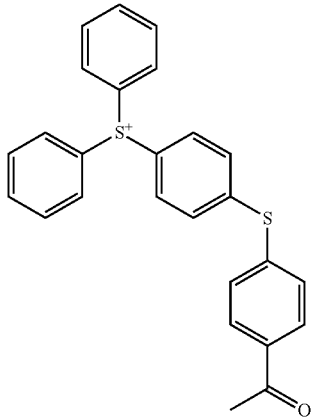
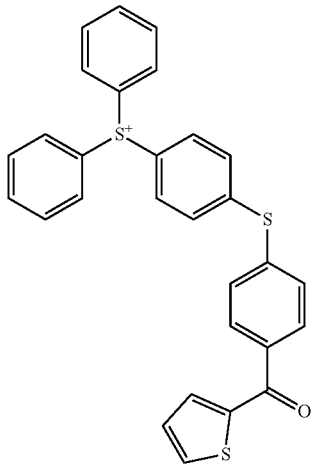
-continued
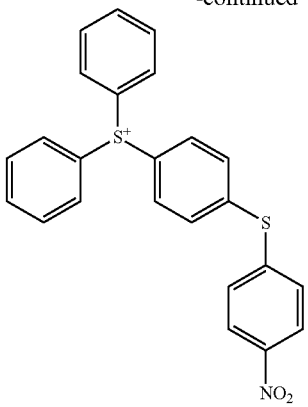
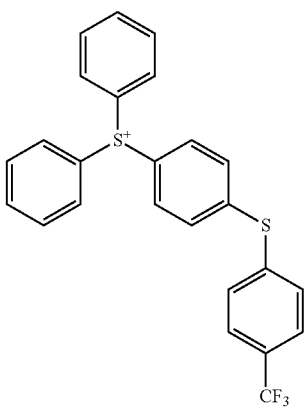
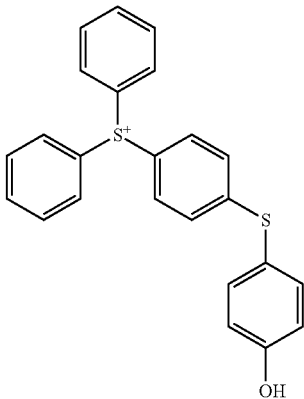
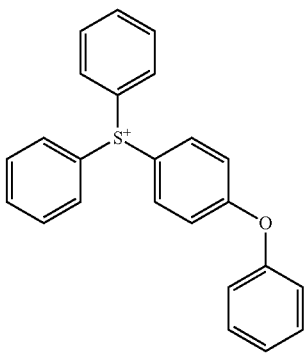 [SMILES: Cc1cc([S+](c2ccccc2)c2ccccc2)ccc1Sc1ccccc1]

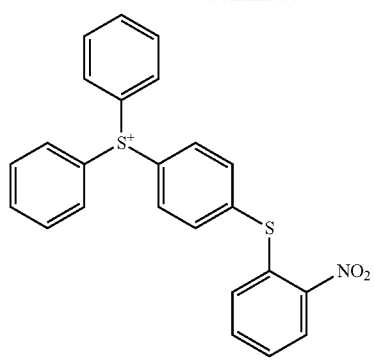
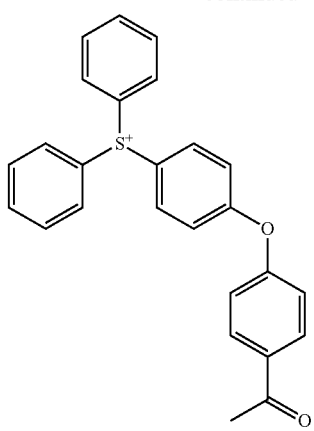
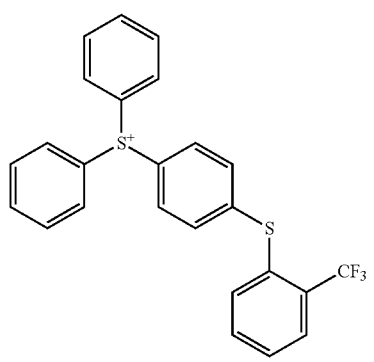
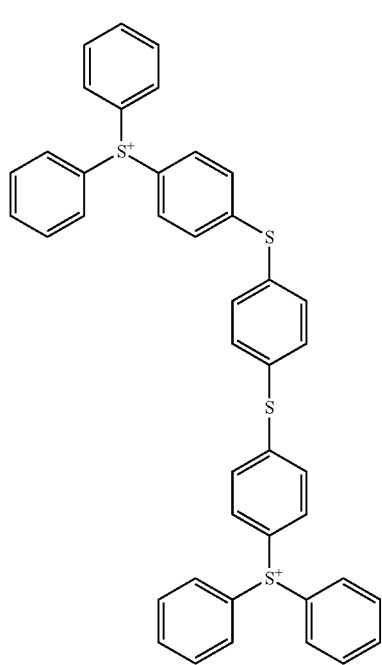
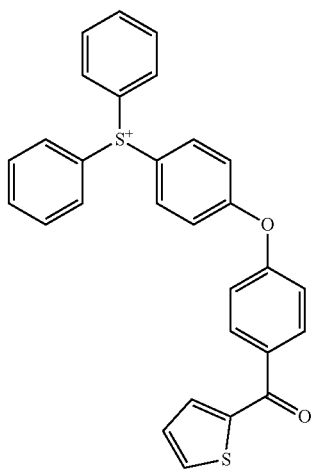 [SMILES: O=C(c1ccc(Oc2ccc([S+](c3ccccc3)c3ccccc3)cc2)cc1)c1cccs1]
Typical examples of the cation portion of the sulfonium salt (Q') also include following cations.

55
-continued
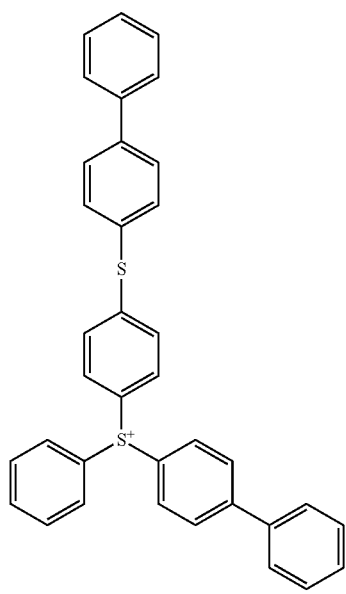
56
-continued
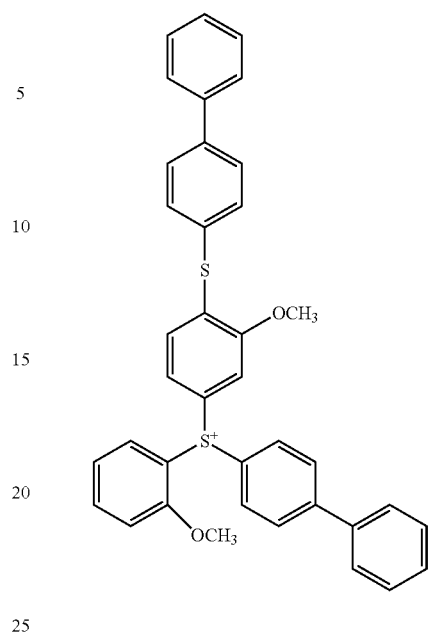
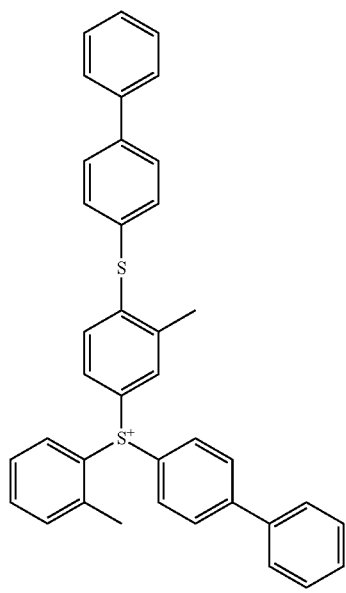
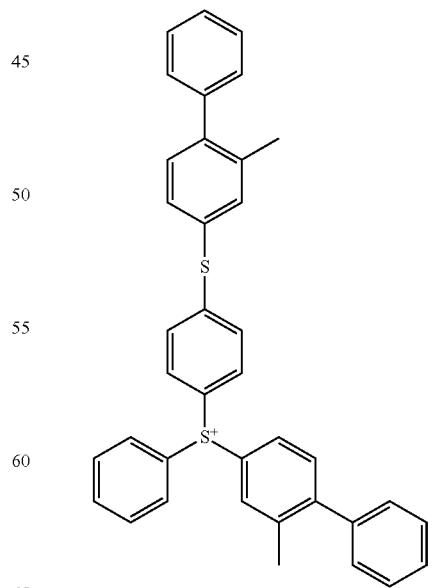

-continued
57
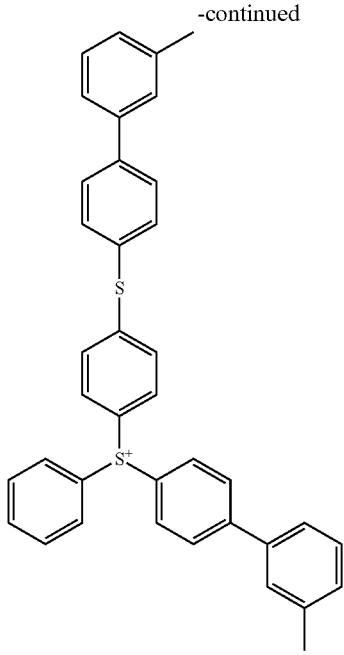
58
-continued
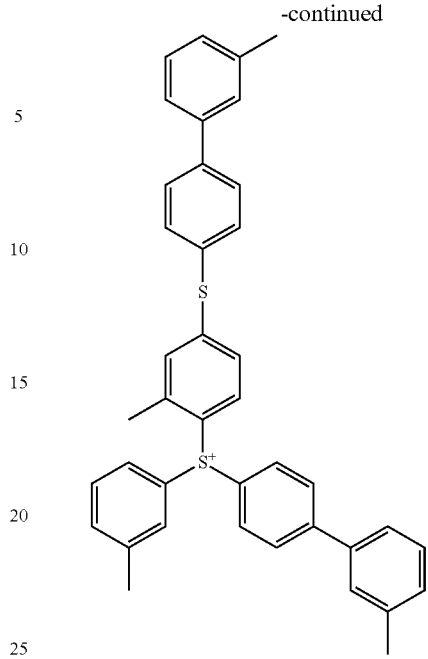
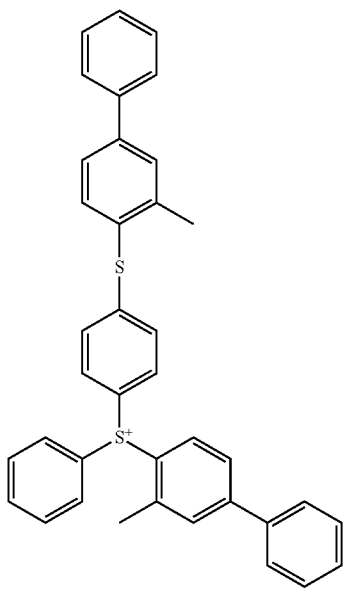
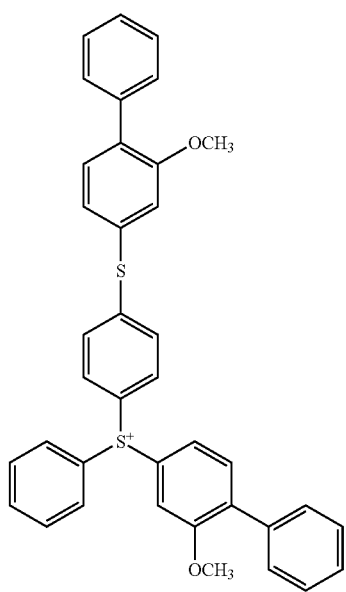

59
-continued
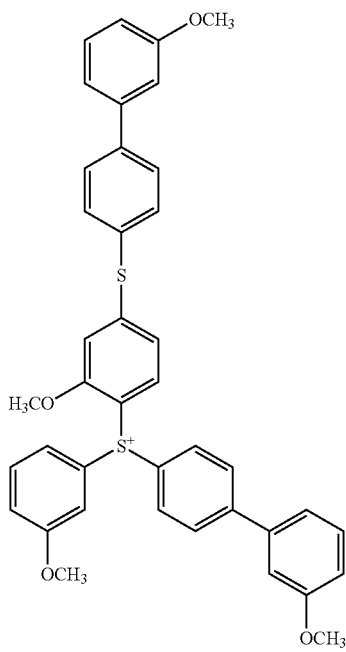
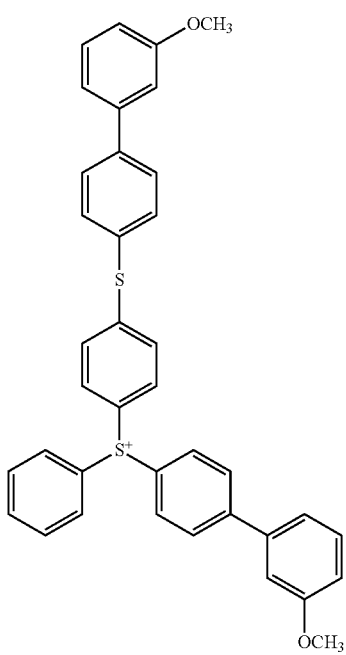
60
-continued
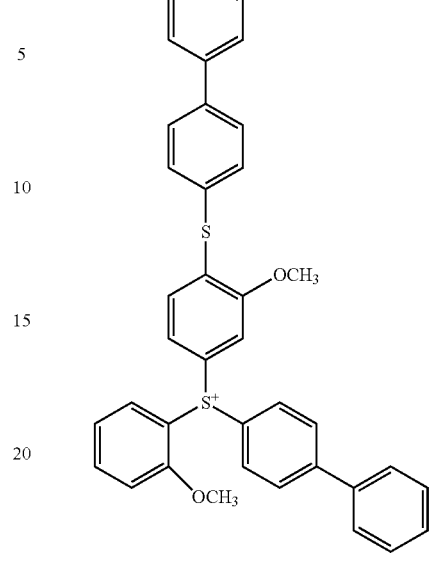
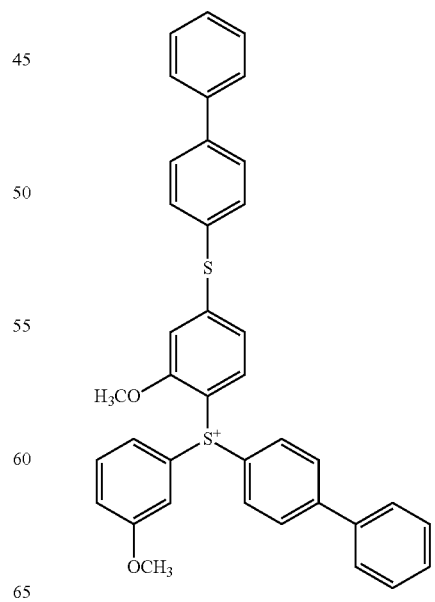

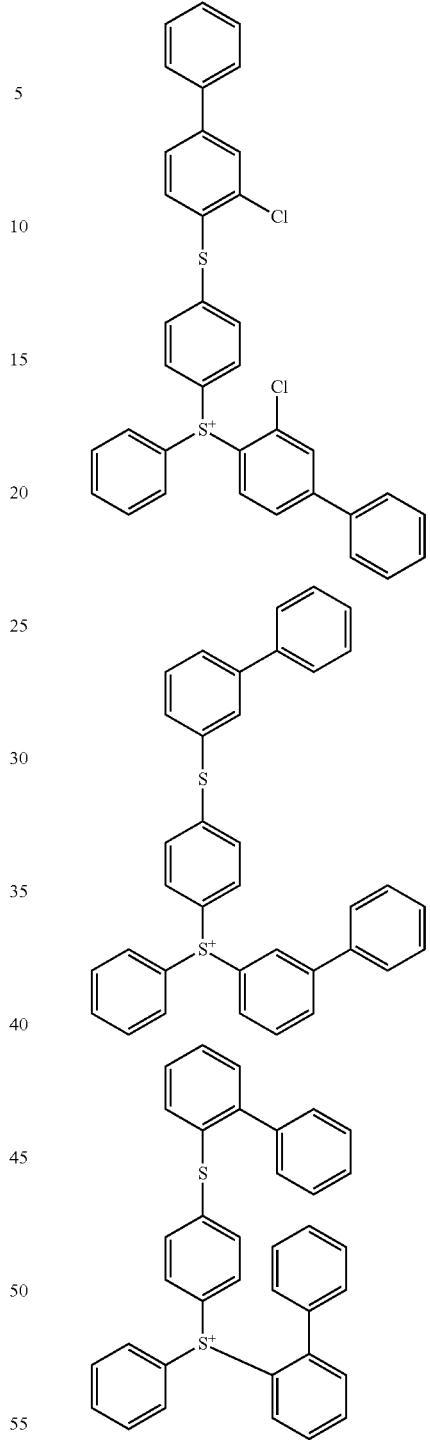

The content of the onium salt (C1) in the curable liquid composition is not particularly limited as long as the curing of the curable liquid composition favorably proceeds. The content of the onium salt (C1) in the curable liquid composition relative to 100 parts by mass of the epoxy compound (B) is typically 0.01 parts by mass or more and 50 parts by mass or less, preferably 0.01 parts by mass or more and 30 parts by mass or less, more preferably 0.01 parts by mass or more and 20 parts by mass or less, even more preferably 0.05 parts by mass or more and 15 parts by mass or less, and particularly preferably 1 part by mass or more and 10 parts by mass or less from the viewpoint of ease of favorably curing the curable liquid composition.

[Base Generator (C2)]

A base is generated by a base generator (C2), heating or exposure to light. The base generated by the base generator (C2) cures the epoxy compound (B). As the base generator (C2), a conventionally known base generator can be used without particular limitation. For example, 2-benzyl-2-dimethylamino-1-(4-morpholinophenyl)-butane-1-one, can be used as a base generator.

A compound that generates an imidazole compound represented by the following formula (c1) (hereinafter, this compound is also referred to as a heat-responsive imidazole generator) is also preferably used as the curing agent.

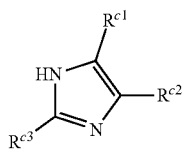

(c1)

In the formula (c1), $R^{c1}$, $R^{c2}$, and $R^{c3}$ each independently represent a hydrogen atom, a halogen atom, a hydroxy group, a mercapto group, a sulfide group, a silyl group, a silanol group, a nitro group, a nitroso group, a phosphino group, a sulfonato group, a phosphinyl group, a phosphonato group, or an organic group.

As the organic group in $R^{c1}$, $R^{c2}$, and $R^{c3}$, an alkyl group, an alkenyl group, a cycloalkyl group, a cycloalkenyl group, an aryl group, an aralkyl group, and the like can be exemplified. The organic group can include a bond or a substituent other than a hydrocarbon group such as a heteroatom. In addition, the organic group can be either linear, branched, or cyclic. The organic group is generally monovalent; however, it can also be an organic group of divalent or more in a case of forming a cyclic structure or the like.

$R^{c1}$ and $R^{c2}$ can bind to form a cyclic structure, and can further include a heteroatom bond. As the cyclic structure, a heterocycloalkyl group, a heteroaryl group and the like can be exemplified, and the cyclic structure can also be a condensed ring.

A bond included in the organic group of $R^{c1}$, $R^{c2}$, and $R^{c3}$ is not particularly limited as long as the effect of the present invention is not impaired. The organic group can include a bond including a heteroatom such as an oxygen atom, a nitrogen atom, a silicon atom and the like. Specific examples of the bond including a heteroatom include an ether bond, a thioether bond, a carbonyl bond, a thiocarbonyl bond, an ester bond, an amide bond, a urethane bond, an imino bond (—N═C(—$R^{c0}$)—, —C(═N$R^{c0}$)—: $R^{c0}$ representing a hydrogen atom or an organic group), a carbonate bond, a sulfonyl bond, a sulfinyl bond, an azo bond and the like.

As the bond including a heteroatom which can be included in the organic group of $R^{c1}$, $R^{c2}$, and $R^{c3}$, an ether bond, a thioether bond, a carbonyl bond, a thiocarbonyl bond, an ester bond, an amide bond, a urethane bond, an imino bond (—N═C(—$R^{c0}$)—, —C(═N$R^{c0}$)—: $R^{c0}$ representing a hydrogen atom or an organic group), a carbonate bond, a sulfonyl bond, and a sulfinyl bond are preferable from the viewpoint of thermal resistance of the imidazole compound.

In the case in which the organic group of $R^{c1}$, $R^{c2}$, and $R^{c3}$ is a substituent other than a hydrocarbon group, $R^{c1}$, $R^{c2}$, and $R^{c3}$ are not particularly limited as long as the effect of the present invention is not impaired. Specific examples of $R^{c1}$, $R^{c2}$, and $R^{c3}$ include a halogen atom, a hydroxyl group, a mercapto group, a sulfide group, a cyano group, an isocyano group, a cyanato group, an isocyanato group, a thiocyanato group, an isothiocyanato group, a silyl group, a silanol group, an alkoxy group, an alkoxycarbonyl group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenylether group, an alkylthioether group, an alkenylthioether group, an arylether group, an arylthioether group and the like. The hydrogen atom included in the substituent can be substituted by a hydrocarbon group. The hydrocarbon group included in the aforementioned substituent can be either linear, branched, or cyclic.

As $R^{c1}$, $R^{c2}$, and $R^{c3}$, a hydrogen atom, an alkyl group having 1 or more and 12 or less carbon atoms, an aryl group having 1 or more and 12 or less carbon atoms, an alkoxy group having 1 or more and 12 or less carbon atoms, and a halogen atom are preferable, and a hydrogen atom is more preferable.

The heat-responsive imidazole generator is not particularly limited, as long as the imidazole compound represented by the formula (c1) is generated by the action of heat. Compounds which are used as a heat-responsive imidazole generator are obtained by replacing the skeleton originating from amines which are generated upon heating from the compounds (heat-responsive base generator) which have been conventionally contained in various compositions and generate amines by the action of heat, with the skeleton originating from the imidazole compounds represented by the formula (c1).

Examples of the preferred heat-responsive imidazole generator include the compounds represented by the following formula (c2):

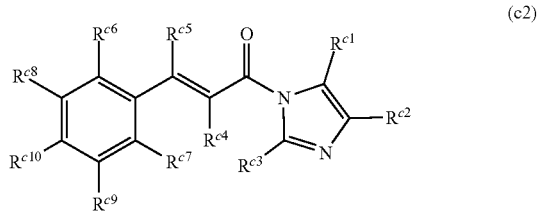

(c2)

wherein, in the formula (c2), $R^{c1}$, $R^{c2}$, and $R^{c3}$ each independently represent a hydrogen atom, a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group;

$R^{c4}$ and $R^{c5}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group;

$R^{c6}$, $R^{c7}$, $R^{c8}$, $R^{c9}$, and $R^{c10}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group; and two or more of $R^{c6}$, $R^{c7}$, $R^{c8}$, $R^{c9}$, and $R^{c10}$ may join together to form a cyclic structure, or may include a bond of a heteroatom.

In the formula (c2), $R^{c1}$, $R^{c2}$, and $R^{c3}$ are the same as $R^{c1}$, $R^{c2}$, and $R^{c3}$ described above in the formula (c1).

In the formula (c2), $R^{c4}$ and $R^{c5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group or an organic group.

As the organic group in $R^{c4}$ and $R^{c5}$, the organic group listed for $R^{c1}$, $R^{c2}$, and $R^{c3}$ can be exemplified. The organic group can include a heteroatom, as in the case of $R^{c1}$, $R^{c2}$, and $R^{c3}$. The organic group can be either linear, branched, or cyclic.

Among the above, $R^{c4}$ and $R^{c5}$ are preferably, each independently, a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxyalkyl group having 7 or more and 16 or less carbon atoms, an aralkyl group having 7 or more and 20 or less carbon atoms, an alkyl group having 2 or more and 11 or less carbon atoms substituted with a cyano group, an alkyl group having 1 or more and 10 or less carbon atoms substituted with a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group (—COOR$^d$, —OCOR$^d$: $R^d$ representing a hydrocarbon group) having 2 or more and 11 or less carbon atoms, an aryl group having 6 or more and 20 or less carbon atoms, an aryl group having 6 or more and 20 or less carbon atoms in which an electron-donating group and/or an electron-withdrawing group are substituted, a benzyl group in which an electron-donating group and/or an electron-withdrawing group are substituted, a cyano group, and a methylthio group. More preferably, $R^{c4}$ and $R^{c5}$ are both hydrogen atoms; or $R^{c4}$ is a methyl group and $R^{c5}$ is a hydrogen atom.

In the formula (c2), $R^{c6}$, $R^{c7}$, $R^{c8}$, $R^{c9}$, and $R^{c10}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group.

As the organic group in $R^{c6}$, $R^{c7}$, $R^{c8}$, $R^{c9}$, and $R^{c10}$, the organic group listed for $R^{c1}$, $R^{c2}$, and $R^{c3}$ can be exemplified. As in the case of $R^{c1}$ and $R^{c2}$, the organic group can include a bond or a substituent other than a hydrocarbon group such as a heteroatom. The organic group can be either linear, branched, or cyclic.

At least two of $R^{c6}$, $R^{c7}$, $R^{c8}$, $R^{c9}$, and $R^{c10}$ can bind to form a cyclic structure, and these can further include a bond of heteroatoms. As the cyclic structure, a heterocycloalkyl group, a heteroaryl group and the like can be exemplified, and the cyclic structure can also be a condensed ring. For example, $R^{c6}$, $R^{c7}$, $R^{c8}$, $R^{c9}$, and $R^{c10}$ can form a condensed ring such as naphthalene, anthracene, phenanthrene, indene and the like, through bonding of at least two of these and sharing of an atom of a benzene ring to which $R^{c6}$, $R^{c7}$, $R^{c8}$, $R^{c9}$, and $R^{c10}$ are bound.

Among the above, $R^{c6}$, $R^{c7}$, $R^{c8}$, $R^{c9}$, and $R^{c10}$ are, preferably, each independently a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxyalkyl group having 7 or more and 16 or less carbon atoms, an aralkyl group having 7 or more and 20 or less carbon atoms, an alkyl group having 2 or more and 11 or less carbon atoms substituted with a cyano group, an alkyl group having 1 or more and 10 or less carbon atoms substituted with a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group having 2 or more and 11 or less carbon atoms, an aryl group having 6 or more and 20 or less carbon atoms, an aryl group having 6 or more and 20 or less carbon atoms in which an electron-donating group and/or an electron-withdrawing group are substituted, a benzyl group in which an electron-donating group and/or an electron-withdrawing group are substituted, a cyano group, a methylthio group and a nitro group.

A case where two or more of $R^{c6}$, $R^{c7}$, $R^{c8}$, $R^{c9}$, and $R^{c10}$ join together to form a condensed ring such as naphthalene, anthracene, phenanthrene and indene by sharing the atoms of the benzene ring to which $R^{c6}$, $R^{c7}$, $R^{c8}$, $R^{c9}$, and $R^{c10}$ are attached is also preferred.

Among the compounds represented by the formula (c2), compounds represented by the following formula (c3);

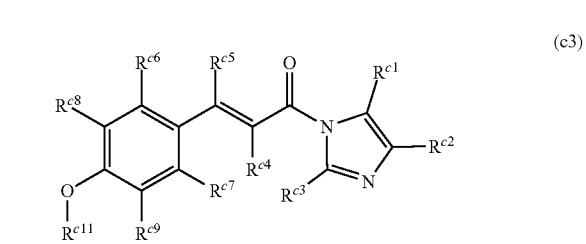

wherein, in the formula (c3), $R^{c1}$, $R^{c2}$, and $R^{c3}$ are as defined in the formulas (c1) and (c2);
$R^{c4}$ to $R^{c9}$ are as defined in the formula (c2);
$R^{c11}$ represents a hydrogen atom or an organic group;
$R^{c6}$ and $R^{c7}$ shall not be a hydroxyl group; and
two or more of $R^{c6}$, $R^{c7}$, $R^{c8}$, and $R^{c9}$ may join together to form a cyclic structure, or may include a bond of a heteroatom, are preferred.

The compounds represented by the formula (c3) have good solubility in organic solvents because they have a substituent —O—$R^{c11}$.

In the formula (c3), $R^{c11}$ is a hydrogen atom or an organic group. In a case where $R^{c11}$ is an organic group, the organic group exemplified with regard to $R^{c1}$, $R^{c2}$, and $R^{c3}$ may be referred to as the organic group. This organic group may include a heteroatom in the organic group. This organic group may be either linear, branched, or cyclic. For $R^{c11}$, a hydrogen atom or an alkyl or alkoxyalkyl group having 1 or more and 12 or less carbon atoms is preferred, and a methyl group, an ethyl group, an n-propyl group, an isopropyl group, an n-butyl group, an isobutyl group, a tert-butyl group, a methoxymethyl group, an ethoxymethyl group, a methoxyethyl group, an ethoxyethyl group, a propoxymethyl group, or a butoxymethyl group is more preferred.

Specific examples of the compounds particularly suitable for the heat-responsive imidazole generator are shown below.

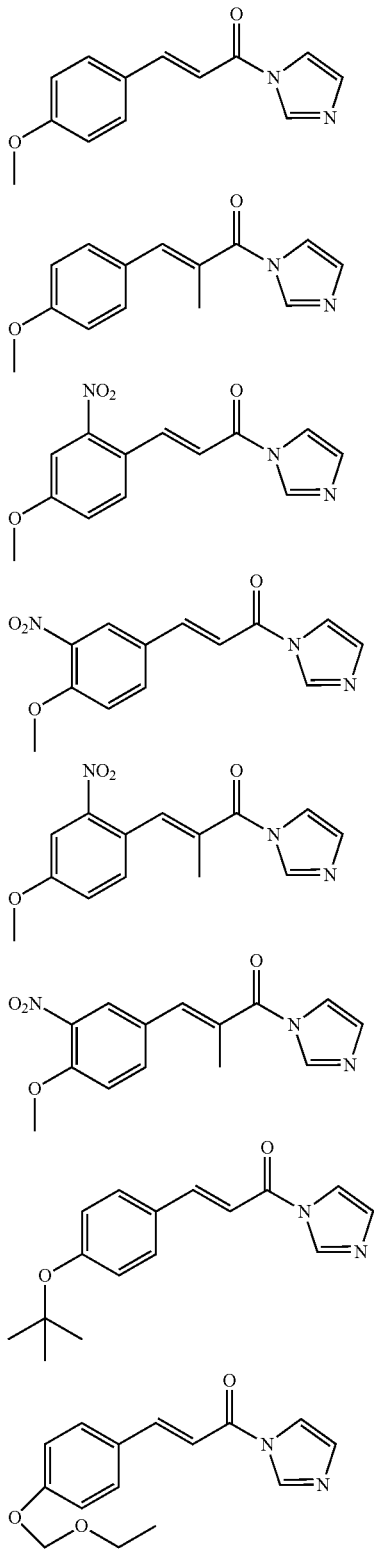

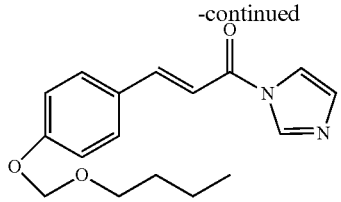

The liquid curable composition may include two or more of the base generator (C2). Typically, the content of the base generator (C2) in the curable liquid composition is preferably 0.01% by mass or more and 40% by mass or less, more preferably 0.1% by mass or more and 20% by mass or less, and particularly preferably 1% by mass or more and 10% by mass or less relative to the mass of the solid content of the curable liquid composition.

[Other Curing Agent (C3) for Epoxy Compound]

Other curing agent (C3) (hereinafter, also referred to as "curing agent (C3)") other than the onium salt (C1) and the base generator (C2) described above can be used as the curing agent (C). Other curing agent (C3) can be appropriately selected from curing agents which are conventionally known curing agents for epoxy compounds.

Examples of the curing agent (C3) include a phenol-based curing agent, an acid anhydride-based curing agent, a polyamine-based curing agent, and catalytic curing agent. The amount of the phenol-based curing agent and the acid anhydride-based curing agent used relative to 100 parts by mass of the amount of the epoxy compound (B) in the curable liquid composition is preferably 1 part by mass or more and 200 parts by mass or less, more preferably 50 parts by mass or more and 150 parts by mass or less, and particularly preferably 80 parts by mass or more and 120 parts by mass or less. The phenol-based curing agent, and the acid anhydride-based curing agent can be each used individually or two or more thereof can be used in combination. The amount of the polyamine-based curing agent used relative to 100 parts by mass of the amount of the epoxy compound (B) in the curable liquid composition is preferably 0.1 parts by mass or more and 50 parts by mass or less, more preferably 0.5 parts by mass or more and 30 parts by mass or less, and particularly preferably 1 part by mass 15 parts by mass. These polyamine-based curing agents can be used individually or two or more polyamine-based curing agents can be used in combination. The amount of the catalytic curing agent used relative to 100 parts by mass of the amount of the epoxy compound (B) in the curable liquid composition is preferably 1 part by mass or more and 100 parts by mass or less, more preferably 1 part by mass or more and 80 parts by mass or less, and particularly preferably 1 part by mass or more and 50 parts by mass or less. These catalytic curing agents can be used individually or two or more catalytic curing agents can be used in combination.

<Ionic liquid (D)>

The curable liquid composition may contain an ionic liquid (D) for the purpose of further facilitating dispersion of the particulate filler (A). In particular, when the curable liquid composition contains the quantum dot as particulate filler (A), the curable liquid composition preferably contains the ionic liquid (D) from the viewpoint of facilitating the dispersion of the quantum dots. It is noted that the ionic liquid (D) is not included in the organic solvent (S) described below. As the ionic liquid (D), ionic liquids that are used in the field of organic synthesis and in electrolytes for batteries etc. can be used without particular limitation. The ionic liquid (D) is typically a salt capable of being molten in a temperature region of 140° C. or lower, and is preferably a stable salt that is liquid at 140° C. or lower.

The melting point of the ionic liquid (D) is preferably 120° C. or lower, more preferably 100° C. or lower, and even more preferably 80° C. or lower from the viewpoint of the handleability of the ionic liquid (D) and the liquid composition.

The ionic liquid (D) is preferably composed of an organic cation and an anion. The ionic liquid (D) is preferably composed of a nitrogen-containing organic cation, a phosphorus-containing organic cation, or a sulfur-containing organic cation, and a counteranion, and more preferably of a nitrogen-containing organic cation or a phosphorus-containing organic cation, and a counteranion.

As the organic cation constituting the ionic liquid (D), at least one selected from the group consisting of an alkyl chain quaternary ammonium cation, a piperidinium cation, a pyrimidinium cation, a pyrrolidinium cation, an imidazolium cation, a pyridinium cation, a pyrazolium cation, a guanidinium cation, a morpholinium cation, a phosphonium cation and a sulfonium cation is preferable, and an alkyl chain quaternary ammonium cation, a piperidinium cation, a pyrrolidinium cation, an imidazolium cation, a morpholinium cation, or a phosphonium cation is more preferable in light of e.g. their favorable affinity for the organic solvent (S) described later, and a pyrrolidinium cation, an imidazolium cation, or a phosphonium cation is even more preferable from the viewpoint that the effects of the invention are particularly likely to be achieved.

Specific examples of the alkyl chain quaternary ammonium cation include a quaternary ammonium cation represented by the following formula (L1). More specifically, the alkyl chain quaternary ammonium cation is exemplified by, for example, a tetramethylammonium cation, an ethyltrimethylammonium cation, a diethyldimethylammonium cation, a triethylmethylammonium cation, a tetraethylammonium cation, an octyltrimethylammonium cation, a hexyltrimethylammonium cation, a methyltrioctylammonium cation, and the like. Specific examples of the piperidinium cation include a piperidinium cation represented by the following formula (L2). More specifically, the piperidinium cation is exemplified by, for example, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpiperidinium cation, a 1,1-dipropylpiperidinium cation, a 1-propyl-1-butylpiperidinium cation, a 1,1-dibutylpiperidinium cation, and the like. Specific examples of the pyrimidinium cation include a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation, and the like.

Specific examples of the pyrrolidinium cation include a pyrrolidinium cation represented by the following formula (L3), and more specifically, a 1,1-dimethylpyrrolidinium cation, a 1-ethyl-1-methylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, and the like. Specific examples of the imidazolium cation include an imidazolium cation represented by the following formula (L5), and more specifically, a 1,3-dimethylimidazolium cation, a 1,3-diethylimidazolium cation, a 1-ethyl-3-methylimidazolium cation, a 1-propyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, and the like. Specific examples of the pyridinium cation include a pyridinium cation represented by the following formula (L6), and more specifically, a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, and the like.

Specific examples of the pyrazolium cation include a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation, and the like.

Specific examples of the phosphonium cation include a phosphonium cation represented by the following formula (L4). More specifically, the phosphonium cation is exemplified by tetraalkylphosphonium cations such as a tetrabutylphosphonium cation, a tributylmethylphosphonium cation, and a tributylhexylphosphonium cation, and a triethyl(methoxymethyl)phosphonium cation, and the like. Specific examples of the sulfonium cation include a triethylsulfonium cation, a dimethylethylsulfonium cation, a triethylsulfonium cation, an ethylmethylpropylsulfonium cation, a butyldimethylsulfonium cation, a 1-methyltetrahydrothiophenium cation, a 1-ethyltetrahydrothiophenium cation, a 1-propyltetrahydrothiophenium cation, a 1-butyltetrahydrothiophenium cation, or a 1-methyl-[1,4]-thioxonium cation, and the like. Among these, as the sulfonium cation, a sulfonium cation having a cyclic structure such as a tetrahydrothiophenium-based or hexahydrothiopyrylium-based 5-membered ring or 6-membered ring is preferable, and the sulfonium cation may have a heteroatom such as an oxygen atom in the cyclic structure.

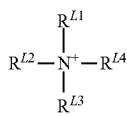
(L1)

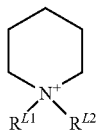
(L2)

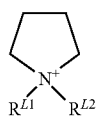
(L3)

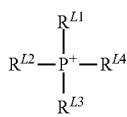
(L4)

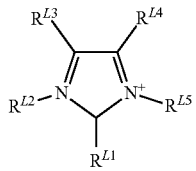
(L5)

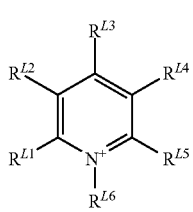
(L6)

In the formulas (L1) to (L4), $R^{L1}$ to $R^{L4}$ each independently represent an alkyl group having 1 or more and 20 or less carbon atoms, or an alkoxyalkyl group represented by $R^{L7}$—O—$(CH_2)_{Ln}$— (in which, $R^{L7}$ represents a methyl group or an ethyl group, and Ln represents an integer of 1 or more and 4 or less). In the formula (L5), $R^{L1}$ to $R^{L4}$ each independently represent an alkyl group having 1 or more and 20 or less carbon atoms, an alkoxyalkyl group represented by $R^{L7}$—O—$(CH_2)_{Ln}$— (in which, $R^{L7}$ represents a methyl group or an ethyl group, and Ln represents an integer of 1 or more and 4 or less), or a hydrogen atom. In the formula (L6), $R^{L1}$ to $R^{L6}$ each independently represent an alkyl group having 1 or more and 20 or less carbon atoms, an alkoxyalkyl group represented by $R^{L7}$—O—$(CH_2)_{Ln}$— (in which, $R^{L7}$ represents a methyl group or an ethyl group, and Ln represents an integer of 1 or more and 4 or less), or a hydrogen atom.

The anion constituting the ionic liquid (D) may be an organic anion or an inorganic anion. The organic anion is preferable because of favorable affinity of the ionic liquid (D) for the organic solvent (S) described later. The organic anion is preferably at least one selected from the group consisting of a carboxylic acid-based anion, an N-acylamino acid ion, an acidic amino acid anion, a neutral amino acid anion, an alkyl sulfuric acid-based anion, a fluorine-containing compound-based anion and a phenol-based anion, and more preferably a carboxylic acid-based anion, a fluorine-containing compound-based anion or an N-acylamino acid ion.

Specific examples of the carboxylic acid-based anion include an acetate ion, a decanoate ion, a 2-pyrrolidone-5-carboxylate ion, a formate ion, an α-lipoate ion, a lactate ion, a tartarate ion, a hippurate ion, an N-methylhippurate ion, and the like. Among these, an acetate ion, a 2-pyrrolidone-5-carboxylate ion, a formate ion, a lactate ion, a tartarate ion, a hippurate ion and an N-methylhippurate ion are preferable, and an acetate ion, an N-methylhippurate ion and a formate ion are more preferable. Specific examples of the N-acylamino acid ion include an N-benzoylalanine ion, an N-acetylphenylalanine ion, an aspartate ion, a glycine ion, an N-acetylglycine ion, and the like, and among these, an N-benzoylalanine ion, an N-acetylphenylalanine ion and an N-acetylglycine ion are preferable, and an N-acetylglycine ion is more preferable.

Specific examples of the acidic amino acid anion include an aspartate ion, a glutamate ion, and the like, and specific examples of the neutral amino acid anion include a glycine ion, an alanine ion, a phenylalanine ion, and the like. Specific examples of the alkyl sulfuric acid-based anion include a methanesulfonate ion, and the like. Specific examples of the fluorine-containing compound-based anion include a trifluoromethanesulfonate ion, a hexafluorophosphonate ion, a trifluorotris(pentafluoroethyl)phosphonate ion, a bis(fluoroalkylsulfonyl)imide ion (for example, a bis(perfluoroalkylsulfonyl)imide ion having 1 or more and 5 or less carbon atoms, and preferably bis(trifluoromethanesulfonyl)imide ion), a trifluoroacetate ion, a tetrafluoroborate ion, and the like. Specific examples of the phenol-based anion include a phenol ion, a 2-methoxyphenol ion, a 2,6-di-tert-butylphenol ion, and the like.

The inorganic anion is preferably at least one selected from the group consisting of $F^-$, $Cl^-$, $Br^-$, $I^-$, $BF_4^-$, $PF_6^-$ and $N(SO_2F)_2^-$, more preferably $BF_4^-$, $PF_6^-$ or $N(SO_2F)_2^-$, and even more preferably $BF_4^-$ or $PF_6^-$ from the viewpoint of more reliable achievement of the effects of the invention.

The ionic liquid (D) can be produced by, for example, a procedure disclosed in paragraph 0045 of PCT International Publication No. 2014/178254, etc. The ionic liquid (D) can be used individually or two or more ionic liquids (B) can be used in combination. The content of the ionic liquid (D) is not particularly limited as long as the effects of the invention can be achieved. The content of the ionic liquid (D) relative to 100 parts by mass of the particulate filler (A) is preferably 10 parts by mass or more and 150 parts by mass or less, more preferably 20 parts by mass or more and 100 parts by mass or less, and even more preferably 50 parts by mass or more and 80 parts by mass or less from the viewpoint of a favorable effect of dispersion of the particulate filler (A) in the curable liquid composition.

<Organic Solvent (S)>

The curable liquid composition may include an organic solvent (S). From the viewpoint of the dispersibility of the particulate filler (A), the organic solvent (S) preferably has a cyclic skeleton and includes an organis solvent (S1) that is a compound containing a heteroatom. The organic solvent (S1) is a non-hydrocarbon solvent. The heteroatom which may be included in the organic solvent (S1) is exemplified by N, O, S, P, and the like.

An alicyclic skeleton is preferred as a cyclic skeleton included in the organic solvent (S1). Herein, a cyclic skeleton which exhibits no aromaticity is deemed as an alicyclic skeleton. In addition, in the case in which the organic solvent (S1) has both an aromatic ring skeleton and an alicyclic skeleton like a tetralin ring, the organic solvent (S1) is deemed as having an alicyclic skeleton. It is inferred that greater bulkiness of the alicyclic skeleton to some extent than the aromatic ring skeleton, which has a planar steric structure, favorably contributes to promoting dispersion of the particulate filler (A) and the stabilization of the dispersion, although the reasons therefor are unclear.

The organic solvent (S1) preferably has at least one type of bond selected from the group consisting of an ester bond (—CO—O—), an amide bond (—CO—NH—), a carbonate bond (—O—CO—O—), a ureido bond (—NH—CO—NH—), and a urethane bond (—O—CO—NH—). In the present description, when the ester bond and the amide bond are simply referred to, the ester bond and the amide bond respectively mean a "carboxylic acid ester bond" and a "carboxylic acid amide bond". In the amide bond, the ureido bond, and the urethane bond, an organic group may be bonded to a nitrogen atom. The type of the organic group is not particularly limited. The organic group is preferably an alkyl group, more preferably an alkyl group having 1 or more and 6 or less carbon atoms, and even more preferably a methyl group or an ethyl group. In the case in which the organic solvent (S1) includes an ester bond, an amide bond, a carbonate bond, a ureido bond, and/or a urethane bond, desired effect by using the organic solvent (S1) is easily obtained. In addition, in the case in which the solvent (S1) includes any of these bonds, for the curable liquid composition including the epoxy compound (B), the epoxy compound (B) is likely to be favorably dissolved in the curable liquid composition.

Preferred examples of the organic solvent (S1) include: aromatic solvents such as an anisole, a phenetole, a propyl phenyl ether, a butyl phenyl ether, a cresyl methyl ether, an ethyl benzyl ether, a diphenyl ether, a dibenzyl ether, an acetophenone, a propiophenone, a benzophenone, a pyridine, a pyrimidine, a pyrazine, and a pyridazine; alicyclic alcohols such as cyclopentanol, cyclohexanol, 1,4-cyclohexanediol, 1,3-cyclohexanediol, 1,4-cyclohexanedimethanol, and 1,3-cyclohexanedimethanol; alicyclic ethers such as cyclohexyl methyl ether, cyclohexyl ethyl ether, tetrahydrofuran, tetrahydropyran, and dioxane; alicyclic ketones such as cyclopentanone, cyclohexanone, cycloheptanone, 2-methylcyclohexanone, 1,4-cyclopentanedione, and 1,3-cyclopentanedione; lactones such as β-propiolactone, γ-butyrolactone, β-methyl-γ-butyrolactone, 5-valerolactone, ε-valerolactone, ε-caprolactone, α-methyl-ε-caprolactone, and ε-methyl-ε-caprolactone; cyclic amides or cyclic ureas such as N-methyl-2-pyrrolidone, N-ethyl-2-pyrrolidone, 1,3-dimethyl-2-imidazolidinone, and N,N-dimethylpropyleneurea; cyclic carbonate such as ethylene carbonate, and propylene carbonate; and the like.

In addition, as the organic solvent (S1), a cycloalkyl ester of carboxylic acid is preferable. The cycloalkyl ester of carboxylic acid is preferably a cycloalkyl ester of carboxylic acid represented by the following formula (s1):

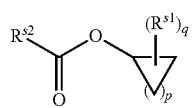

(s1)

in which in the formula (S1), $R^{s1}$ represents an alkyl group having 1 or more and 3 or less carbon atoms; $R^{s2}$ represents an alkyl group having 1 or more and 6 or less carbon atoms; p is an integer of 1 or more and 6 or less; and q is an integer of 0 or more and (p+1) or less.

$R^{s1}$ in the formula (s1) is exemplified by a methyl group, an ethyl group, an n-propyl group, and an isopropyl group, and is preferably a methyl group. $R^{s2}$ in the formula (s1) is exemplified by a methyl group, an ethyl group, an n-propyl group, an isopropyl group, an n-butyl group, an isobutyl group, a sec-butyl group, a tert-butyl group, an n-pentyl group, and an n-hexyl group. As the alkyl group represented by $R^{s2}$, a methyl group, an ethyl group, an n-propyl group, an isopropyl group, and an n-butyl group are preferable, and a methyl group and an ethyl group are more preferable.

Preferred examples of the carboxylic acid cycloalkyl ester represented by the formula (s1) include a cyclopropyl acetate, a cyclobutyl acetate, a cyclopentyl acetate, a cyclohexyl acetate, a cycloheptyl acetate, a cyclooctyl acetate, a cyclopropyl propionate, a cyclobutyl propionate, a cyclopentyl propionate, a cyclohexyl propionate, a cycloheptyl propionate, and a cyclooctyl propionate. Among these, cyclopentyl acetate and cyclohexyl acetate are preferable, since they are readily available and have a preferable boiling point.

Among the organic solvents (S1) described above, the carboxylic acid cycloalkyl ester represented by the formula (s1) is preferable, and cyclopentyl acetate and cyclohexyl acetate are particularly preferable.

The organic solvent (S) may contain a organic solvent (S2) other than the organic solvent (S1). Examples of such other organic solvents (S2) include: alcohols such as a methanol, an ethanol, a propanol and a n-butanol; polyhydric alcohols such as an ethylene glycol, a diethylene glycol, a propylene glycol and a dipropylene glycol; ketones such as an acetone, a methyl ethyl ketone, a methyl n-amyl ketone, a methyl isoamyl ketone and a 2-heptanone; compounds having an ester bond such as an ethylene glycol monoacetate, a diethylene glycol monoacetate, a propylene glycol monoacetate, or a dipropylene glycol monoacetate; ether derivatives such as monomethyl ethers, monoethyl ethers, monopropyl ethers, monobutyl ethers, monophenyl ethers or the like of the polyhydric alcohols or the compounds having an ester bond; esters such as a methyl lactate, an ethyl lactate, a methyl acetate, an ethyl acetate, a butyl acetate, a methyl pyruvate, an ethyl pyruvate, a methyl methoxypropionate and an ethyl ethoxypropionate; aromatic organic solvents such as an ethylbenzene, a diethylbenzene, an amylbenzene, an isopropylbenzene, a toluene, a xylene, a cymene and a mesitylene; nitrogen-containing organic solvents such as an N,N,N',N'-tetramethylurea, an N,N,2-trimethylpropionamide, an N,N-dimethylacetamide, an N,N-dimethylformamide, an N,N-diethylacetamide, an N,N-diethylformamide and an N-ethylpyrrolidone. Two or more of these solvents may be used in combination.

As the other organic solvent (S2), propylene glycol monomethyl ether acetate (PGMEA), propylene glycol monomethyl ether (PGME), N,N,N',N'-tetramethylurea, and butanol are preferable.

The organic solvent (S) preferably includes only the organic solvent (S1). In the case in which the organic solvent (S) includes the organic solvent (S1) and another organic solvent (S2), the proportion of the mass of the other organic solvent (S2) to the mass of the organic solvent (S) may be, for example, 70% by mass or less, preferably 0.01% by mass or more and 55% by or less, and more preferably 1% by mass or more and 50% by mass or less.

An amount of organic solvent (S) for use is 10% by mass or less, preferably 5% by mass or less, more preferably 3% by mass or less, and further preferably 0% by mass relative to the total mass of the curable liquid composition.

<Other Component>

The curable liquid composition may include various additives which have been conventionally added to a curable liquid composition including an epoxy compound, as long as the objects of the present invention are not inhibited. Examples of such additives include a base generator, a catalyst, a sensitizer, a silane coupling agent, an adhesion enhancer, a dispersant, a surfactant, an ultraviolet ray-absorbing agent, an antioxidant, an antifoaming agent, a viscosity modifier, rubber particles, a colorant, and the like. Moreover, in the case in which the curable liquid composition includes the rubber particles, elasticity is imparted to the formed cured film, and thereby the brittleness of the cured film is likely to be eliminated.

<<Production Method of Curable Liquid Composition>>

The method for producing the curable liquid composition described above is not particularly limited. The curable liquid composition can be produced by uniformly mixing each component described above in a predetermined ratio. A mixing apparatus that can be used for producing the curable liquid composition is not particularly limited. The mixing apparatus includes, for example, a bead mill, a double roll, a triple roll, etc. If a viscosity of the curable liquid composition is sufficiently low, the curable liquid composition may be filtered by using a filter with an opening of a desired size, if necessary, in order to remove insoluble foreign matters.

<<Production Method of Cured Film>>

A cured film is formed by curing a coating film formed from the curable liquid composition described above. The cured film is a film consisting of a cured product of the curable liquid composition described above. When the curable liquid composition is cured, a curing method is not particularly limited, and heating, light exposure, or a combination of heating and light exposure may be employed. The cured film is used for various uses according to a type of the particulate filler (A). When the particulate filler (A) is the metal oxide particle such as the zirconium oxide particle and the titanium oxide particle, the cured film is suitably used as a high refractive index layer in various optical elements and optical films. When the particulate filler (A) is quantum dots, the cured film is suitably used as an optical film for a light-emitting display element.

A typical example of a method for producing the cured film is described below. The cured film may be directly formed on various functional layers in a laminated body, a light-emitting display element panel or the like, or may be formed on a substrate of any material such as a metal substrate, a glass substrate or the like, and then peeled from the substrate for use. In addition, the cured film may be formed in a region surrounded by light-shielding partition walls that define pixels in a light-emitting display element panel or the like.

First, the curable liquid composition is coated on e.g. any substrate or a functional layer to form a coating film. Examples of the coating method include methods in which a contact transfer-type applicator such as a roll coater, a reverse coater or a bar coater, and a non-contact type applicator such as a spinner (a rotary applicator), a slit coater, or a curtain flow coater are used. After adjusting the viscosity of the curable liquid composition within an appropriate range, the liquid composition may be coated by a printing method such as ink-jet printing or screen printing to form a coating film which is patterned into a desired shape.

Then, a volatile component such as the organic solvent (S) is removed as needed to dry the coating film. The method of drying is not particularly limited, and examples thereof include a method in which the coating film is dried under reduced pressure at room temperature using a vacuum dryer (VCD) and then dried on a hot plate at a temperature of 60° C. or higher and 120° C. or lower, and preferably 70° C. or higher and 100° C. or lower, for 60 seconds or longer and 180 seconds or shorter. After forming the coating film in this manner, the coating film is subjected to light exposure and/or heating. Light exposure is carried out by irradiation with active energy rays such as excimer laser light. The dose of energy used in the irradiation varies depending on the composition of the curable liquid composition, and is for example preferably 30 mJ/cm$^2$ or more and 2,000 mJ/cm$^2$ or less, and more preferably 50 mJ/cm$^2$ or more and 500 mJ/cm$^2$ or less. The temperature for heating is not particularly limited, and is preferably 180° C. or higher and 280° C. or lower, more preferably 200° C. or higher and 260° C. or lower, and particularly preferably 220° C. or higher and 250° C. or lower. The heating time is typically preferably 1 minute or longer and 60 minutes or shorter, more preferably 10 minutes or longer and 50 minutes or shorter, and particularly preferably 20 minutes or longer and 40 minutes or shorter.

The film thickness of the cured film is not particularly limited. The film thickness of the cured film is typically 0.1 µm or more and 10 µm or less, preferably 0.2 µm or more and 5 µm or less, and more preferably 0.5 µm or more and 3 µm or less.

When the particulate filler (A) is quantum dots, the cured film can be suitably used as an optical film for a light-emitting display element because of good fluorescence efficiency, and also can be suitably used to produce a laminated body suitably used in a light-emitting display element. Laminated body including the cured film fromed using the curable liquid composition including quantum dots as the particulated fill (A) will now be described.

<<Laminated Body>>

The laminated body is a laminated body including the cured film formed using the curable liquid composition including quantum dots as the particulate filler (A). Such a laminated body can be a laminated body made of only a cured film including the quantum dots, or a laminated body made of a cured film including the quantum dots and other functional layers.

<Laminated Body of Cured Film>

Examples of the laminated body include a laminated body in which two or more cured films including quantum dots dispersed in a cured product of the epoxy compound (B) are laminated, and a cured film formed using the curable liquid composition including quantum dots. Such a laminated body may be a laminated body in which only cured films formed using the aforementioned curable liquid composition are laminated, or a laminated body in which a cured film formed using the aforementioned curable liquid composition, and another film including quantum dots other than the cured film formed using the aforementioned curable liquid composition are laminated.

It is preferred that a film including quantum dots include quantum dots producing red light by wavelength conversion of incident light from a light source, and quantum dots producing green light by wavelength conversion of incident light from a light source. It is also preferred that a film including quantum dots producing red light and a film including quantum dots producing green light be alternately laminated. When a laminated body having such a structure is applied to a light-emitting display element panel, because green light and red light having high color purity can be extracted by wavelength conversion, the range of hue reproduction in a light-emitting display equipped with the light-emitting display element panel can be enlarged. It should be noted that blue light and white light can be typically used as a light source. Red light, green light and blue light having high color purity can be extracted by using such a light source in combination with the above laminated body, and a clear image with good hues can be shown.

The light-emitting display is not particularly limited as long as it is a device to show an image using light emission of a light source, and examples thereof include a liquid crystal display, an organic EL display and the like.

<Laminated Body Including Cured Film and Other Functional Layers>

It is also preferred that the cured film formed using the aforementioned curable liquid composition, which is a film including quantum dots, be laminated with other functional layers. It is preferred that a cured film include quantum dots producing red light by wavelength conversion of incident light from a light source, and quantum dots producing green light by wavelength conversion of incident light from a light source. In addition, blue light and white light can be typically used as a light source.

Examples of other functional layers include a diffusion layer to diffuse light rays, a low refractive index layer having a lower refractive index than that of the cured film, a reflection layer to reflect part of the incident light from a light source, a light guide plate to allow light emitted by a light source to enter the laminated body and the like. In addition, a gap may be provided in the laminated body as needed. The gap may be, for example, an air layer, and a layer of an inert gas such as nitrogen.

As the diffusion layer, various diffusion layers which have been conventionally used for various displays and optical devices can be used without particular limitation. Typical examples thereof include a film having a fine structure such as a prism on the surface thereof, a film in which beads are scattered or embedded on the surface thereof, and a film including fine particles and e.g. an interface or a gap structured to scatter light rays in the inside thereof.

The low refractive index layer is not particularly limited as long as it is a film having a lower refractive index than that of the above-described cured film and the above-described silica film, and films made of various materials can be used.

Examples of the reflection layer include a reflective polarizing film, a film having a fine structure such as a prism on the surface thereof to reflect part of the incident light, a metallic foil, a multilayer optical film and the like. The reflection layer reflects preferably 30% or more of the incident light, more preferably 40% or more and particularly preferably 50% or more. It is preferred that the reflection layer be provided so that light having passed through a cured film is reflected and reflected light is allowed to enter the cured film again. The color purity of green light and red light emitted from a cured film can be increased by reflecting light incident from a reflection layer to a cured film in the direction of the reflection layer again by e.g. a diffusion layer, compared to a case where a reflection layer is not used.

As the light guide plate, various light guide plates which have been conventionally used for various displays and optical devices can be used without particular limitation.

Typical examples of preferred layer constitution of the laminated body including a cured film and other functional layers include layer constitution in 1) to 8) below. It should be noted that in laminated bodies having the constitution in 1) to 8), light rays emitted from a light source are allowed to enter the layer described on the leftmost end, and light rays after wavelength conversion by a cured film are extracted from the layer described on the rightmost end. A display panel is commonly provided so that light rays extracted from a laminated body are allowed to enter, and red light, green light and blue light having high color purity are used to show an image.

1) Diffusion layer/cured film/low refractive index layer/reflection layer,
2) light guide plate/diffusion layer/cured film/low refractive index layer/reflection layer,
3) low refractive index layer/cured film/gap/reflection layer,
4) light guide plate/low refractive index layer/cured film/gap/reflection layer,
5) low refractive index layer/cured film/low refractive index layer/reflection layer,
6) light guide plate/low refractive index layer/cured film/low refractive index layer/reflection layer,
7) reflection layer/low refractive index layer/cured film/low refractive index layer/reflection layer, and
8) light guide plate/reflection layer/low refractive index layer/cured film/low refractive index layer/reflection layer.

It should be noted that in the laminated bodies described above, the cured film formed using the aforementioned curable liquid composition is preferably produced in accordance with the above-described method.

<<Light-Emitting Display Element Panel and Light-Emitting Display>>

The cured film formed using the curable liquid composition containing the quantum dots and the above-described laminated body are incorporated into various light-emitting display element panels, and are preferably used to extract red light, green light and blue light having high color purity from light rays emitted from a light source. Here, "quantum dot sheet" is a general term for the cured film formed using the above-described curable liquid composition and the above-described laminated body.

The light-emitting display element panel typically includes the combination of a backlight as a light source, a quantum dot sheet and a display panel.

When the quantum dot sheet is equipped with a light guide plate, a light source is typically provided so that light rays are allowed to enter the lateral side of the light guide plate. The light rays having entered from the lateral side of the light guide plate pass through the quantum dot sheet and enter the display panel. When the quantum dot sheet is not equipped with a light guide plate, light rays from a surface light source are allowed to enter the main surface of the quantum dot sheet, and light rays having passed through the quantum dot sheet are allowed to enter the display panel. The type of the display panel is not particularly limited as long as an image can be formed using light rays having passed through a quantum dot sheet, and the type is typically a liquid crystal display panel.

Because red light, green light and blue light having particularly high color purity are easily extracted from light rays emitted from a light source, the quantum dot sheet is preferably the above-described laminated body. When the quantum dot sheet is a laminated body, preferred combinations of constitution of a light-emitting display element panel include the following a) to h) combinations. In the combinations described in a) to h) below, laminating is carried out from the constitution described on the leftmost end in the order described to form a light-emitting display element panel.

a) Surface light source/diffusion layer/quantum dot sheet/low refractive index layer/reflection layer/display panel,
b) light guide plate with light source/diffusion layer/quantum dot sheet/low refractive index layer/reflection layer/display panel, c) surface light source/low refractive index layer/quantum dot sheet/gap/reflection layer/display panel,
d) light guide plate with light source/low refractive index layer/quantum dot sheet/gap/reflection layer/display panel,
e) surface light source/low refractive index layer/quantum dot sheet/low refractive index layer/reflection layer/display panel,
f) light guide plate with light source/low refractive index layer/quantum dot sheet/low refractive index layer/reflection layer/display panel,
g) surface light source/reflection layer/low refractive index layer/quantum dot sheet/low refractive index layer/reflection layer/display panel, and
h) light guide plate with light source/reflection layer/low refractive index layer/quantum dot sheet/low refractive index layer/reflection layer/display panel.

By using the light-emitting display element panel described above, a light-emitting display, which has a wide range of hue reproduction and can show a clear image with good hues, can be produced.

EXAMPLES

Hereinafter, the present invention is described in more detail by way of Examples, but the present invention is not limited to these Examples.

Example 1

8.37 g of 1,2-di(3-mercapto propionyloxy)ethane, 8.32 g of 4-vinyl-1,2-epoxycyclohexane, 0.46 g of azobisisobutyronitrile, and 87.4 g of a THF (tetrahydrofuran) solvent were added to a reaction vessel. Then, the contents in the reaction vessel were stirred at 80° C. for 6 hours. After the distillation operation, 10.2 g of a ligand compound 1 having the following structure was obtained. The measurement results of $^1$H-NMR of the obtained ligand compound 1 are as follows.

$^1$H-NMR (CDCl$_3$): δ (ppm) 4.21 (s, 1H), 3.92 (t, 4H), 3.21 to 2.54 (m, 11H), 2.25 to 1.64 (m, 6H), 1.43 to 1.54 (m, 3H).

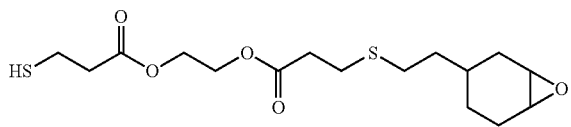 [SMILES: O=C(CCS)OCCOC(=O)CCSCCC1CCC2OC2C1]

Example 2

11.5 g of a ligand compound 2 having the following structure was obtained in the same manner as in Example 1 except that 8.37 g of 4-vinyl-1,2-epoxycyclohexane was changed to 12.2 g of 4-acryloyloxymethyl-1,2-epoxycyclohexane. The measurement results of $^1$H-NMR of the obtained ligand compound 2 are as follows.

$^1$H-NMR (CDCl$_3$): δ (ppm) 4.23 (s, 1H), 4.12 (d, 2H), 3.91 (t, 4H), 3.24 to 2.52 (m, 12H), 2.27 to 1.66 (m, 6H), 1.40 to 1.51 (m, 3H).

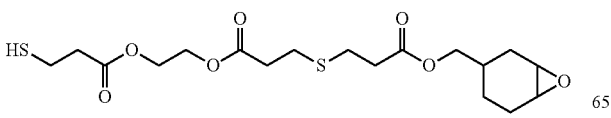

Example 3

100 g of zirconium oxide particles (average particle diameter of 5 nm) and 100 g of the aforementioned ligand compound 1 obtained by the same method as in Example 1 were charged in a flask, and the contents in the flask were stirred at 200° C. for 60 minutes. The reaction solution after stirring was filtered through a filter paper. The solid substance on the filter paper was washed with propylene glycol monomethyl ether acetate, and then the solid substance in washing liquid was filtered again with filter paper. The solid substance on the filter paper was washed with acetone, and then the solid substance in the washing liquid was filtered again on filter paper. The solid substance on the filter paper was dried to obtain 112 g of zirconium oxide particles, on the surface of which ligand compound 1 obtained in Example 1 was bonded.

Example 4

103 g of zirconium oxide particles, on the surface of which ligand compound 2 obtained in Example 2 was bonded, was obtained in the same manner as in Example 3 except that ligand compound 1 was changed to ligand compound 2 obtained in Example 2.

Example 5

106 g of titanium oxide particles were obtained, on the surface of which ligand compound 1 obtained in Example 1 was bonded in the same manner as in Example 3 except that the zirconium oxide particles (average particle diameter of 5 nm) were changed to the titanium oxide particles (average particle diameter of 5 nm).

[XPS Measurement]

The particles obtained in Examples 3 to 5 after purification by solvent washing, and the raw material particles used in Examples 3 to 5, respectively, were further freeze-dried at a pressure of 10 Ma. The freeze-dried particle was analyzed by using an X-ray photoelectron spectrometer (XPS, "XPS5700" manufactured by ULVAC-PHI, Inc.). As a result of XPS analysis of each particle obtained in Examples 3 to 5, a peak derived from a sulfur atom that was not observed in the XPS analysis of the raw material oxide particle, was observed in the region of 160 eV to 170 eV. It is found therefrom that ligand compound 1 or ligand compound 2 having a sulfur atom is present on the surface of each of the particles obtained in Examples 3 to 5. If ligand compound 1 or ligand compound 2 is not bonded to the surface of each raw material particle, ligand compound 1 or ligand compound 2 is washed into a solvent by washing with the solvent. Therefore, ligand compound 1 or ligand compound 2 is bonded to the surface of each raw material particle in each of the particles obtained in Examples 3 to 5.

Examples 6 to 9

20 g of the particulate filler of the type shown in Table 1, 98 g of the epoxy compound of the type shown in Table 1, and 2 g of a sulfonium salt were uniformly mixed to obtain the curable liquid compositions of Examples 6 to 9.

Comparative Example 1

20 g of untreated zirconium oxide particles to which no ligand was bonded, 98 g of an epoxy compound of the type shown in Table 1, and 2 g of a sulfonium salt were uniformly mixed to obtain the curable liquid compositions of Comparative Example 1.

In Examples 6 to 9 and Comparative Example 1, the following B1 and B2 were used as the epoxy compounds. In Examples 6 to 9 and Comparative Example 1, sulfonium salts having the following structures were used as the sulfonium salts that were curing agents.

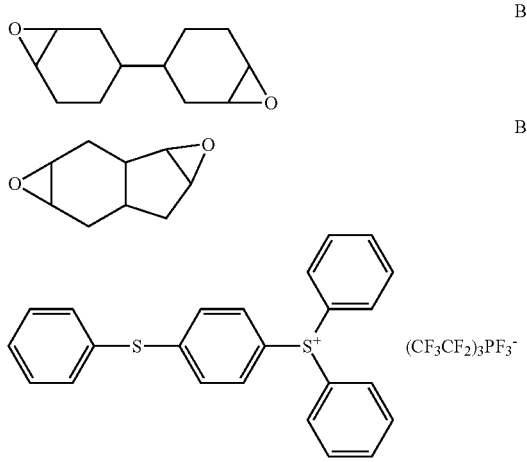

By using each of the obtained curable liquid compositions of Examples 6 to 9 and Comparative Example 1, pencil hardness of the cured product and the dispersion stability of the particulate filler in the curable liquid composition were determined according to the following methods.

The results of these evaluations are shown in Table 1.

<Pencil Hardness>

A surface of a glass substrate (100 mm×100 mm) was coated with the curable liquid composition by using a spin coater to form a coating film having a film thickness of 1.0 μm. Next, it was exposed to light by using an ultraviolet irradiation apparatus (product name: TME-150RTO, manufactured by Topcon Co., Ltd.) at a light exposure dose of 50 mJ/cm$^2$. The pencil hardness of the obtained cured film was measured according to JIS K5400.

<Dispersion Stability>

The obtained curable liquid composition was sealed and stored as it was in a vial at room temperature.

After standing undisturbed for one week, the case where no precipitation was observed was evaluated as "Good", and the case where precipitation was confirmed was evaluated as "Poor".

TABLE 1

| | Particulate filler | IEpoxy compound | Pencil hardness | Dispersion stability |
|---|---|---|---|---|
| Example 6 | Zirconium oxide particles/Example 3 | B1 | 5H | Good |
| Example 7 | Zirconium oxide particles/Example 4 | B1 | 5H | Good |
| Example 8 | Zirconium oxide particles/Example 3 | B2 | 4H | Good |
| Example 9 | Titanium oxide particles/Example 5 | B1 | 5H | Good |
| Comparative example 1 | Untreated zirconium oxide particles | B1 | H | Poor |

As can be seen from Table 1, the curable liquid compositions of Examples each containing particulate filler (A), on the surface of which ligand (a1) having the alicyclic epoxy group and the thiol group is bonded, and the epoxy compound (B) having the non-aromatic cyclic group having 5 or more annular atoms, has the favorable dispersion stability of the particulate filler and provides a cured product having excellent hardness. In contrast, the curable composition of Comparative Example containing the epoxy compound (B) having the non-aromatic cyclic group having 5 or more annular atoms and the particulate filler, on the surface of which no ligand is bonded, is inferior in the dispersion stability of the particulate filler and does not provide a cured product having excellent hardness.

What is claimed is:

1. A curable liquid composition, comprising a particulate filler (A) and an epoxy compound (B), wherein a ligand (a1) is bonded to a surface of the particulate filler (A),
the ligand (a1) is a compound represented by the following formula (A1):

$$HS—R^1-R^2 \qquad (A1)$$

wherein in formula (A1), $R^1$ is a divalent chain linking group, $R^2$ is an alicyclic epoxy group that may have a substituent and may be condensed with an aromatic ring, and the divalent chain linking group as $R^1$ does not contain Si, and the epoxy compound (B) has a non-aromatic cyclic group having 5 or more annular atoms.

2. The curable liquid composition according to claim 1, wherein the ligand is a compound represented by the following formula (A1-1):

$$HS—R^3—S—R^4—R^2 \qquad (A1\text{-}1)$$

wherein in formula (A1-1), $R^2$ is an alicyclic epoxy group that may have a substituent and may be condensed with an aromatic ring, $R^3$ is a divalent chain linking group not containing Si, and $R^4$ is an alkylene group.

3. The curable liquid composition according to claim 2, wherein $R^2$ is an epoxycycloalkyl group having 5 or more and 8 or less carbon atoms, and $R^4$ is an alkylene group having 2 or more and 4 or less carbon atoms.

4. The curable liquid composition according to claim 1, wherein a content of an organic solvent (S) is 10% by mass or less based on a total mass of the curable liquid composition.

5. The curable liquid composition according to claim 1, wherein the epoxy compound (B) is a liquid at 20° C.

6. The curable liquid composition according to claim 1, wherein the epoxy compound (B) is an alicyclic diepoxy compound containing no aromatic group.

7. The curable liquid composition according to claim 1, further comprising a curing agent (C) for epoxy compounds.

8. The curable liquid composition according to claim 7, wherein the curing agent (C) is an onium salt (C1) or a base generator (C2).

9. A particulate filler on a surface of which a ligand is bonded, wherein the ligand is represented by the following formula (A1):

$$HS—R^1-R^2 \qquad (A1)$$

wherein $R^1$ is a divalent chain linking group, $R^2$ is an alicyclic epoxy group that may have a substituent and may be condensed with an aromatic ring, and the divalent chain linking group as $R^1$ does not contain Si.

10. The particulate filler according to claim 9, wherein the ligand is a compound represented by the following formula (A1-1)

$$HS-R^3-S-R^4-R^2 \quad (A1\text{-}1)$$

wherein in formula (A1-1), $R^2$ is an alicyclic epoxy group that may have a substituent and may be condensed with an aromatic ring, $R^3$ is a divalent chain linking group not containing Si, and $R^4$ is an alkylene group.

11. The particulate filler according to claim 10, wherein $R^2$ is an epoxycycloalkyl group having 5 or more and 8 or less carbon atoms, and $R^4$ is an alkylene group having 2 or more and 4 or less carbon atoms.

* * * * *